(12) United States Patent
Han et al.

(10) Patent No.: US 11,714,517 B2
(45) Date of Patent: *Aug. 1, 2023

(54) METHOD, APPARATUS AND COMPUTER PROGRAM PRODUCT FOR PROVIDING A MEMBER CALENDAR IN A GROUP-BASED COMMUNICATION SYSTEM

(71) Applicant: Slack Technologies, LLC, San Francisco, CA (US)

(72) Inventors: Lydia Han, San Francisco, CA (US); Roland Schemers, Woodside, CA (US)

(73) Assignee: Slack Technologies, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/952,836

(22) Filed: Sep. 26, 2022

(65) Prior Publication Data

US 2023/0024460 A1  Jan. 26, 2023

Related U.S. Application Data

(63) Continuation of application No. 17/582,318, filed on Jan. 24, 2022, now Pat. No. 11,487,399, which is a continuation of application No. 16/398,166, filed on Apr. 29, 2019, now Pat. No. 11,237,692.

(51) Int. Cl.
| | |
|---|---|
| *G06F 3/0481* | (2022.01) |
| *G06F 3/04847* | (2022.01) |
| *G06Q 10/1093* | (2023.01) |
| *H04L 67/306* | (2022.01) |

(52) U.S. Cl.
CPC ........ *G06F 3/0481* (2013.01); *G06F 3/04847* (2013.01); *G06Q 10/1095* (2013.01); *G06F 2203/04803* (2013.01); *H04L 67/306* (2013.01)

(58) Field of Classification Search
CPC ... G06F 2203/0383; G06F 2203/04803; G06F 3/038; G06F 3/0481; G06F 3/0482; G06F 16/252; G06F 16/9558; G06F 21/6218; G06F 2203/0382; G06F 3/0488; G06F 16/2474; G06F 16/285; G06F 16/313; G06F 16/353; G06F 3/04817; G06F 3/04883; G06F 40/174; G06F 40/20; G06F 40/205; G06F 40/279; G06F 40/40; G06F 3/0485; G06F 3/04886; G06F 3/0362
See application file for complete search history.

(56) References Cited

U.S. PATENT DOCUMENTS

| | | | |
|---|---|---|---|
| 2010/0049808 A1* | 2/2010 | Rosenberg | G06Q 10/10 709/204 |
| 2017/0357521 A1* | 12/2017 | Paek | G06F 3/0488 |
| 2018/0287982 A1 | 10/2018 | Draeger et al. | |

OTHER PUBLICATIONS

"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013) 2 pages.

(Continued)

*Primary Examiner* — Rayeez R Chowdhury
(74) *Attorney, Agent, or Firm* — Erise IP, P.A.

(57) ABSTRACT

Method, apparatus and computer program product for generating a member calendar in a group-based communication system are described herein.

20 Claims, 42 Drawing Sheets

(56) References Cited

OTHER PUBLICATIONS

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, Lexisnexis, https://advance.lexis.com/api/pemnalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014) 8 pages.

Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014) 4 pages.

Matsumoto, T. et al., "Chocoa Communicator—A New Communication System Based on Awareness and Text Communications-", FUJITSU Sci. Tech. J., 36, 2, (Dec. 2000) 154-161.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014), 2 pages.

Michael Carney, "Slack is thriving on a cocktail of whimsy and great timing", Pandodaily, Lexisnexis, https://advance.lexis.com/api/pemnalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

FIG. 32

FIND TIME  < TODAY, WEDNESDAY, JAN 20

GUESTS:
ADD GUESTS
☑ Ⓜ MARTA
☑ Ⓡ RENEE
☑ Ⓓ DIEGO
☑ Ⓛ LAURA

FIND BEST TIME
1 HR >   TODAY >

◉ 1:30 - 2:30 PM
   ALL GUESTS AVAILABLE
○ 2:30 - 3:30 PM
   ALL GUESTS AVAILABLE
○ 4 - 5 PM
   LAURA HAS A CONFLICT,
   "1:1 DAVID & LAURA"

FIND MORE TIMES

Ⓜ MARTA   Ⓓ DIEGO   Ⓛ LAURA   Ⓡ RENEE-LEAN...

7 AM
8 AM
9 AM
10 AM
11 AM
12 AM
1 PM
2 PM
3 PM
4 PM — 4-5 PM / 1:1 DAVID
5 PM
6 PM
7 PM

CANCEL   DONE

FIG. 40

METHOD, APPARATUS AND COMPUTER PROGRAM PRODUCT FOR PROVIDING A MEMBER CALENDAR IN A GROUP-BASED COMMUNICATION SYSTEM

RELATED APPLICATION

The present application is a continuation application and claims benefit of U.S. patent application Ser. No. 17/582,318, filed Jan. 24, 2022, and entitled "METHOD, APPARATUS AND COMPUTER PROGRAM PRODUCT FOR PROVIDING A MEMBER CALENDAR IN A GROUP-BASED COMMUNICATION SYSTEM" ("the '318 Application"). The '318 Application is a continuation application and claims benefit of U.S. patent application Ser. No. 16/398,166, filed Apr. 29, 2019, and entitled "METHOD, APPARATUS AND COMPUTER PROGRAM PRODUCT FOR PROVIDING A MEMBER CALENDAR IN A GROUP-BASED COMMUNICATION SYSTEM," now U.S. Pat. No. 11,237,692. The identified earlier-filed patent application and patent are hereby incorporated by reference in their entirety into the present application.

BACKGROUND

Applicant has identified many deficiencies and problems associated with existing methods, apparatus, and systems related to electronic calendar services. For example, many calendar services fail to overcome technical challenges associated with sharing electronic calendars.

BRIEF SUMMARY

In general, embodiments of the present invention provide methods, apparatus, systems, computing devices, and/or the like for generating a member calendar associated with a group-based communication system.

In accordance with one aspect, an apparatus is provided. The apparatus comprises a processor and a non-transitory memory comprising program code. The non-transitory memory and the program code are configured to, with the processor, cause the apparatus to at least: transmit, to an external calendar resource, a validation request, wherein the validation request comprises a request to access a first calendar object associated with the external calendar resource; receive, from the external calendar resource, a validation notification; in response to receiving the validation notification, retrieve the first calendar object from the external calendar resource, wherein the first calendar object comprises a first calendar object metadata set; receive, from a second client device associated with a group-based communication system, a calendar rendering request associated with the first calendar object via interaction by the second client device with a user interface of the second client device, wherein the user interface comprises a rendering of a member profile associated with a first client device, wherein the first client device is associated with the first calendar object; and in response to receiving the calendar rendering request, cause a rendering of the first calendar object for display within a member calendar flex pane of the user interface of the second client device.

In some embodiments, the member calendar flex pane comprises a user avatar associated with the member profile.

In some embodiments, the first calendar object is associated with a first event object, and the first event object comprises a first event object metadata set.

In some embodiments, the first event object metadata set comprises a visibility parameter, and causing the rendering of the first calendar object for display on the user interface is based at least in part on the visibility parameter.

In some embodiments, the first event object metadata set comprises an availability parameter, and causing the rendering of the first calendar object for display on the user interface is based at least in part on the availability parameter.

In some embodiments, the second client device is associated with a second calendar object. The at least one non-transitory memory and the program code are configured to, with the at least one processor, cause the apparatus to further determine a first event object, wherein the first event object is associated with the first calendar object and the second calendar object; and cause a rendering of the first event object on the member calendar flex pane.

In some embodiments, the user interface comprises a rendering of a direct messaging interface.

In some embodiments, the second client device is associated with a second calendar object, and the member calendar flex pane comprises a first rendering of the first calendar object and a second rendering of the second calendar object.

In some embodiments, the at least one non-transitory memory and the program code are configured to, with the at least one processor, cause the apparatus to further: receive, from the second client device, an event generation request, wherein the event generation request comprises a request for a second event object; determine at least part of a second event object metadata set for the second event object; transmit, to the external calendar resource, the event generation request and the second event object metadata set; receive, from the external calendar resource, the second event object, wherein the second event object is associated with the first calendar object and the second calendar object; and cause rendering of the second event object on the first rendering of the first calendar object and the second rendering of the second calendar object on the member calendar flex pane.

In some embodiments, determining the at least part of the second event object metadata set for the second event object is based on user identifiers associated with the direct messaging interface.

In accordance with one aspect, a computer-implemented method is provided. The computer-implemented method comprises transmitting, to an external calendar resource, a validation request, wherein the validation request comprises a request to access a first calendar object associated with the external calendar resource; receiving, from the external calendar resource, a validation notification; in response to receiving the validation notification, retrieving the first calendar object from the external calendar resource, wherein the first calendar object comprises a first calendar object metadata set; receiving, from a second client device associated with a group-based communication system, a calendar rendering request associated with the first calendar object via interaction by the second client device with a user interface of the second client device, wherein the user interface comprises a rendering of a member profile associated with a first client device, wherein the first client device is associated with the first calendar object; and in response to receiving the calendar rendering request, causing a rendering of the first calendar object for display within a member calendar flex pane of the user interface of the second client device.

In accordance with one aspect, a computer program product is provided. The computer program product comprises at least one non-transitory computer-readable storage medium having computer-readable program code portions stored therein. The computer-readable program code portions comprise an executable portion that is configured to: transmit, to an external calendar resource, a validation request, wherein the validation request comprises a request to access a first calendar object associated with the external calendar resource; receive, from the external calendar resource, a validation notification; in response to receiving the validation notification, retrieve the first calendar object from the external calendar resource, wherein the first calendar object comprises a first calendar object metadata set; receive, from a second client device associated with a group-based communication system, a calendar rendering request associated with the first calendar object via interaction by the second client device with a user interface of the second client device, wherein the user interface comprises a rendering of a member profile associated with a first client device, wherein the first client device is associated with the first calendar object; and in response to receiving the calendar rendering request, cause a rendering of the first calendar object for display within a member calendar flex pane of the user interface of the second client device.

The above summary is provided merely for the purpose of summarizing some example embodiments to provide a basic understanding of some aspects of the disclosure. Accordingly, it will be appreciated that the above-described embodiments are merely examples and should not be construed to narrow the scope or spirit of the disclosure. It will be appreciated that the scope of the disclosure encompasses many potential embodiments in addition to those here summarized, some of which will be further described below.

BRIEF DESCRIPTION OF THE DRAWINGS

Figure 1:
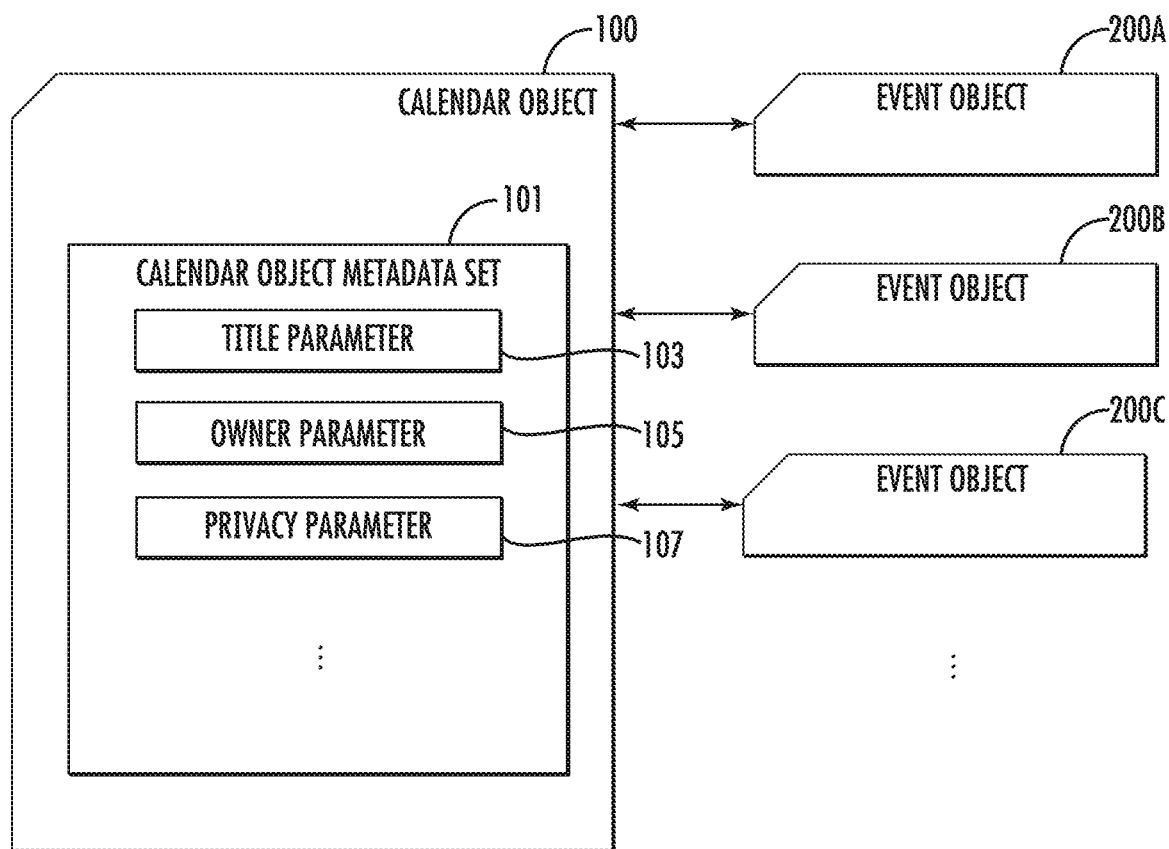
Figure 2:
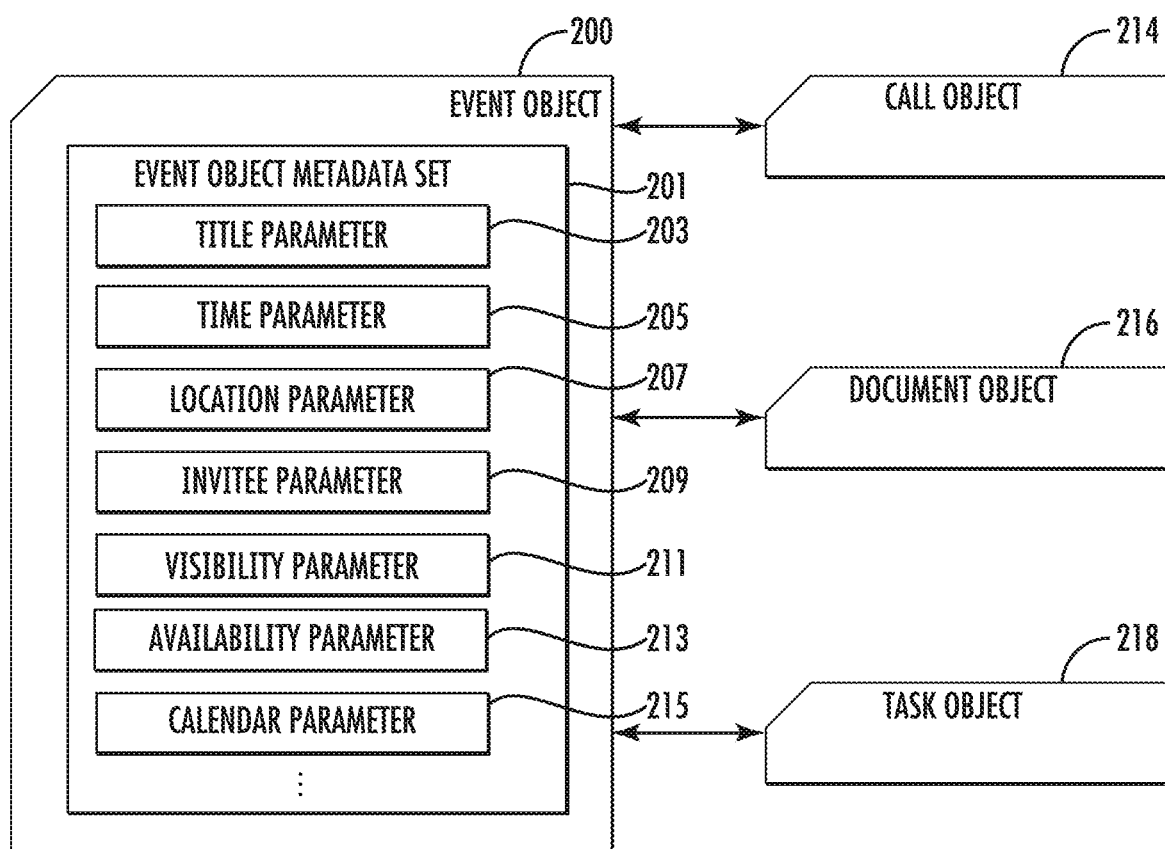
Figure 3:
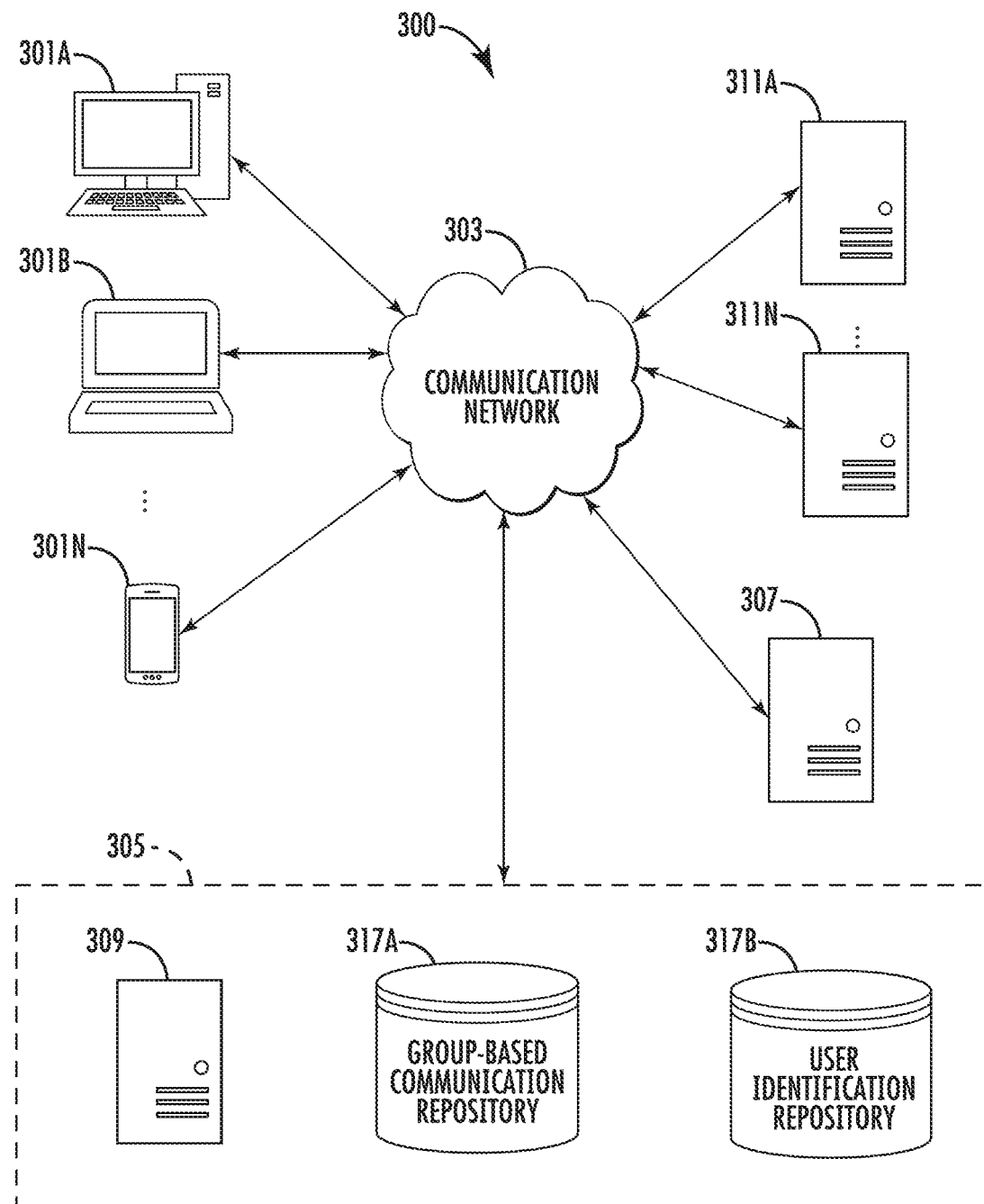
Figure 4:
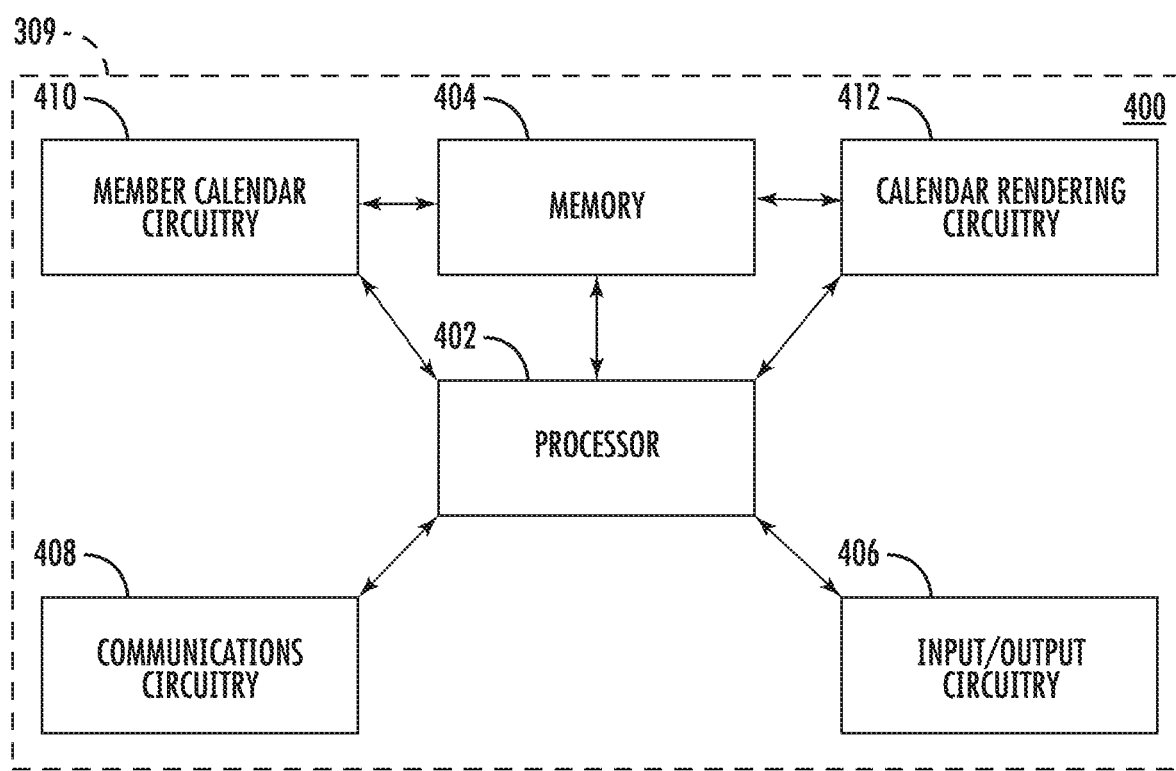
Figure 5:
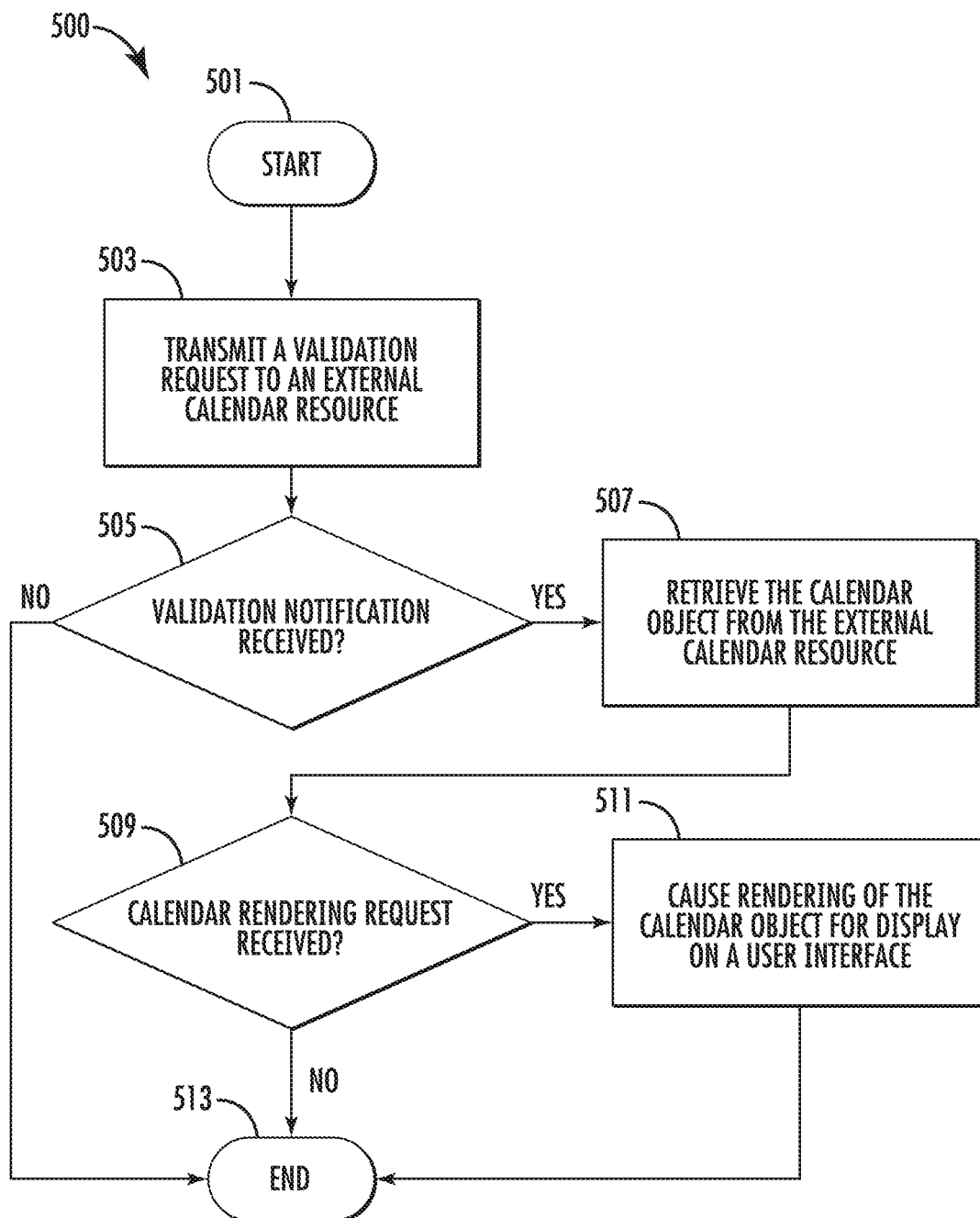
Figure 6:
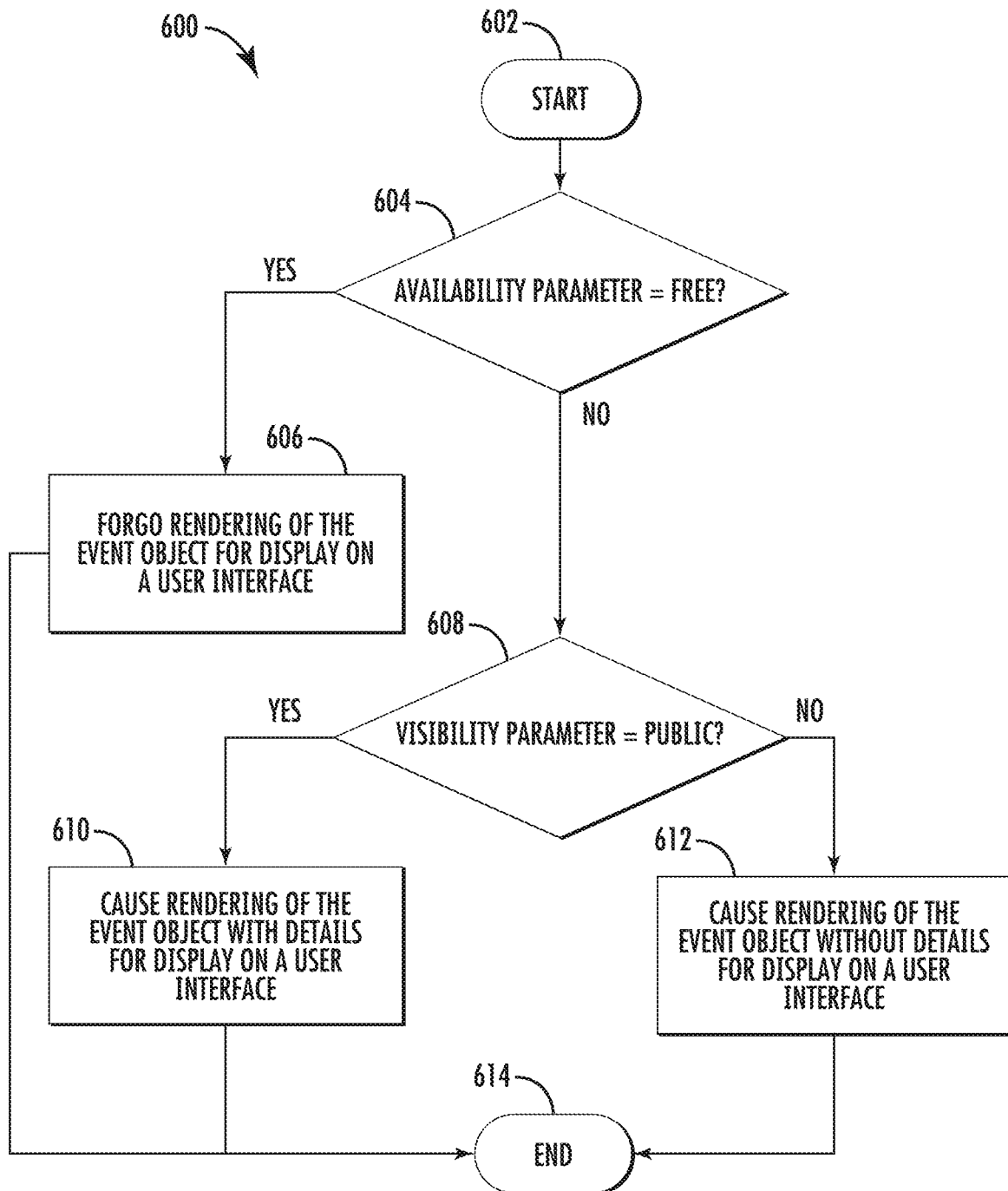
Figure 7:
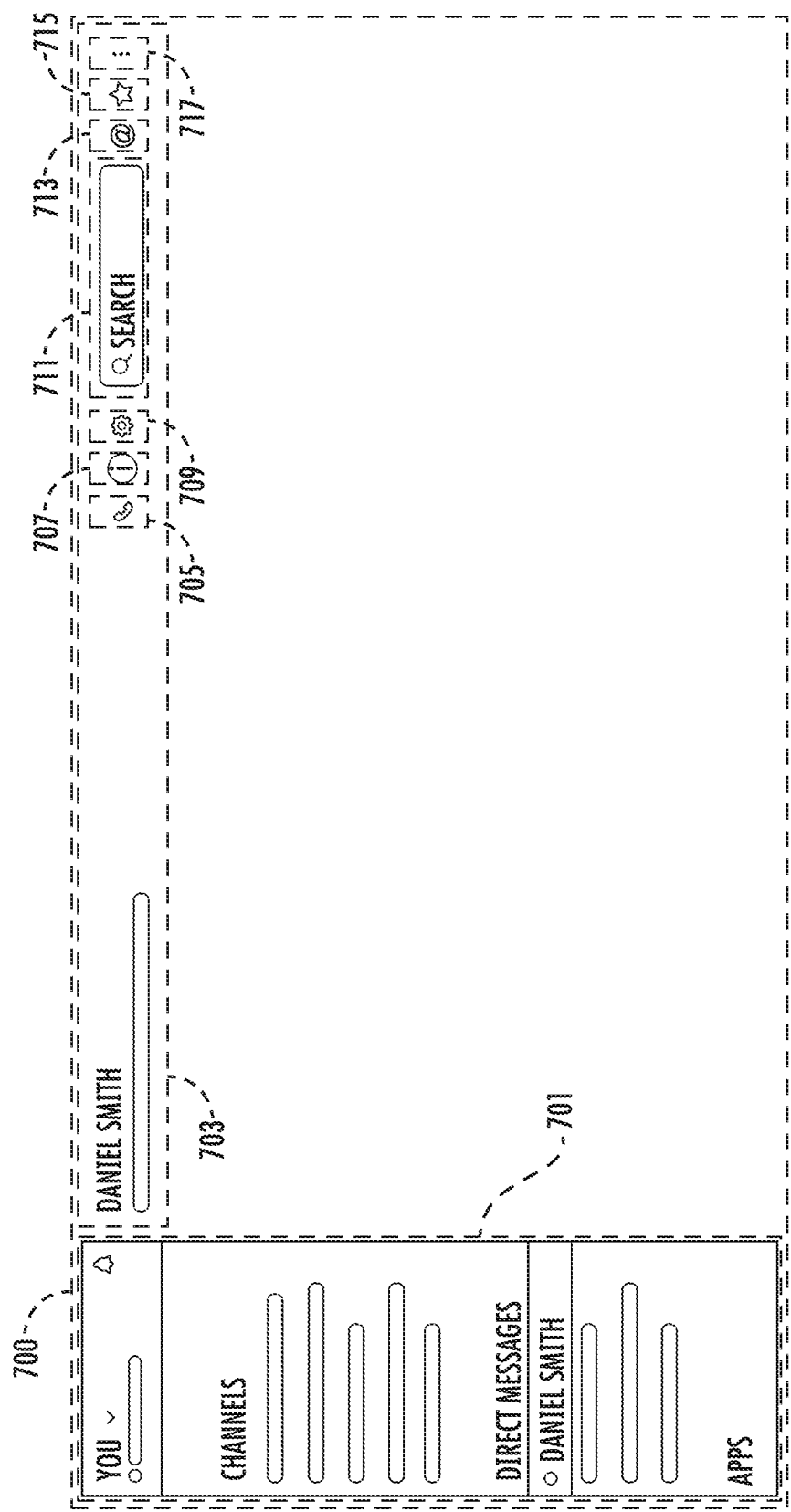
Figure 8:
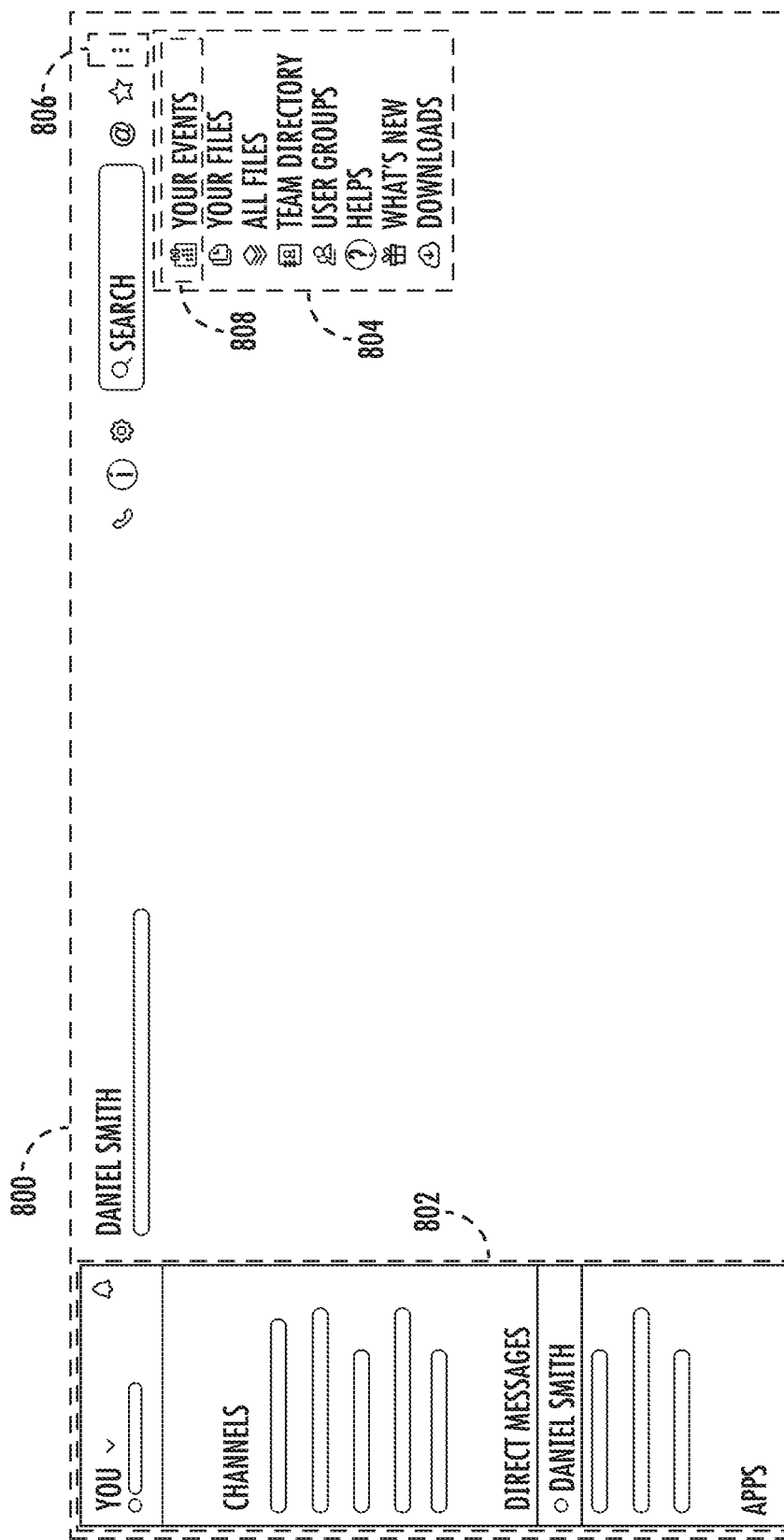
Figure 9:
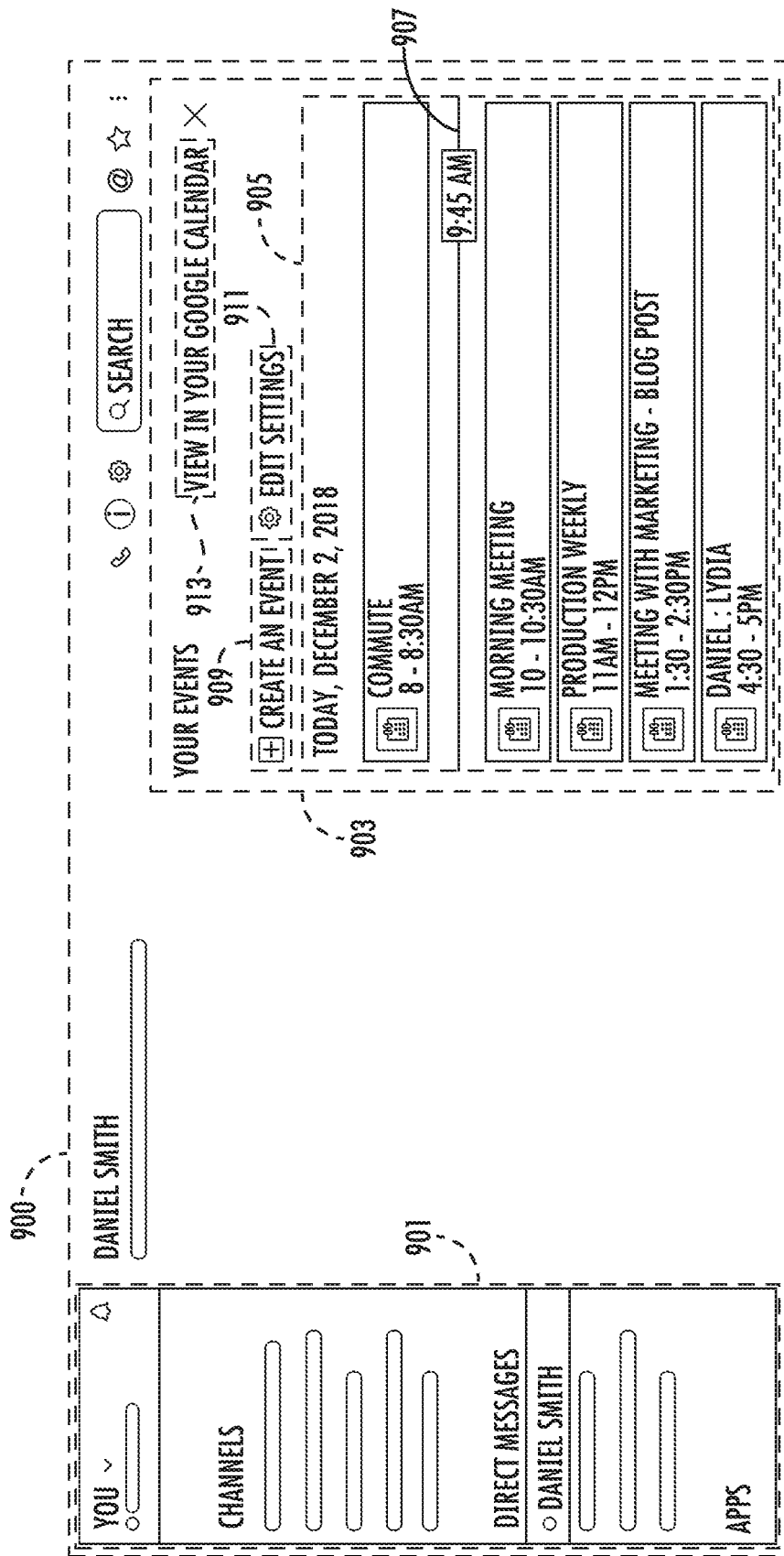
Figure 10:
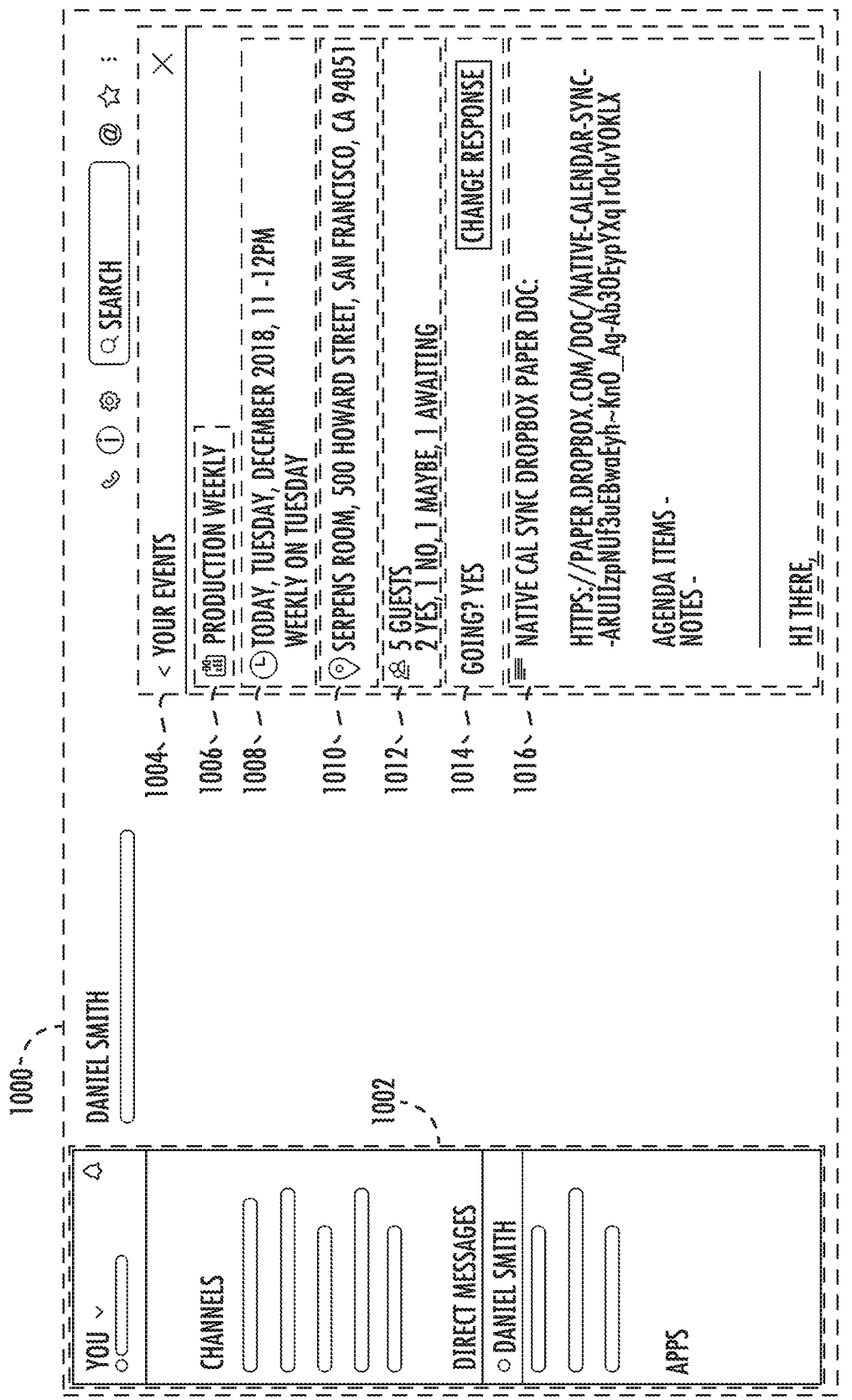
Figure 11:
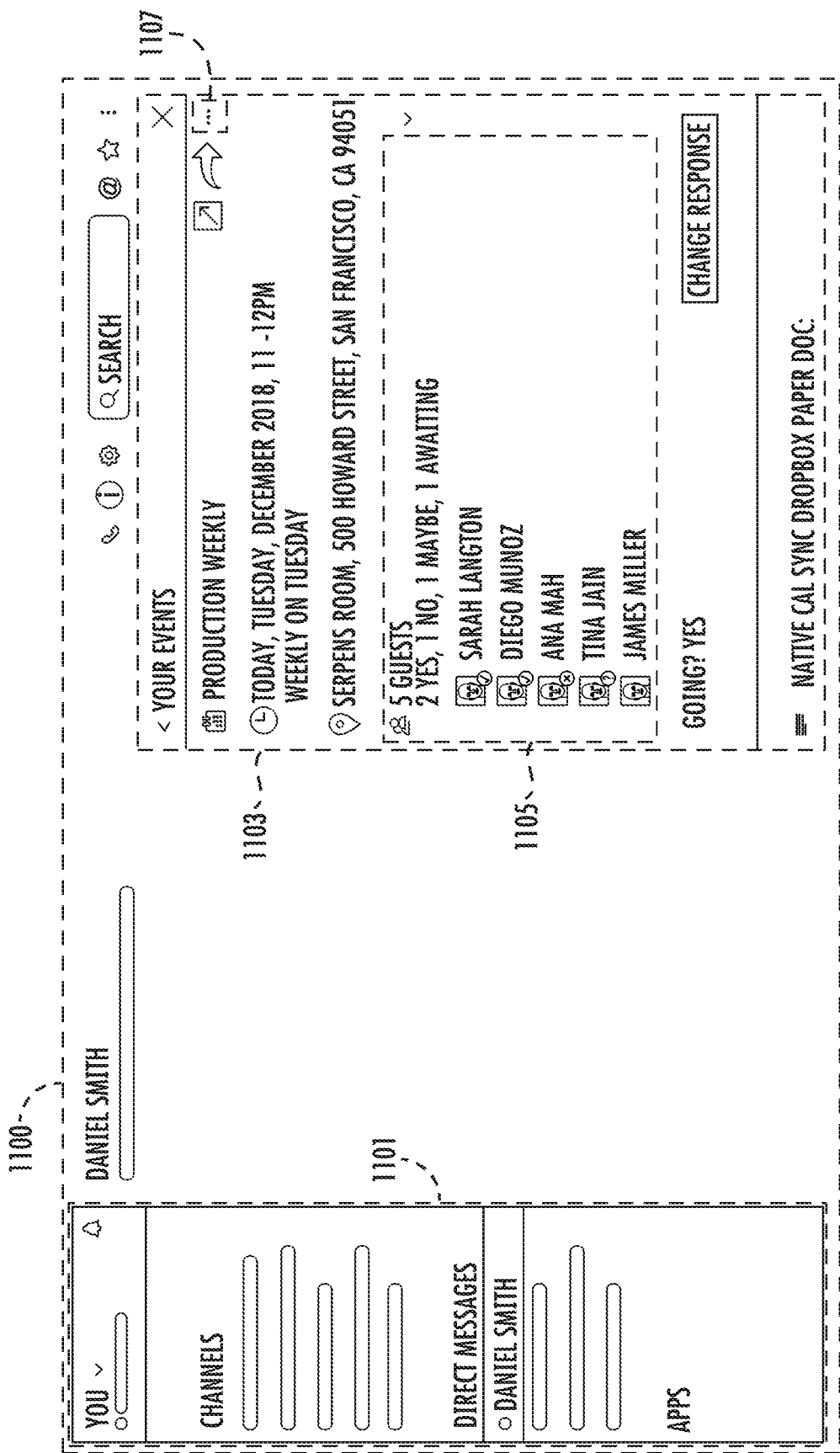
Figure 12:
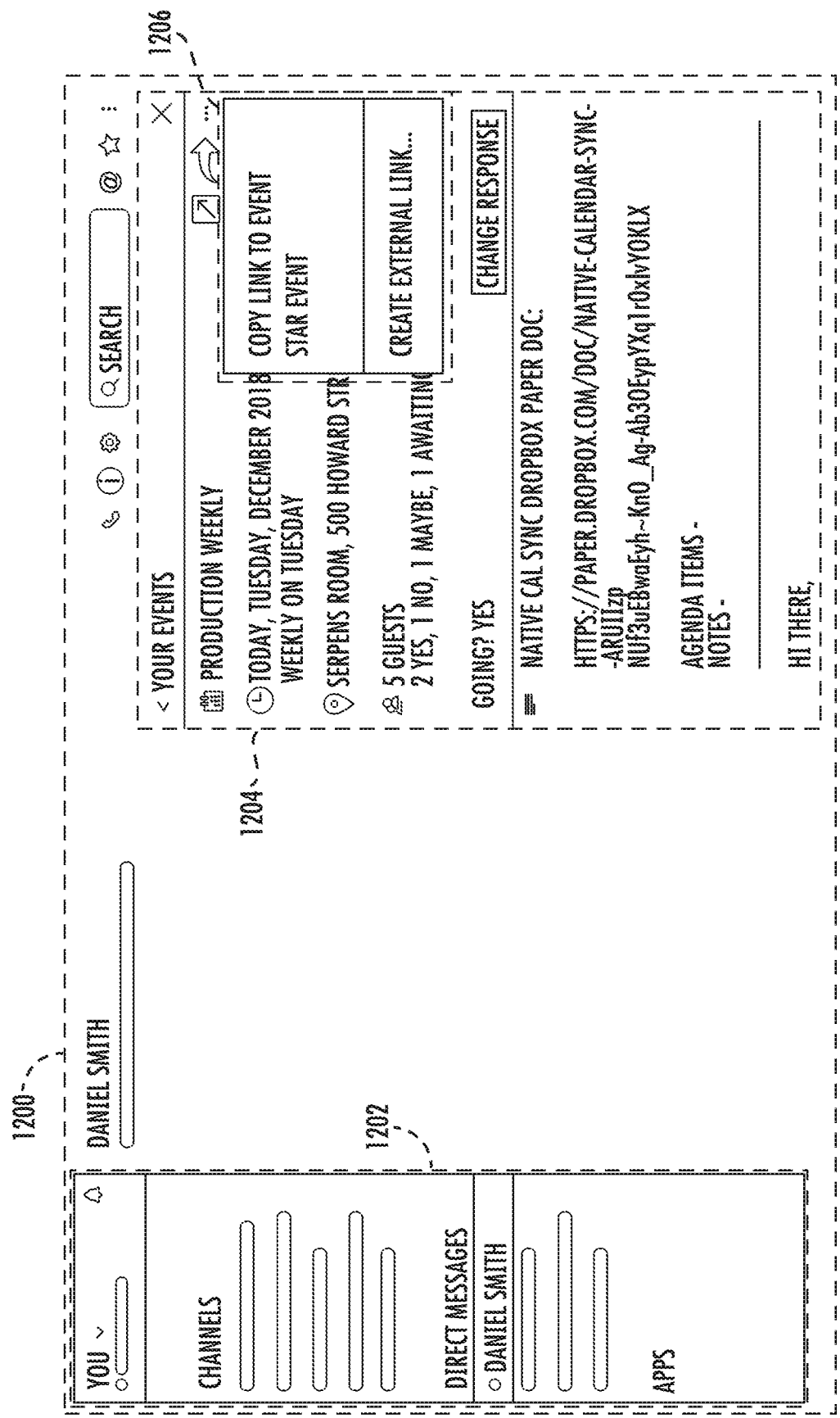
Figure 14:
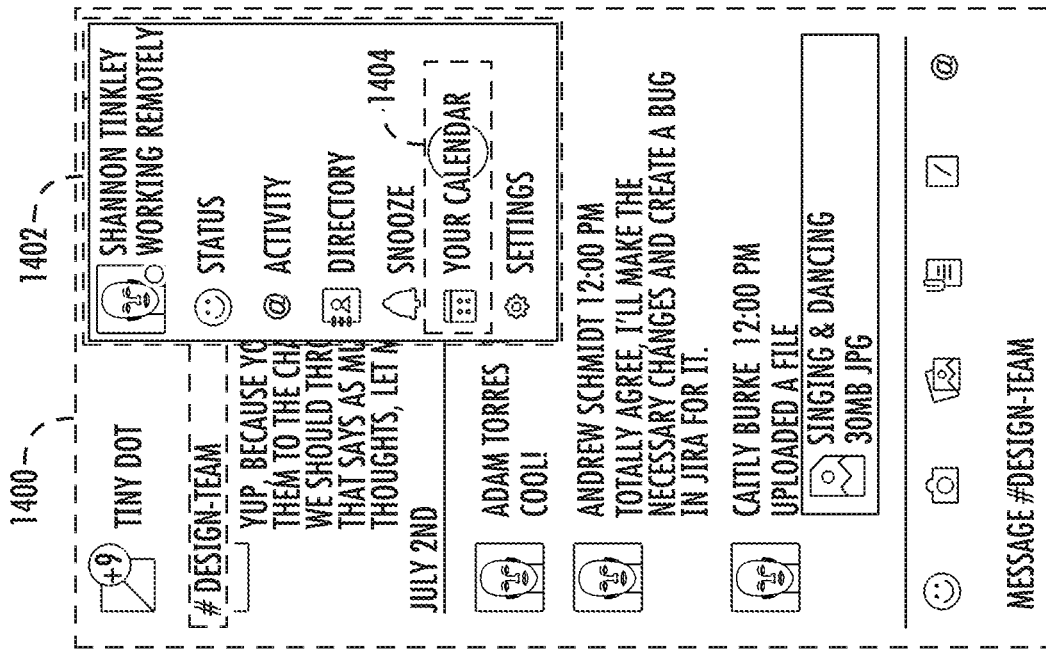
Figure 13:
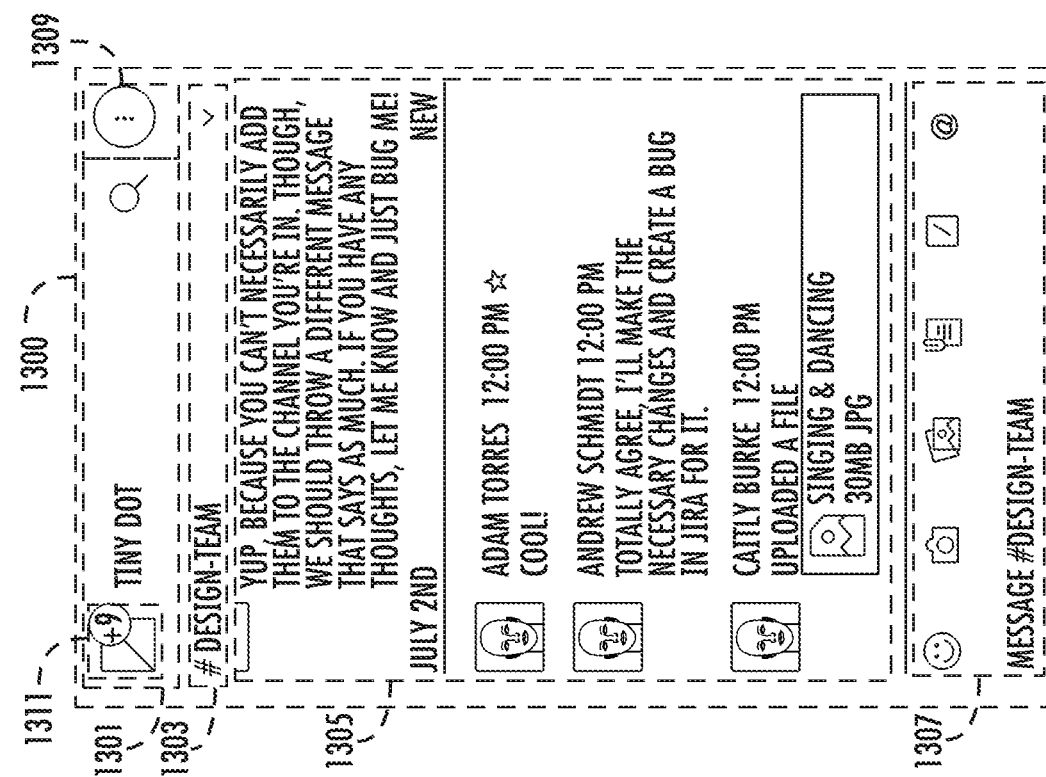
Figure 15:
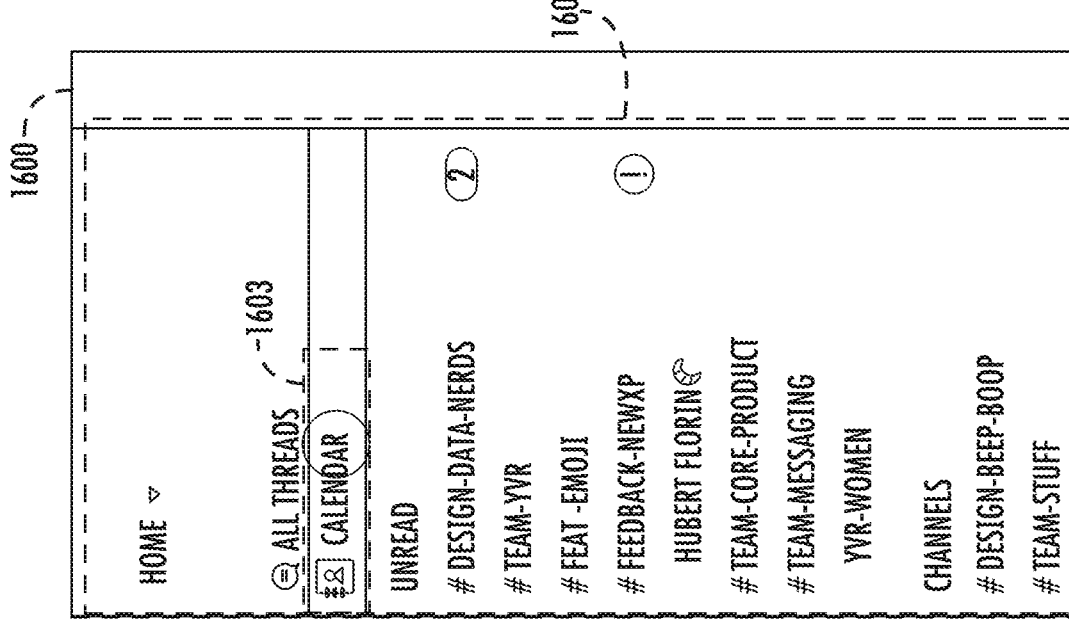
Figure 16:
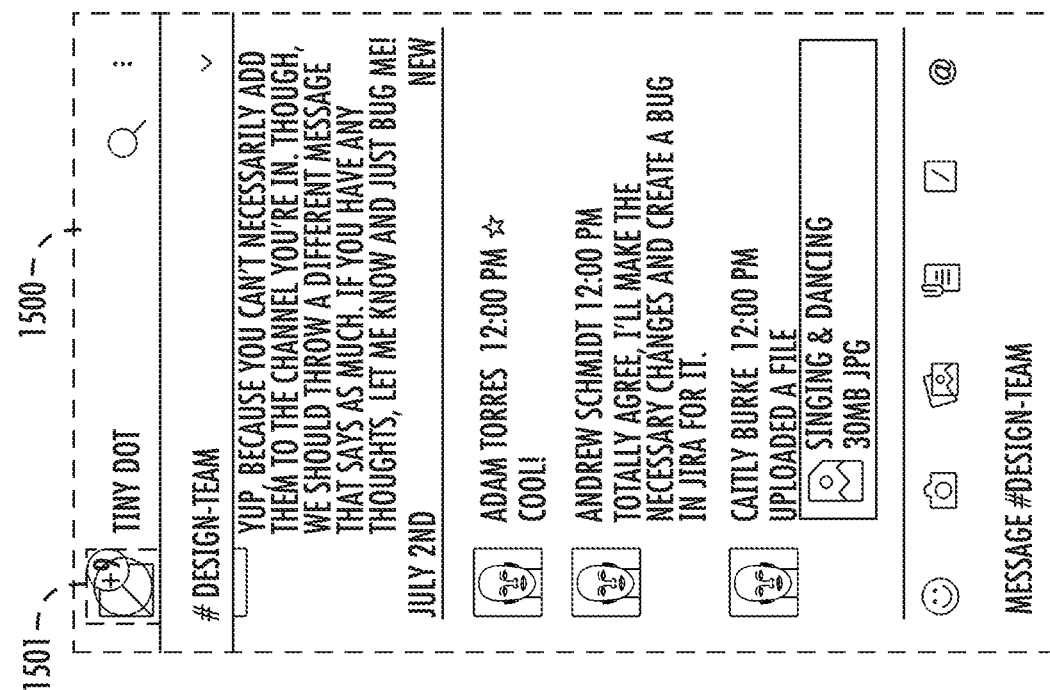
Figure 17B:
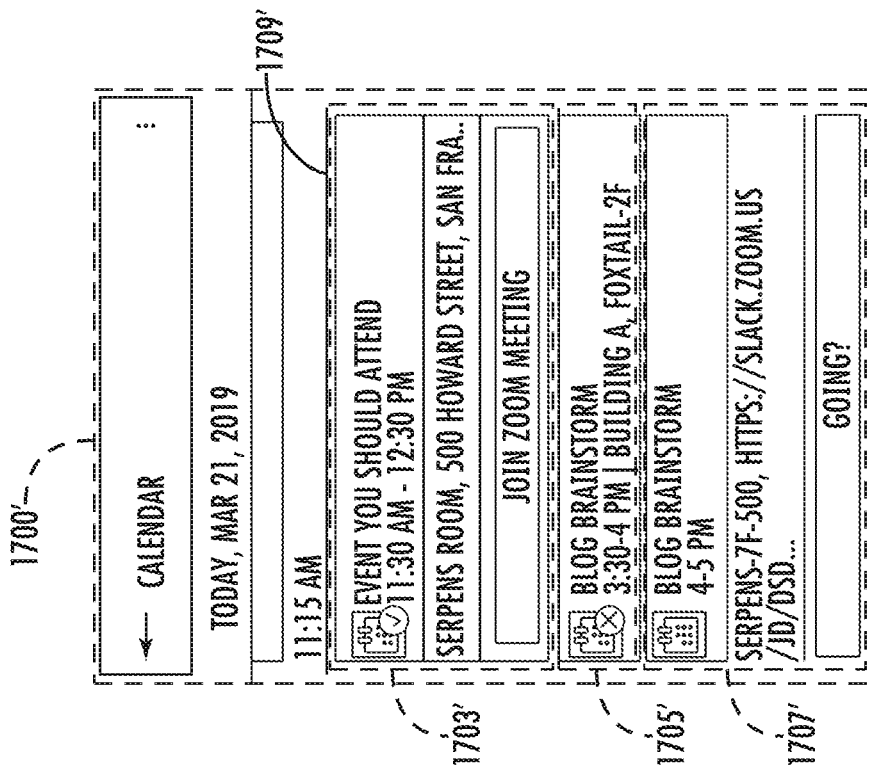
Figure 17A:
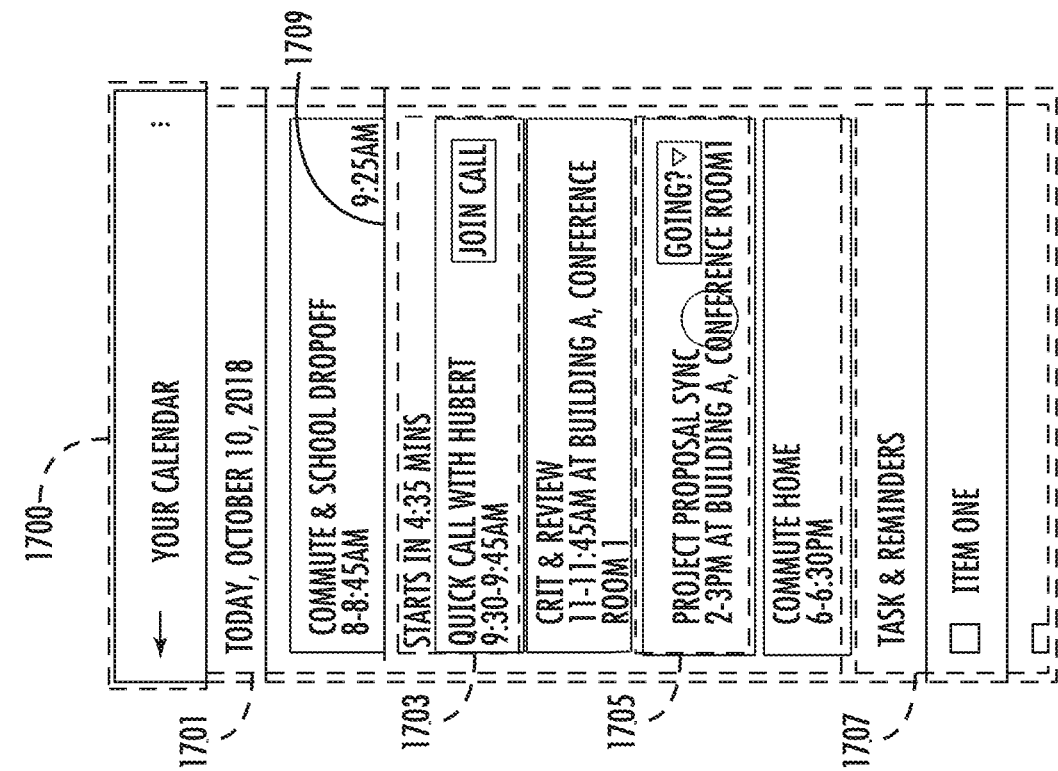
Figure 18:
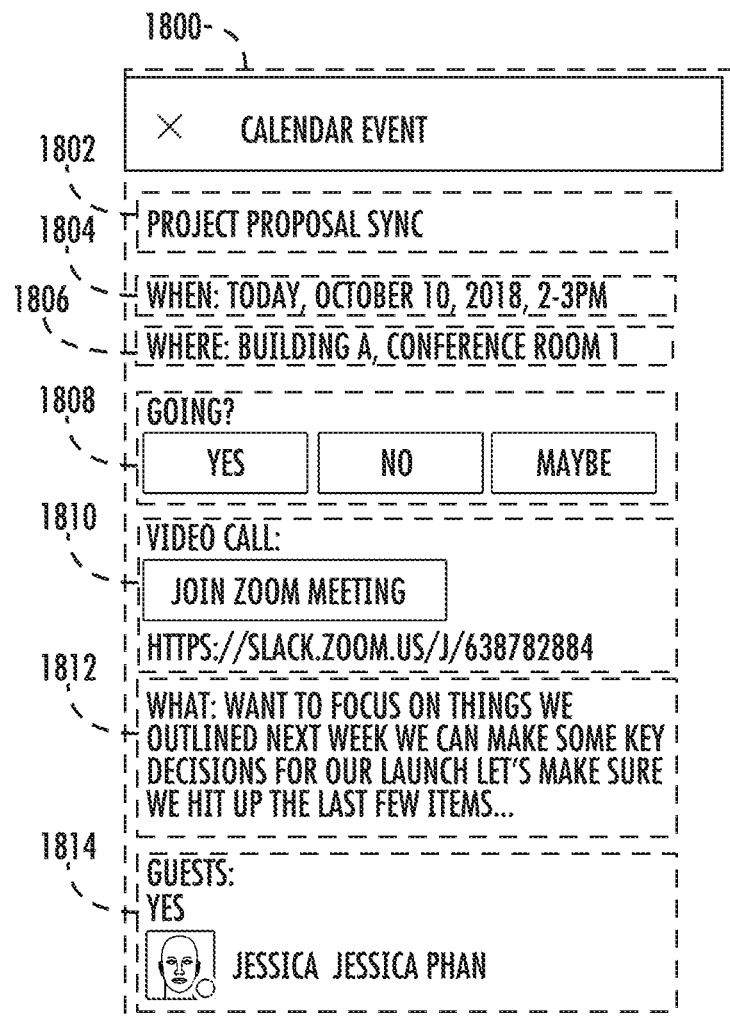
Figure 19:
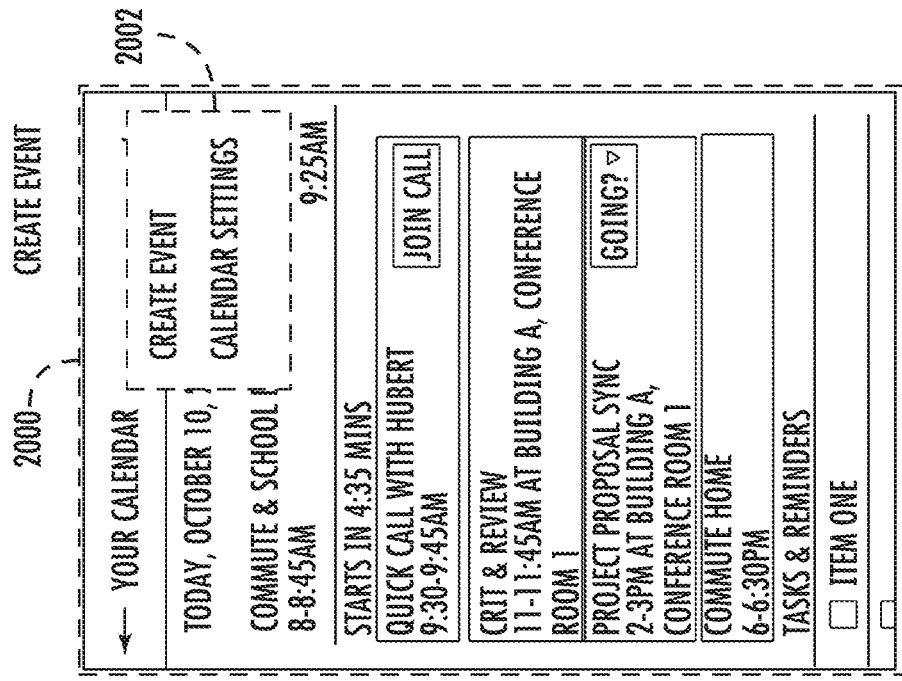
Figure 20:
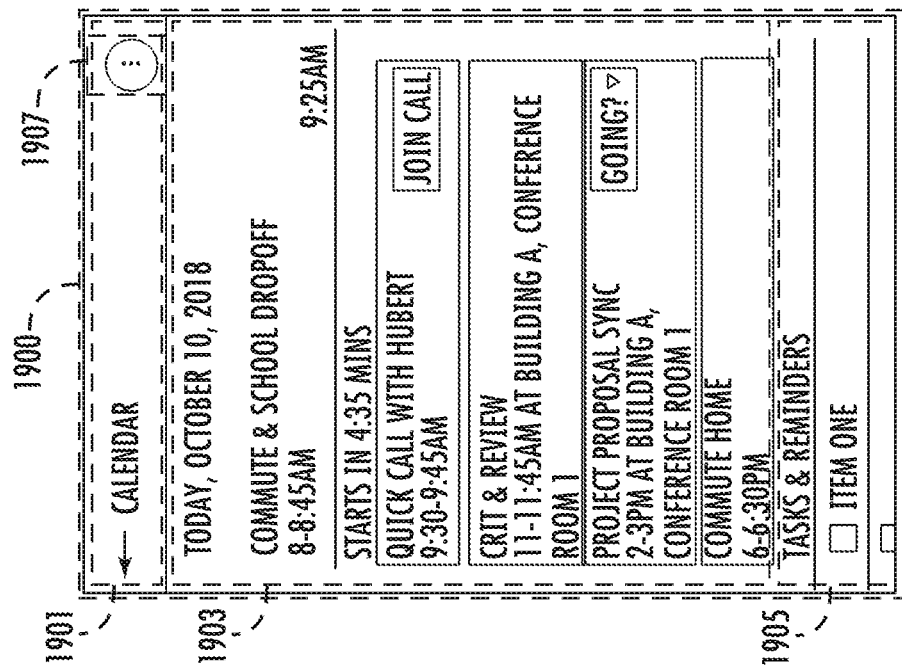
Figure 21:
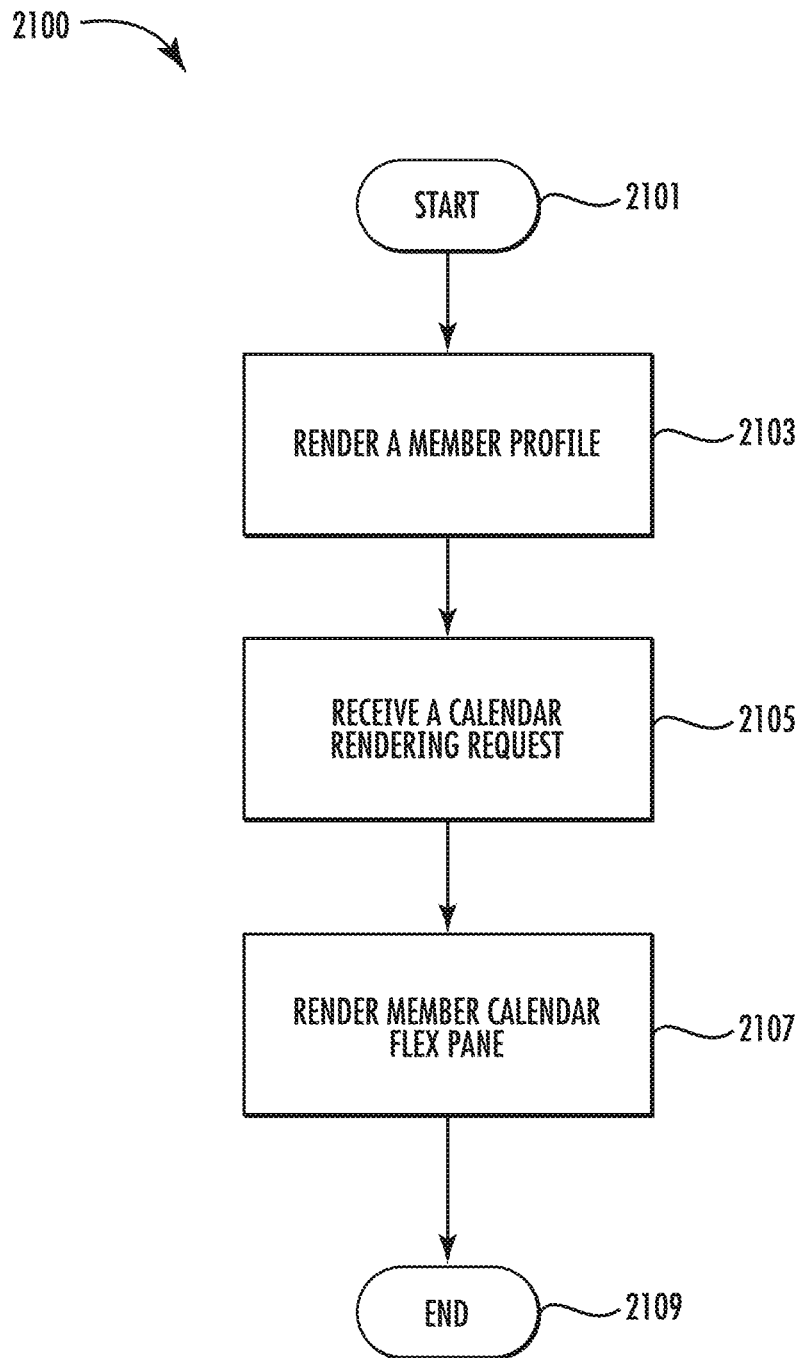
Figure 22:
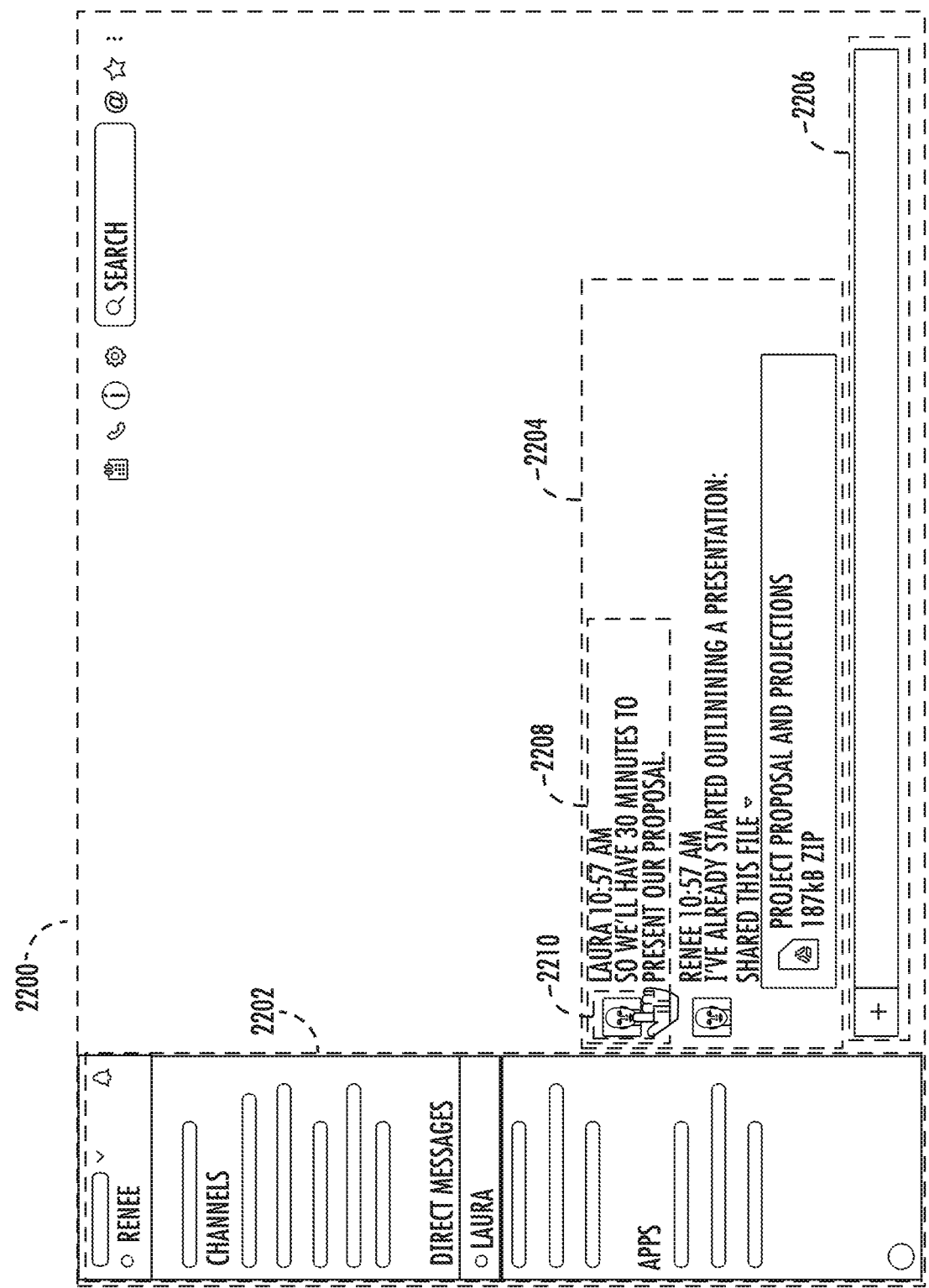
Figure 23:
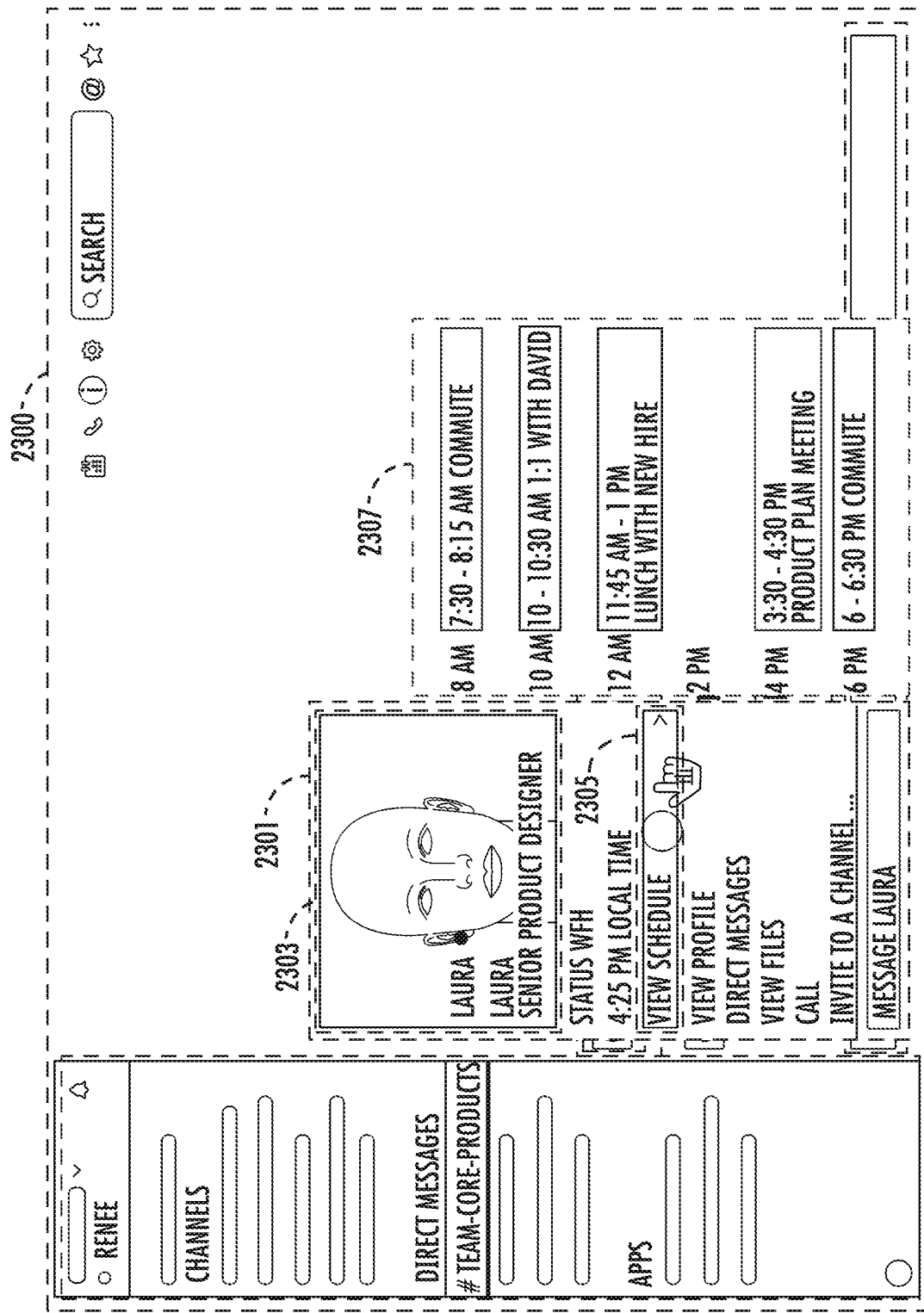
Figure 24:
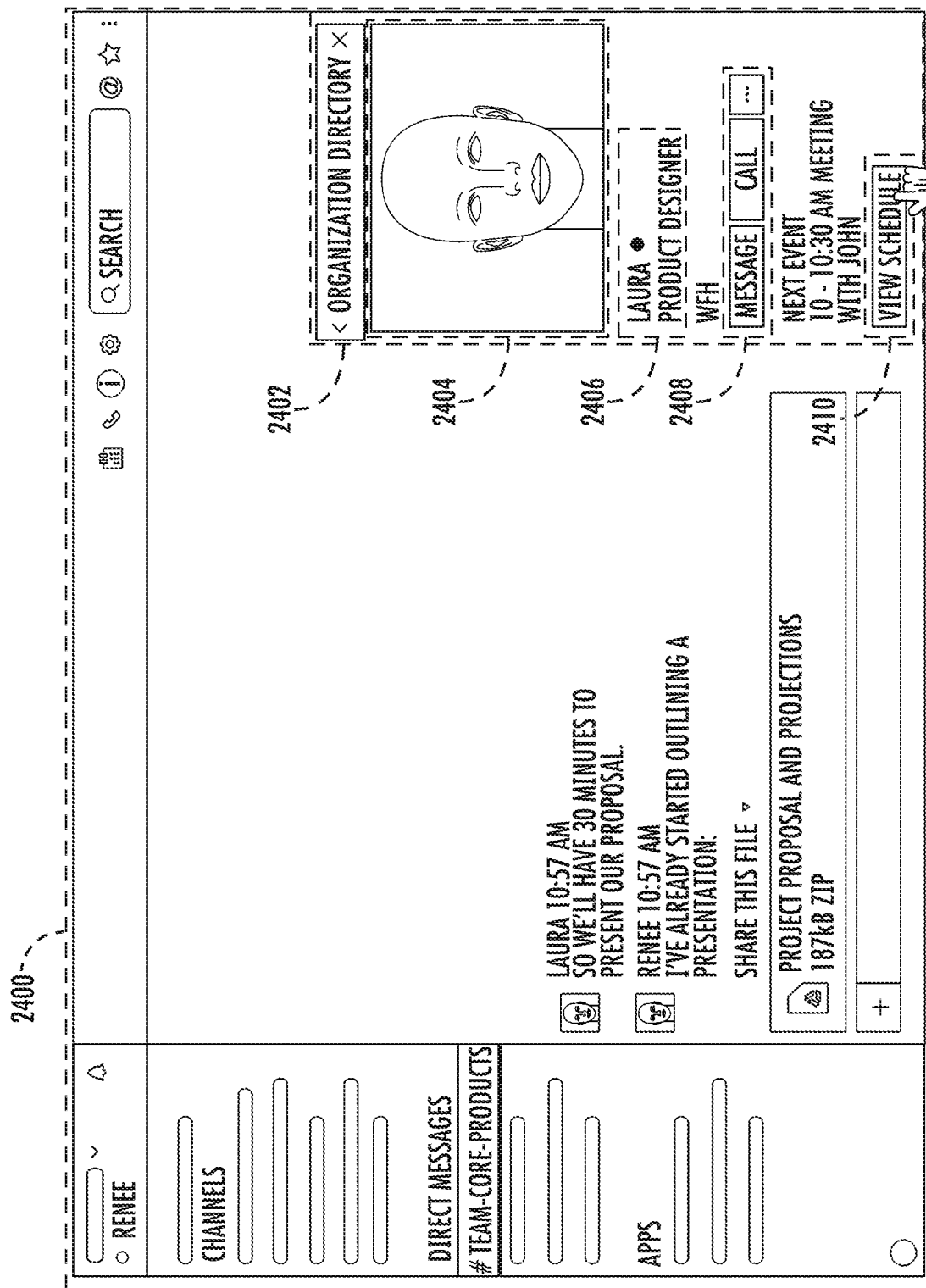
Figure 25:
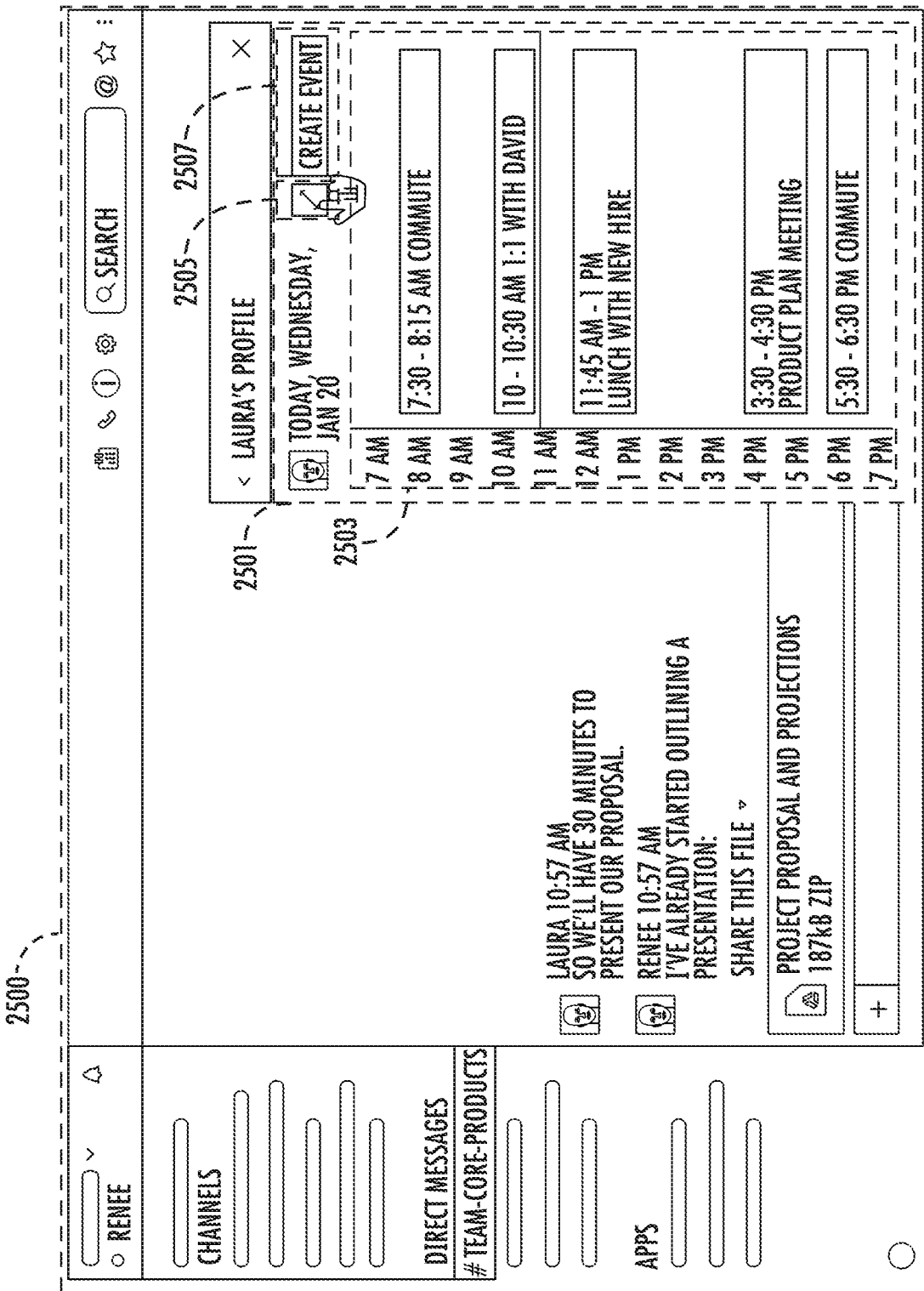
Figure 26:
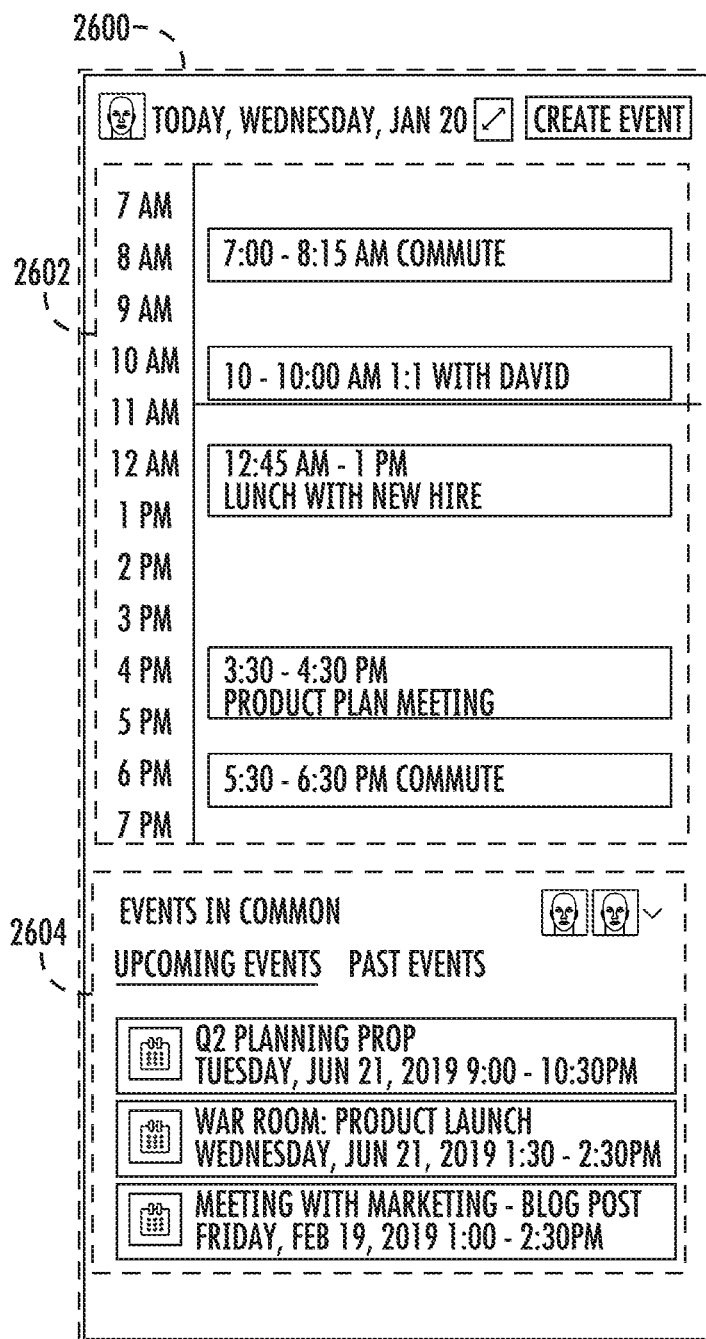
Figure 27:
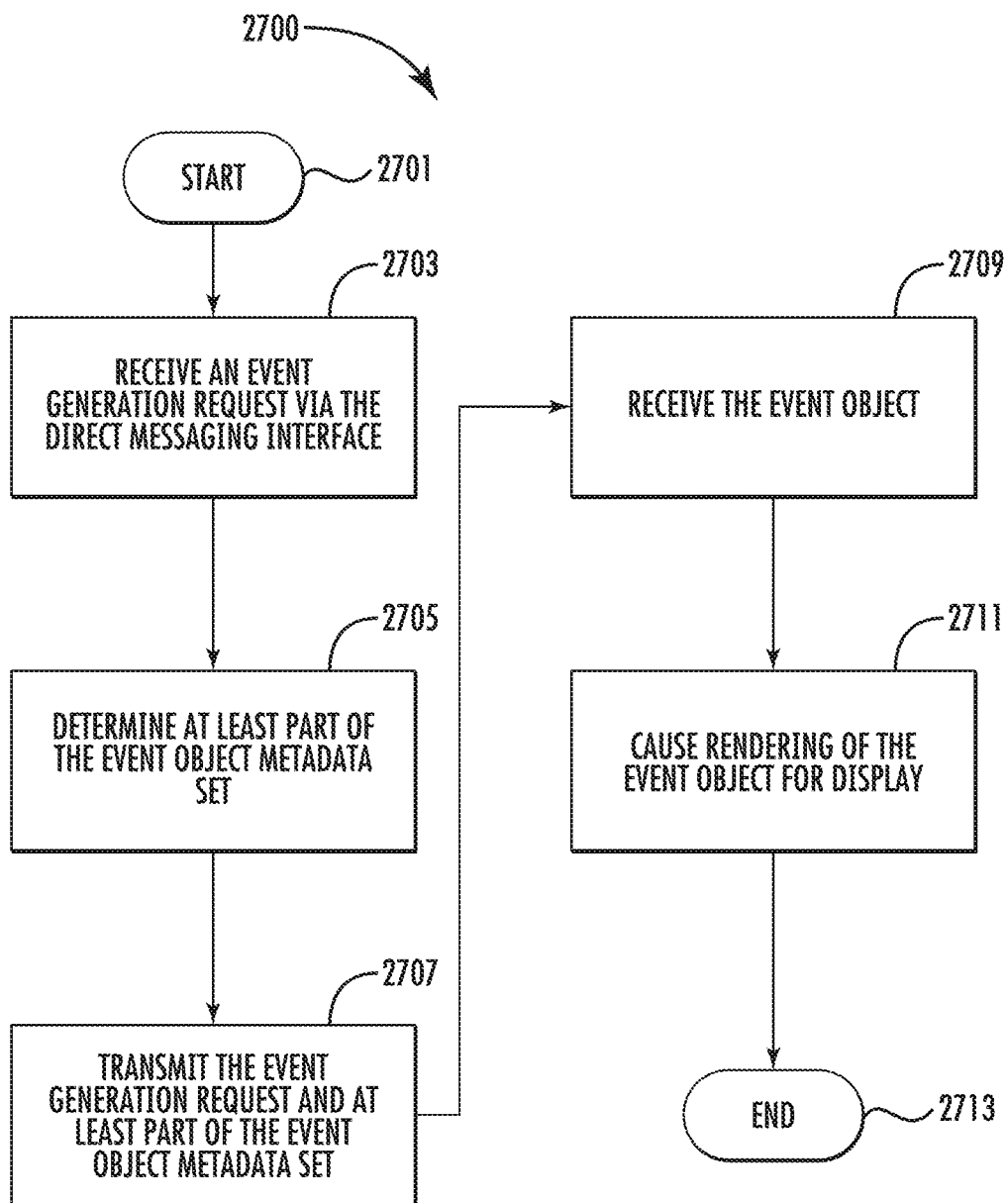
Figure 28:
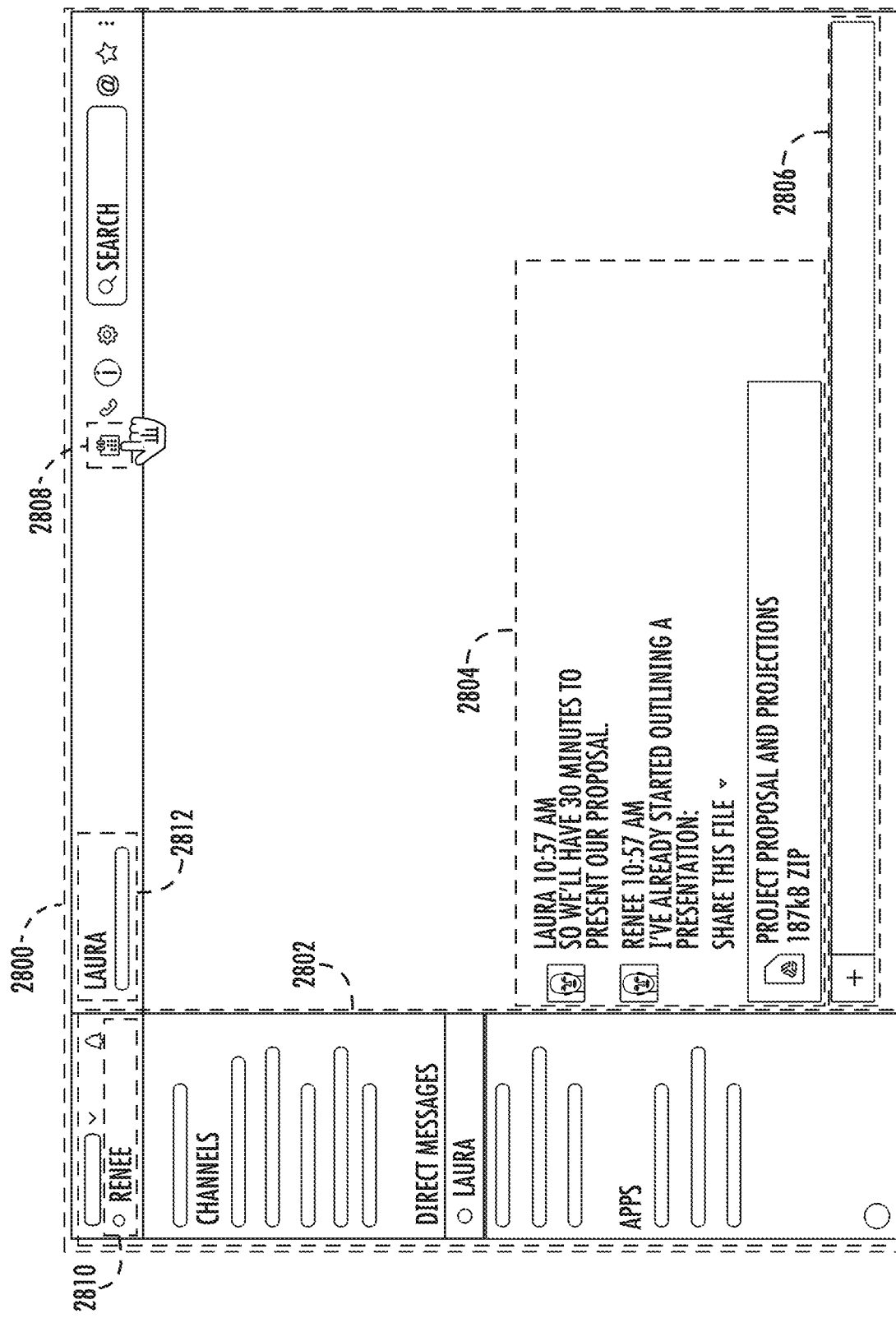
Figure 29:
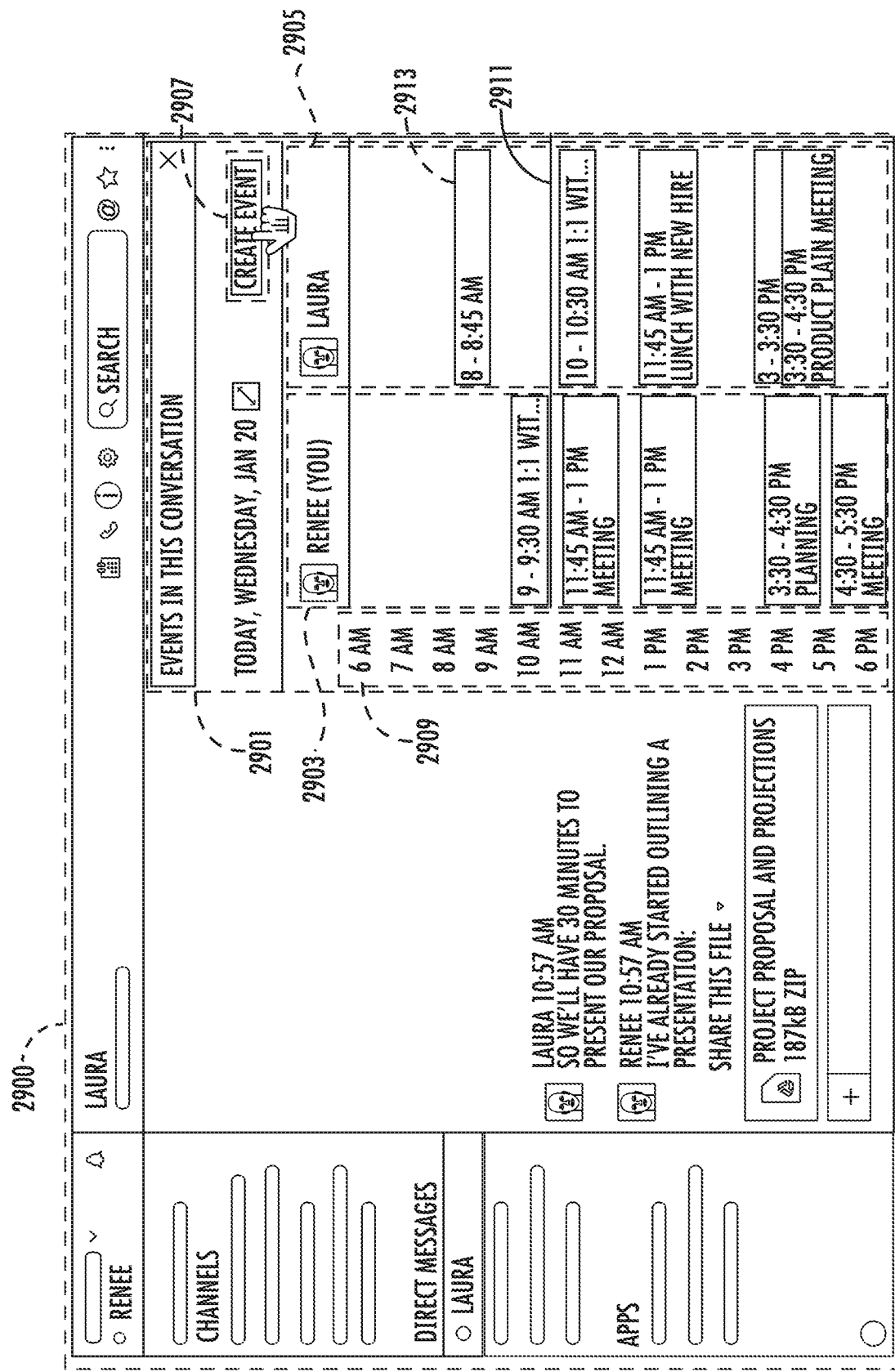
Figure 30:
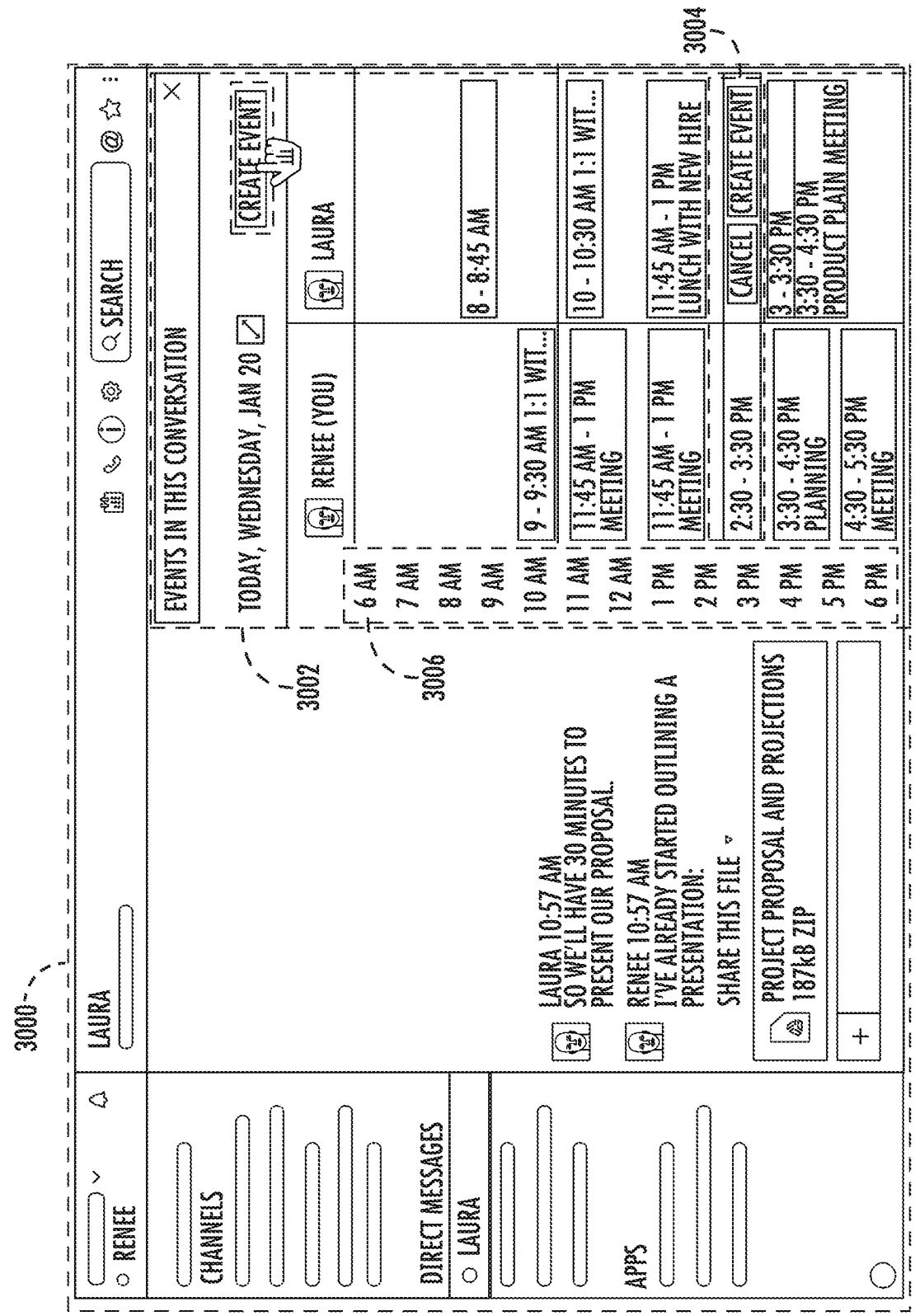
Figure 31:
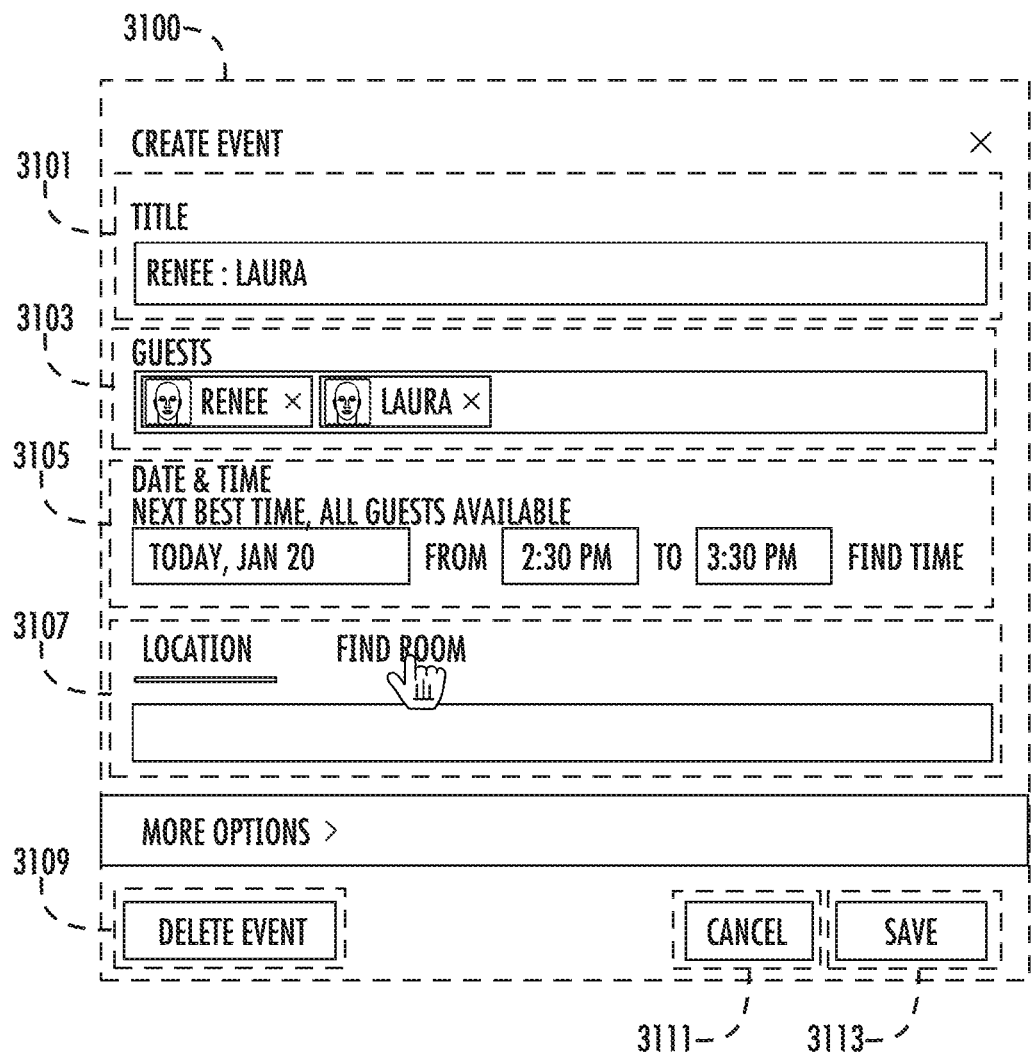
Figure 33:
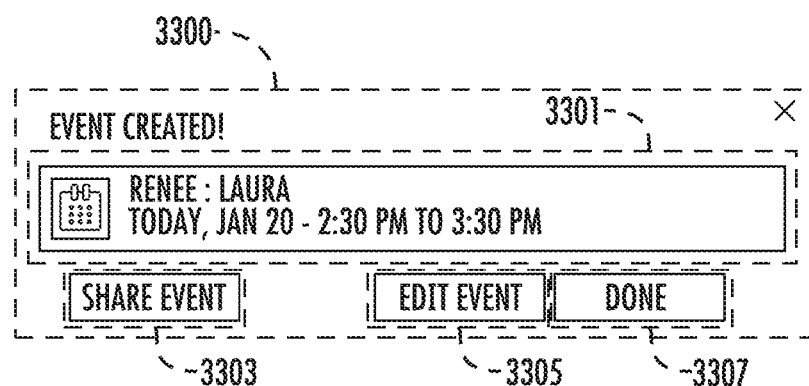
Figure 34:
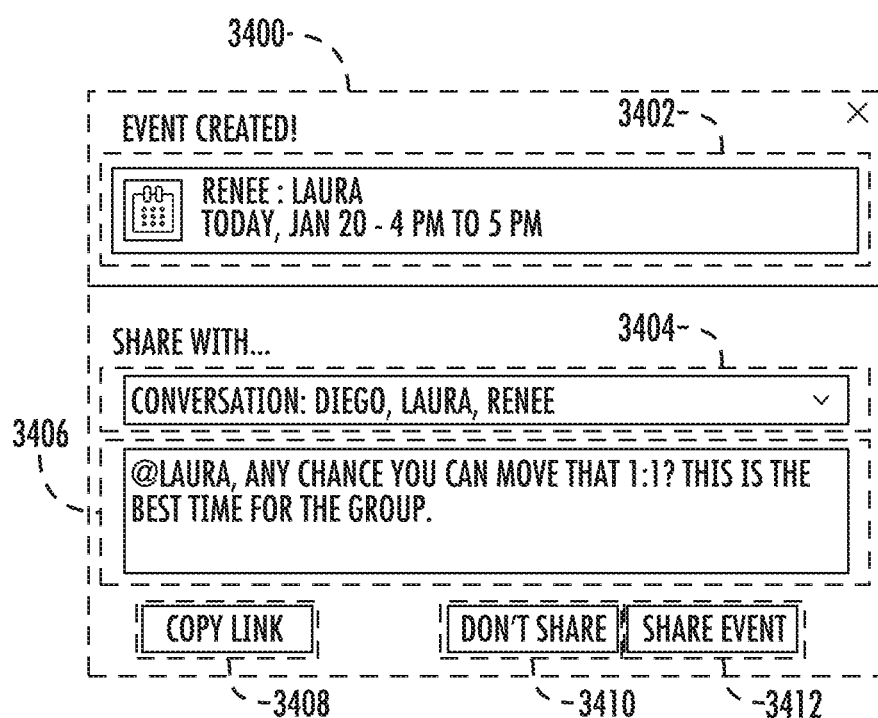
Figure 35:
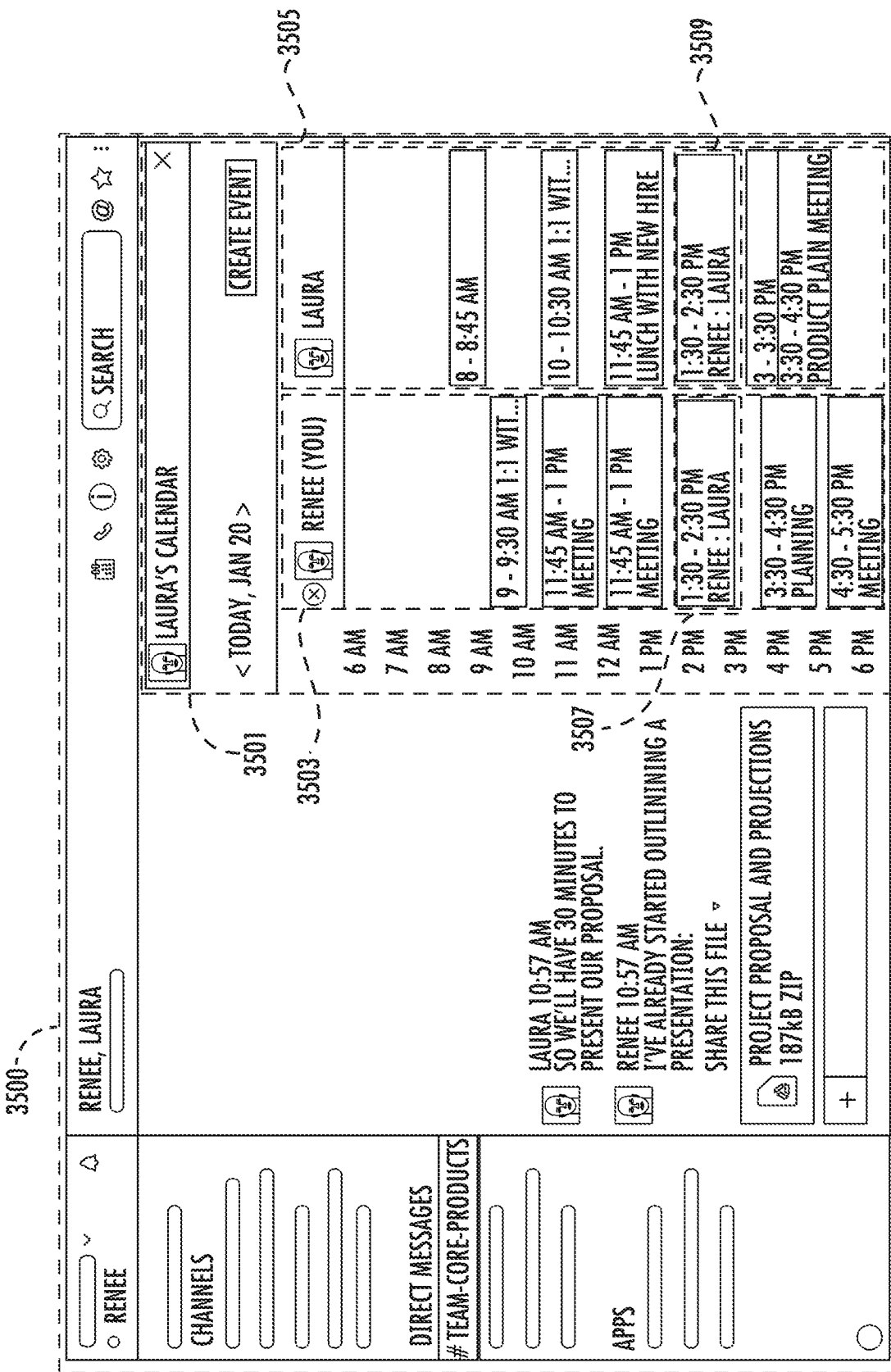
Figure 36:
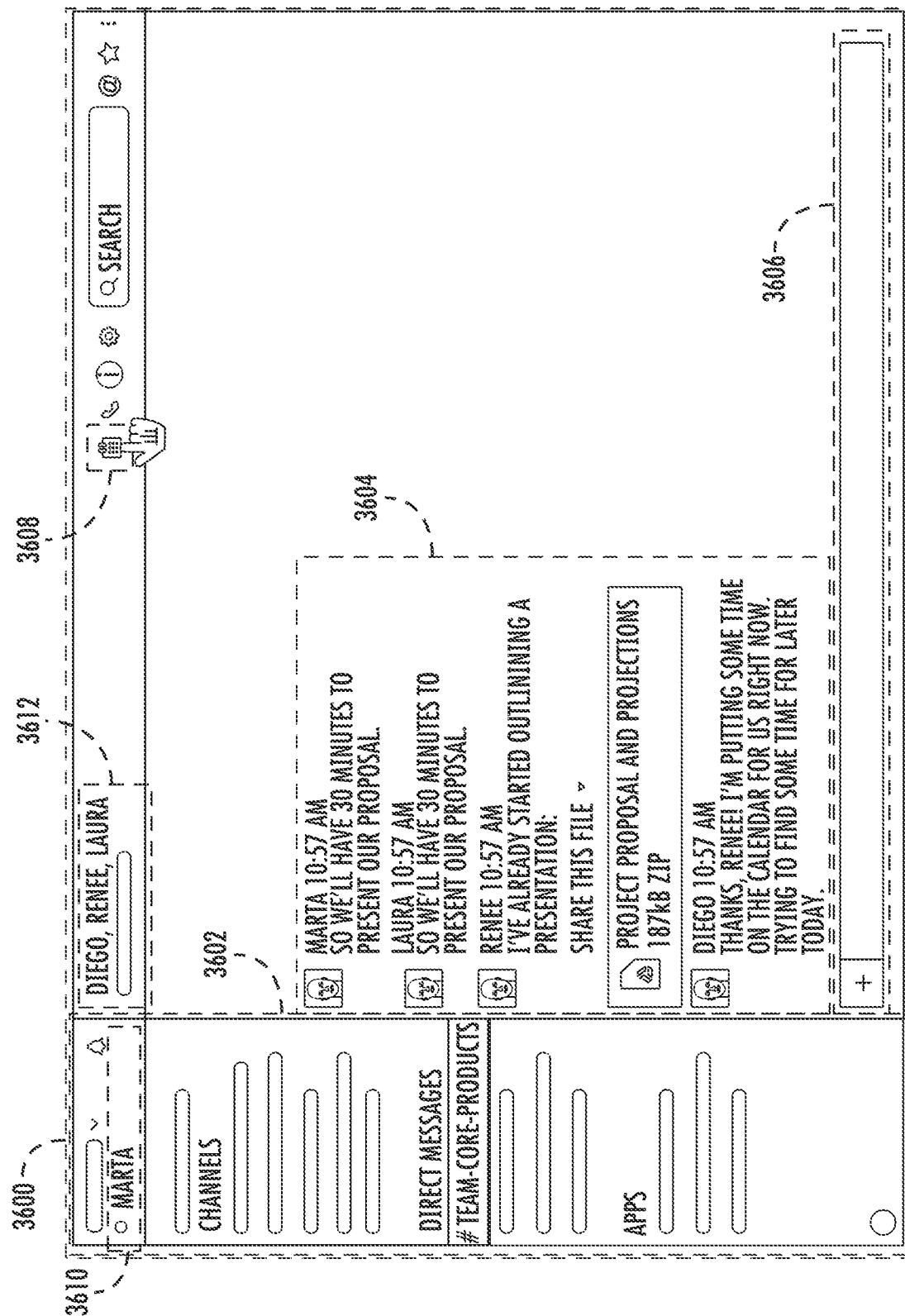
Figure 37:
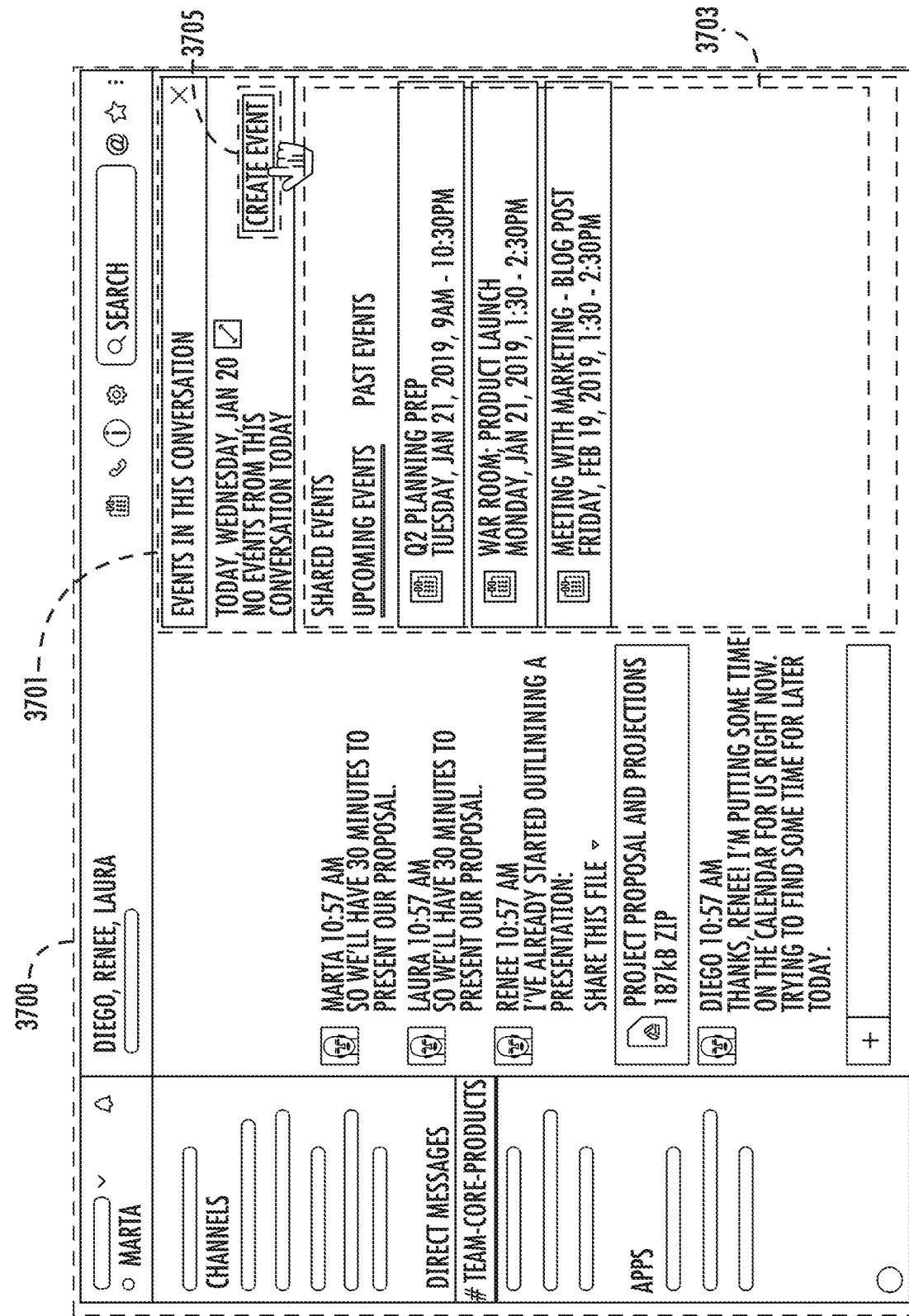
Figure 38:
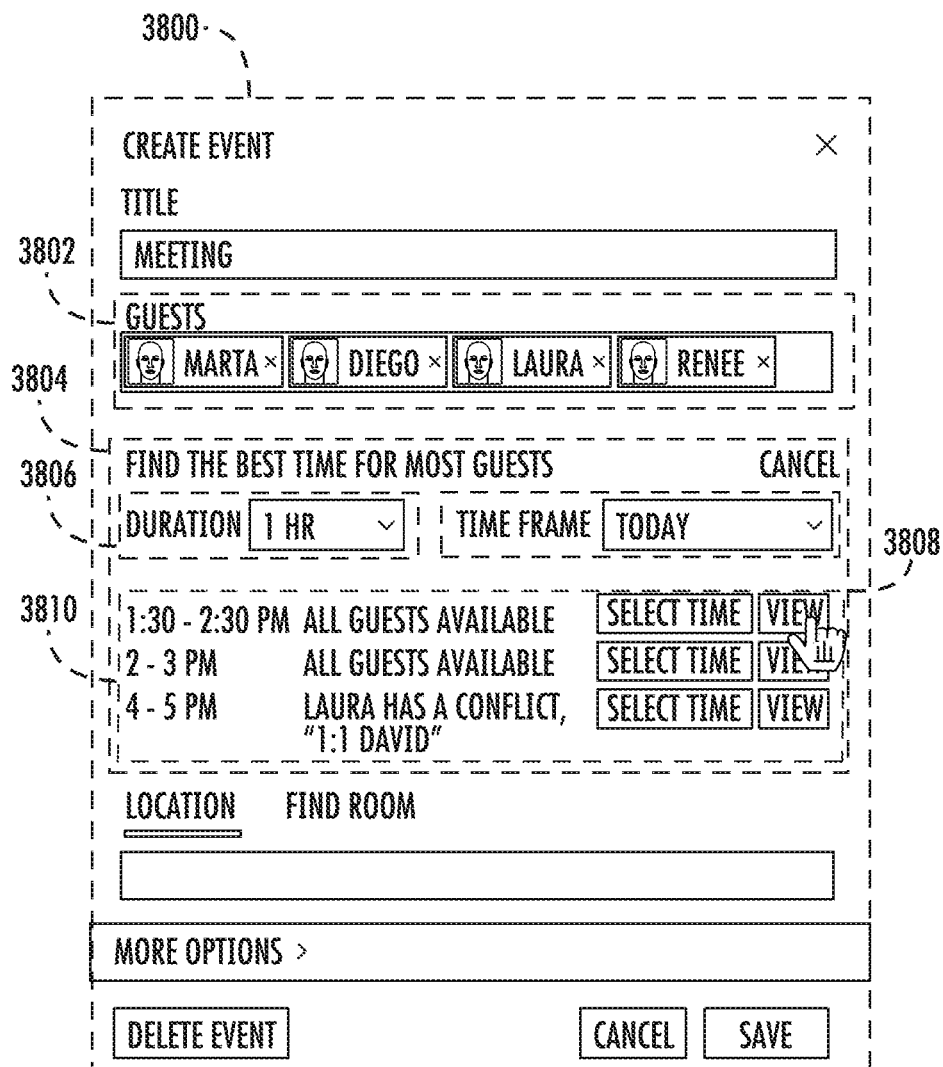
Figure 39:
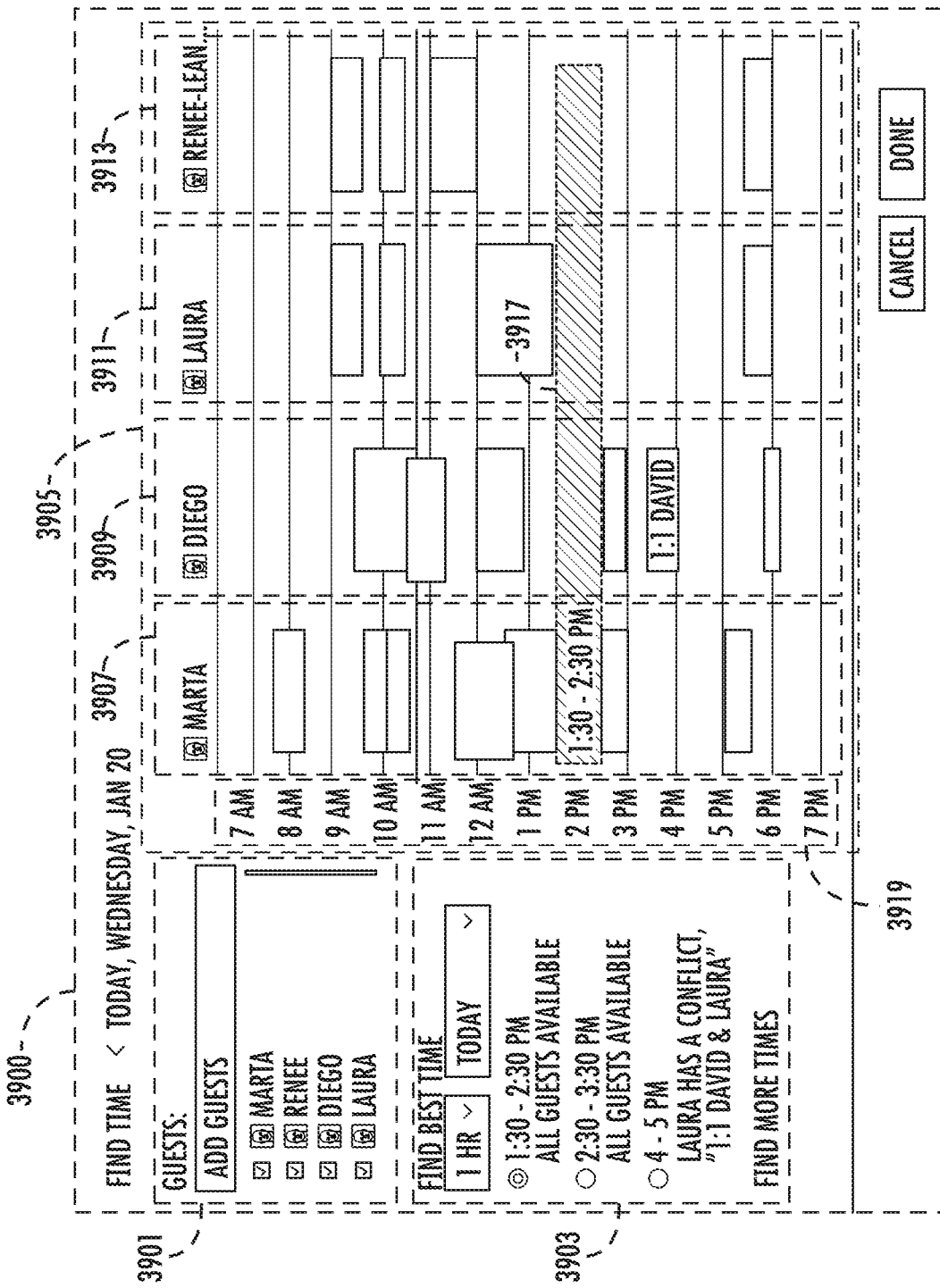
Figure 41:
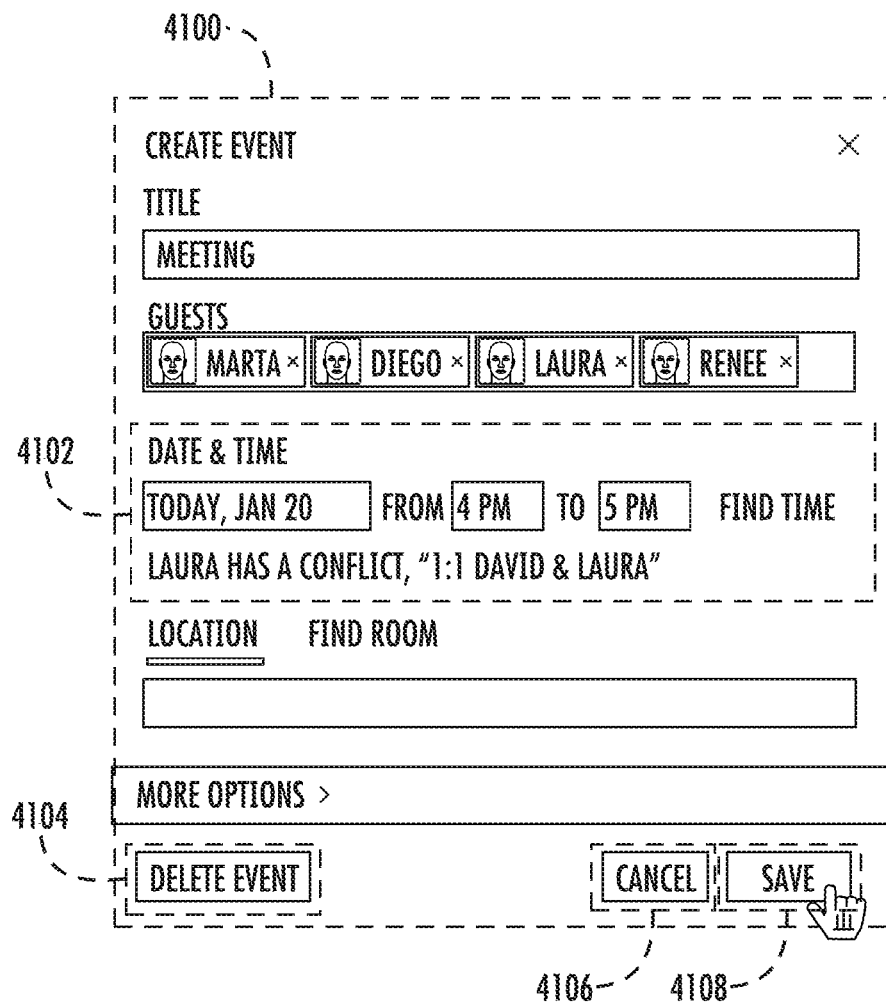
Figure 42:
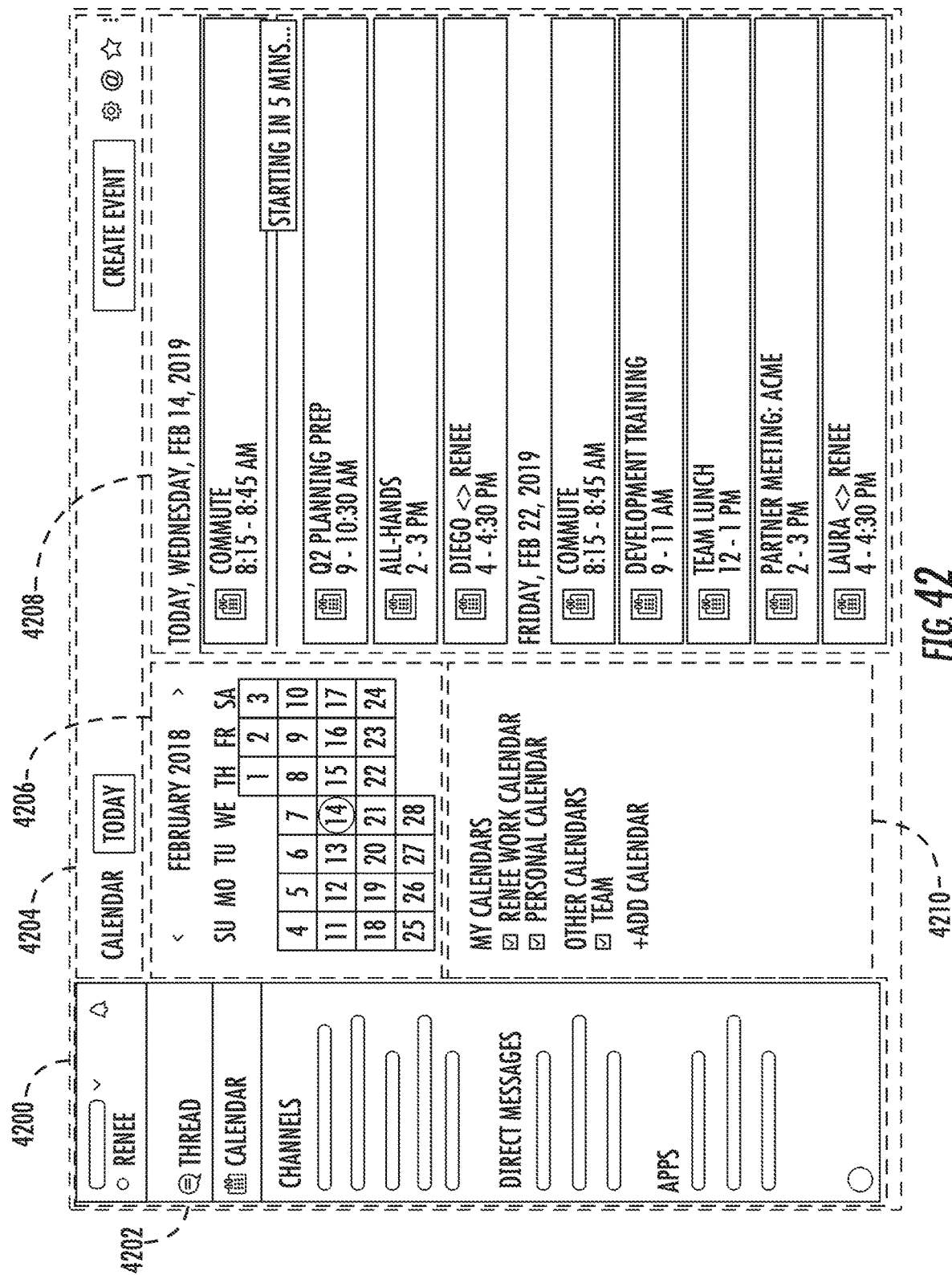
Figure 43:
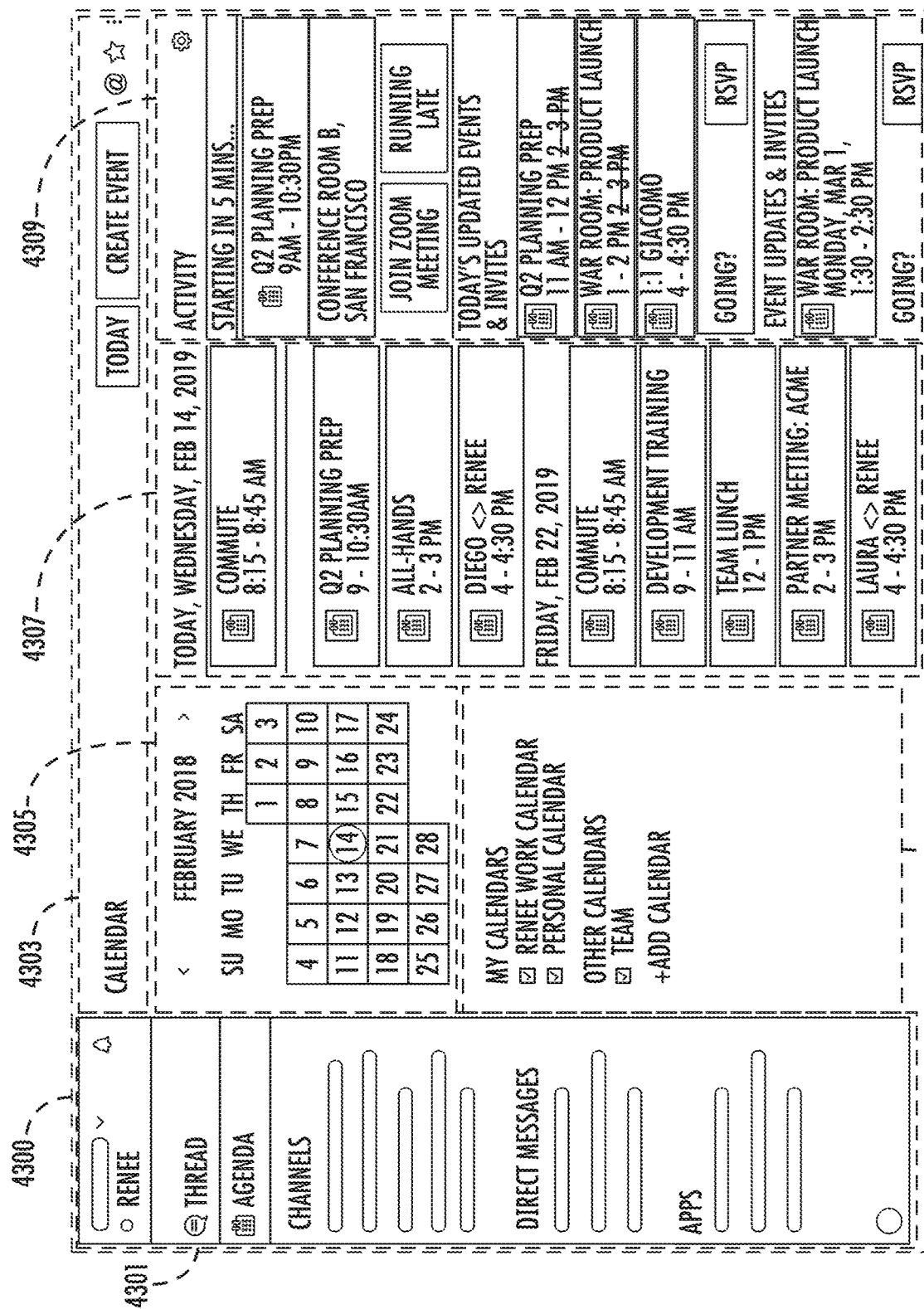
Figure 44:
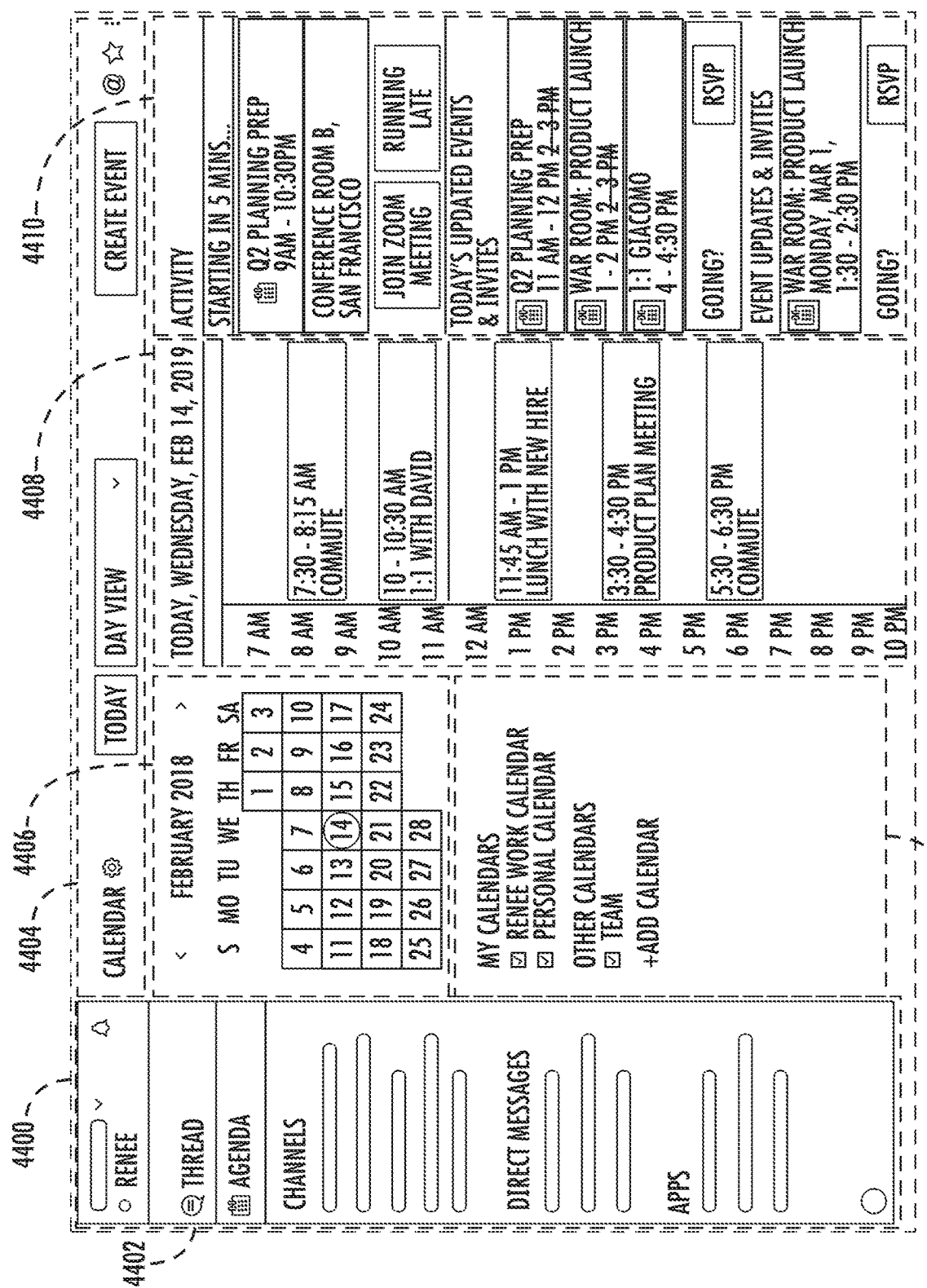
Figure 45:
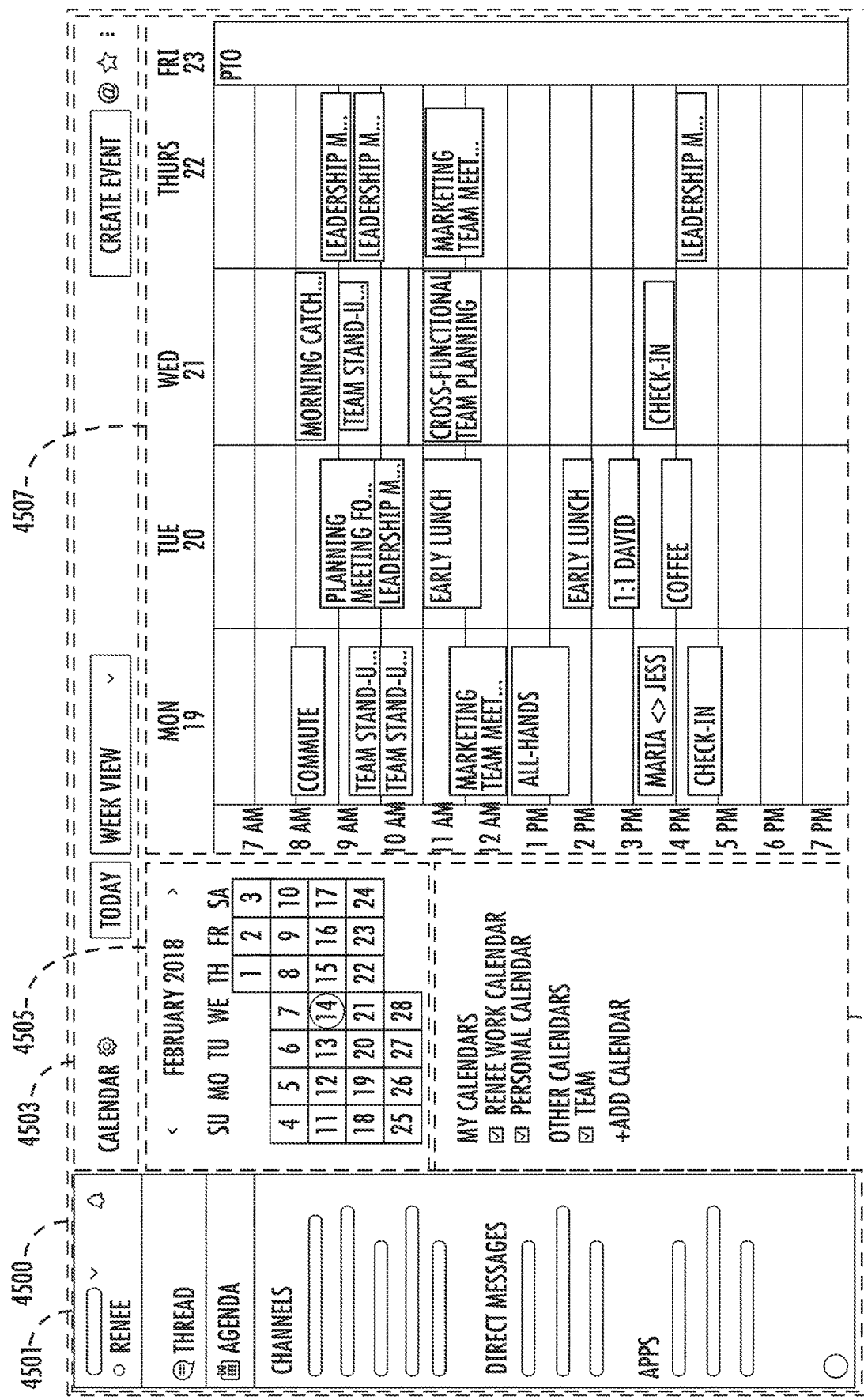

Having thus described some embodiments in general terms, references will now be made to the accompanying drawings, which are not necessarily drawn to scale, and wherein:

FIG. 1 is an example diagram illustrating example data objects in accordance with some embodiments of the present disclosure;

FIG. 2 is an example diagram illustrating example data objects in accordance with some embodiments of the present disclosure;

FIG. 3 is an example system architecture diagram illustrating an example group-based communication system in communication with other devices in accordance with some embodiments of the present disclosure;

FIG. 4 is an example infrastructure diagram illustrating an example apparatus in accordance with some embodiments of the present disclosure;

FIG. 5 is an example flowchart illustrating an example method in accordance with some embodiments of the present disclosure;

FIG. 6 is an example flowchart illustrating an example method in accordance with some embodiments of the present disclosure;

FIG. 7 illustrates various elements of an example user interface in accordance with some embodiments of the present disclosure;

FIG. 8 illustrates various elements of an example user interface in accordance with some embodiments of the present disclosure;

FIG. 9 illustrates various elements of an example user interface in accordance with some embodiments of the present disclosure;

FIG. 10 illustrates various elements of an example user interface in accordance with some embodiments of the present disclosure;

FIG. 11 illustrates various elements of an example user interface in accordance with some embodiments of the present disclosure;

FIG. 12 illustrates various elements of an example user interface in accordance with some embodiments of the present disclosure;

FIG. 13 illustrates various elements of an example user interface in accordance with some embodiments of the present disclosure;

FIG. 14 illustrates various elements of an example user interface in accordance with some embodiments of the present disclosure;

FIG. 15 illustrates various elements of an example user interface in accordance with some embodiments of the present disclosure;

FIG. 16 illustrates various elements of an example user interface in accordance with some embodiments of the present disclosure;

FIG. 17A illustrates various elements of an example user interface in accordance with some embodiments of the present disclosure;

FIG. 17B illustrates various elements of an example user interface in accordance with some embodiments of the present disclosure;

FIG. 18 illustrates various elements of an example user interface in accordance with some embodiments of the present disclosure;

FIG. 19 illustrates various elements of an example user interface in accordance with some embodiments of the present disclosure;

FIG. 20 illustrates various elements of an example user interface in accordance with some embodiments of the present disclosure;

FIG. 21 is an example flowchart illustrating an example method in accordance with some embodiments of the present disclosure;

FIG. 22 illustrates various elements of an example user interface in accordance with some embodiments of the present disclosure;

FIG. 23 illustrates various elements of an example user interface in accordance with some embodiments of the present disclosure;

FIG. 24 illustrates various elements of an example user interface in accordance with some embodiments of the present disclosure;

FIG. 25 illustrates various elements of an example user interface in accordance with some embodiments of the present disclosure;

FIG. 26 illustrates various elements of an example user interface in accordance with some embodiments of the present disclosure;

FIG. 27 is an example flowchart illustrating an example method in accordance with some embodiments of the present disclosure;

FIG. 28 illustrates various elements of an example user interface in accordance with some embodiments of the present disclosure;

FIG. 29 illustrates various elements of an example user interface in accordance with some embodiments of the present disclosure;

FIG. 30 illustrates various elements of an example user interface in accordance with some embodiments of the present disclosure;

FIG. 31 illustrates various elements of an example user interface in accordance with some embodiments of the present disclosure;

Figure 32:
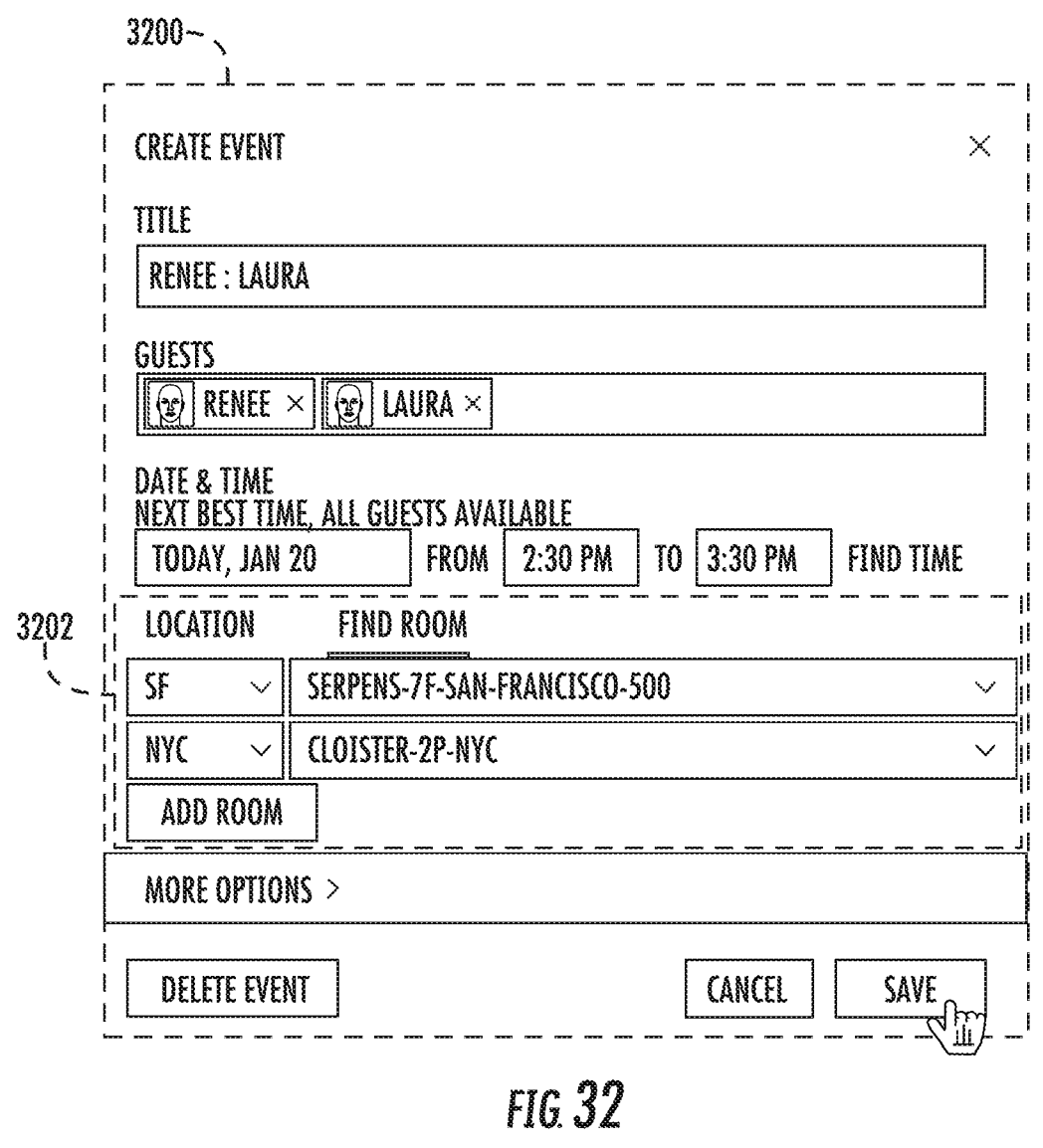

FIG. 32 illustrates various elements of an example user interface in accordance with some embodiments of the present disclosure;

FIG. 33 illustrates various elements of an example user interface in accordance with some embodiments of the present disclosure;

FIG. 34 illustrates various elements of an example user interface in accordance with some embodiments of the present disclosure;

FIG. 35 illustrates various elements of an example user interface in accordance with some embodiments of the present disclosure;

FIG. 36 illustrates various elements of an example user interface in accordance with some embodiments of the present disclosure;

FIG. 37 illustrates various elements of an example user interface in accordance with some embodiments of the present disclosure;

FIG. 38 illustrates various elements of an example user interface in accordance with some embodiments of the present disclosure;

FIG. 39 illustrates various elements of an example user interface in accordance with some embodiments of the present disclosure;

FIG. 40 illustrates various elements of an example user interface in accordance with some embodiments of the present disclosure;

FIG. 41 illustrates various elements of an example user interface in accordance with some embodiments of the present disclosure;

FIG. 42 illustrates various elements of an example user interface in accordance with some embodiments of the present disclosure;

FIG. 43 illustrates various elements of an example user interface in accordance with some embodiments of the present disclosure;

FIG. 44 illustrates various elements of an example user interface in accordance with some embodiments of the present disclosure; and FIG. 45 illustrates various elements of an example user interface in accordance with some embodiments of the present disclosure.

DETAILED DESCRIPTION OF VARIOUS EMBODIMENTS

Various embodiments of the present disclosure are described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The term "comprising" means "including but not limited to," and should be interpreted in the manner it is typically used in the patent context. Use of broader terms such as "comprises," "includes," and "having" should be understood to provide support for narrower terms such as "consisting of," "consisting essentially of," and "comprised substantially of."

The phrases "in one embodiment," "according to one embodiment," and the like generally mean that the particular feature, structure, or characteristic following the phrase may be included in an embodiment of the present disclosure, and may be included in more than one embodiment of the present disclosure (importantly, such phrases do not necessarily refer to the same embodiment).

Overview

Various embodiments of the present disclosure relate generally to sharing and modifying electronic calendars and calendar events in network systems. More specifically, various embodiments of the present disclosure are related to generating member calendars in a group-based communication system.

Challenges exist in providing and sharing calendar access privileges within a group of users. For example, if a user Tom uses calendar resource provided by Google® Calendar for his electronic calendar, many calendar services do not provide the technical capacity to allow other users who use different calendar resource(s) (such as those provided by Microsoft Office®) to access information associated with Tom's calendar (for example, Tom's availability information). As such, these calendar services increase redundancy in accessing calendars across different calendar services.

In addition, many calendar services fail to account for privacy settings of the events in generating an electronic calendar that is accessible by a group of users. For example, a calendar may be associated with private events and public events. When the calendar owner wants to provide access privileges to another user to access information related to the calendar, many calendar services fail to make a determination of whether the event is a public event or a private event, resulting in erroneous information sharing of the private events and causing violation of user privacy.

Further, many calendar services fail to provide information regarding user calendars in an easy to access way, resulting frictions in scheduling an event among a group of users. For example, many calendar services require a user to initiate electronic communication with other users to determine whether these users are available to join an event, resulting in computing resource waste, inefficiency, and network traffic congestion.

Moreover, many calendar services require a user to open a dedicated software application in order to access a calendar associated with one of the calendar services. For example, a user Tom may want to review and/or determine the availabilities of another user Susan while exchanging messages with her using a messaging software application. Many calendar services may require Tom to exit the messaging software application and open a calendar software application, causing unnecessary context switching as well as execution of an additional application that results in wasted computing resources.

In contrast, systems structured in accordance with various embodiments of the disclosure provide specific, technical solutions to these technical problems faced by calendar services. For example, various embodiments of the disclosure allow a member of a group-based communication system to share a calendar object to other members, even if the calendar object is stored in an external calendar resource different from the calendar service(s) used by other members. By doing so, the present disclosure reduces redundancy in sharing calendars, and reduces computing resource usage and network traffic congestion.

In addition, various embodiments of the present disclosure may determine whether to render an event object based on the visibility parameter of the event object metadata set. Further, various embodiments of the present disclosure may provide user interfaces that facilitate sharing of information associated with the calendar object to other members of the group-based communication system without the need for executing a separated software application.

As a result, various embodiments of the present disclosure reduce latency in calendar sharing, improve privacy protection, and reduce resource usage, details of which are described hereinafter.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like (sometimes referred to herein as a "network"). Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

In the present disclosure, the term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like.

"Group-based" is used herein to refer to a system, channel, message, or virtual environment that has security sufficient such that the system, channel, message, or virtual environment is accessible only to a defined group of users (e.g., users having a common group identifier associated with their respective user profiles). The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "group-based communication system" refers to a communications software platform and associated hardware that is configured to support and maintain a plurality of group-based communication interfaces and all associated functionality. Group-based communication system users are organized into organization groups (e.g., employees of different companies may be separate organization groups) and each group interacts with the platform via a respective group-based communication interface. For example, the group-based communication system might support, among others, a Slack Corporation group-based communication interface and an ACME Corporation group-based communication interface. Example group-based communication systems comprise supporting servers and client devices, and are further configured to engage external resources as defined below.

The term "group-based communication server" refers to a software platform and associated hardware that is configured to manage access to the various group-based communication interfaces (defined below) of the group-based communication system. The group-based communication server is configured to access, maintain, and support application product logic of the group-based communication system and to access one or more data repositories such as a group-based communication repository and a user identification repository.

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The term "user" should be understood to refer to an individual, group of individuals, business, organization, and the like. Users referred to herein are discussed largely in connection with client device enabled activity for accessing a group-based communication interface (or set of group-based communication interfaces) of a group-based communication system.

The terms "user profile," "user account," and "user account details" refer to data, files, and other information associated with a user, including, for example, a user identifier, one or more group-based communication channel identifiers (defined below) associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, a graphical representation, an email address, a real name (e.g., John Doe), a username (e.g., jdoe), a password, a time zone, an external resource user identifier, avatar rendering settings, and the like. The user account details can include a subset designation of user credentials, such as, for example, login information for the user including the user's username and password.

In the present disclosure, the term "user identifier" refers to an identifier that uniquely identifies information stored in a group-based communication system that is related to a user or member. Information related to a user or member may be stored in a "member profile," "user account," or "user account details," which may include one or more group-based communication channel identifiers associated with group-based communication channels that the user has been granted access privileges to, one or more group identifiers for groups that the user has been granted access privileges to, an indication as to whether the user is an owner of any group-based communication channels, an indication as to whether the user has any group-based communication channel restrictions, a plurality of messages, a plurality of emoji, a plurality of conversations, a plurality of conversation topics, an avatar, an email address, a real name (e.g., John Doe), a username (e.g., jdoe), a password, a time zone, a status, and the like. The user account details can include a subset designation of user credentials, such as, for example, login information for the user including the user's username and password.

In the present disclosure, the term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

Group-based communication system users are organized into organization groups (e.g., employees of each company may be a separate organization group) and each organization group may have one or more group-based communication channels to which users may be assigned or which the users may join (e.g., group-based communication channels may represent departments, geographic locations such as offices, product lines, user interests, topics, issues, and/or the like). A group identifier is used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The terms "group-based communication channel identifier" or "channel identifier" refer to one or more items of data by which a group-based communication channel may be uniquely identified by a group-based communication system. For example, a group-based communication channel identifier may comprise American Standard Code for Information Interchange (ASCII) text, a pointer, a memory address, and the like.

The terms "group identifier" or "team identifier" refer to one or more items of data by which a group within a group-based communication system may be uniquely identified. For example, a group identifier may comprise ASCII text, a pointer, a memory address, and the like. In one embodiment, the group identifier associated with member users of a Slack Corporation workspace (i.e., a group-based communication interface) is 104356721.

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

In the present disclosure, the terms "electronic message," "messaging communication," or "message" refer to electronically generated data object provided by a user using a client device and that is configured for display within a group-based communication channel. Message communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication or data object. Each message sent or posted to (i.e., transmitted for rendering within an interface of) a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like. For example, the following is an example programming code describing an electronic message, substantially in the form of a (Secure) Hypertext Transfer Protocol ("HTTP(S)") POST message including eXtensible Markup Language ("XML") formatted data:

```
POST /authrequest.php HTTP/1.1
Host: www.server.com
Content-Type: Application/XML
Content-Length: 667
<?XML version= "1.0" encoding = "UTF-8"?> <auth_request>
<timestamp>2020-12-31 23:59:59</timestamp>
<user_accounts_details>
    <user_account_credentials>
        <user_name> ID_user_I </user_name>
        <password> abc 123 </password>
        //OPTIONAL <cookie>cookieID</cookie> //OPTIONAL
<digital_cert_link>www.mydigitalcertificate.com/
```

```
JohnDoeDaDoeDoe@gmail.com/mycertifcate.dc</digital_cert_link>
        //OPTIONAL
<digital_certificate> _DATA_ </digital_certificate>
    </user_account_credentials>
</user_accounts_details>
<client_details> //iOS Client with App and Webkit
    <client_IP> 10.0.0.123 </client_IP>
    <user_agent_string>Mozilla/5.0 (iPhone; CPU iPhone OS 7 1 1 like
Mac OS X) AppleWebKit/537.51.2 (KHTML, like Gecko) Version/7 .0
Mobile/11D201 Safari/9537 .53 </user_agent_string>
    <client_product_type>iPhone6, 1 </client_product_type>
    <client_serial_number>DNXXXIXIXXXX </client_serial
_number>
    <client_ UDID> 3XXXXXXXXXXXXXXXXXXXXXXX
XD</client_UDID>
    <client_ OS >iOS </client_ OS>
    <client OS version>7.1.1 </client_OS_version>
    <client_app_type>app with webkit</client_app_type>
    <app_installed_flag>true</app_installed_flag>
    <app_name> MSM.app</app_name>
    <app_ version> 1.0 </app_ version>
    <app_ webkit_name> Mobile Safari</client_ webkit_name>
    <client_ version>537 .51.2</client_ version>
</client_details>
<client_details> //iOS Client with Webbrowser
    <client_IP> 10.0.0.123 </client_IP>
    <user_agent_string>Mozilla/5.0 (iPhone; CPU iPhone OS
7 1 1 like Mac OS X) AppleWebKit/537.51.2 (KHTML, like
Gecko) Version/7 .0 Mobile/11D201
Safari/9537 .53 </user_agent_string>
    <client_product_type>iPhone6, 1 </client_product_type>
    <client_serial_number>DNXXXIXIXXXX </client_serial
_number>
    <client_ UDID> 3XXXXXXXXXXXXXXXXXXXXXXX
XD</client_UDID>
    <client_ OS >iOS </client_ OS>
    <client OS version>7.1.1 </client_OS_version>
    <client_app_type>web browser</client_app_type>
    <client_name> Mobile Safari </client_name>
    <client_ version>9537 .53 </client_ version>
</client_details>
<client_details> //Android Client with Webbrowser
    <client_IP> 10.0.0.123 </client_IP>
    <user_agent_string>Mozilla/5.0 (Linux; U; Android 4.0.4;
en-us; Nexus S Build/IMM76D) AppleWebKit/534.30 (KHTML,
like Gecko) Version/4.0 Mobile Safari/534.30</user_agent_string>
    <client_product_type> Nexus S </client_product_type>
    <client_serial_number> YXXXXXXXXZ</client_serial_number>
    <client_ UDID> FXXXXXXXXX-XXXX-XXXX-XXXX-
XXXXXXXXXXXXX </client_UDID>
    <client_ OS> Android </client_ OS>
    <client_OS_ version>4.0.4</client_OS_ version>
    <client_app_type>web browser</client_app_type>
    <client_name> Mobile Safari </client_name>
    <client_ version>534.30</client_ version>
</client_details>
<client_details> //Mac Desktop with Webbrowse
    <client_IP> 10.0.0.123 </client_IP>
    <user_agent_string>Mozilla/5.0 (Macintosh; Intel Mac OS
X 10_9_3) AppleWebKit/537.75.14 (KHTML, like Gecko)
Version/7 .0.3 Safari/537 .75.14</user_agent_string>
    <client_product_type> MacPro5, 1 </client_product_type>
<client_serial_number> YXXXXXXXXZ</client_serial_number>
    <client_ UDID> FXXXXXXXXX-XXXX-XXXX-XXXX-
XXXXXXXXXXXXX </client_UDID>
    <client_ OS> Mac OS X </client_ OS>
    <client_ OS_ version> 10. 9 .3 </client_ OS_ version>
    <client_app_type>web browser</client_app_type>
    <client_name> Mobile Safari </client_name>
    <client_ version>537 .75.14</client_ version>
</client_details>
<message>
    <sender_identifier>5541263684</sender_identifier>
    <message_identifier> ID _message_I 0</message_identifier >
    team_identifier> ID _team_I </team_identifier>
    <channel_identifier> ID _channel_I </channel_identifier>
    <contents>That is an interesting invention. I have attached
a copy of our patent policy. </contents>
    < attachments >patent_policy. pdf </attachments>
    <reaction>
        <sender_identifier>5541263684</sender_identifier>
        <reaction_identifier> 54 22 </reaction_identifier>
    </reaction>
</message>
</auth_request>
```

In the present disclosure, the terms "direct messaging," "direct messaging exchange," or "direct message" refer to private electronic message exchange between two or more users of the group-based communication system.

In the present disclosure, the term "data object" refers to a data structure that represents one or more functionalities and characteristics. For example, a "calendar object" is a data structure that represents an electronic calendar, and an "event object" is a data structure that represents an event. An event object may be associated with one or more calendar objects. Other data objects may include a "document object" (represents a computer file), a "workplace object" (describes the physical work environment (such as conference rooms in an office building) associated with the group-based communication system and/or the client devices in communication with the group-based communication system).

Each data object may contain a value or a group of values. Such values may include, for example, a "metadata" associated with the data object. The term "metadata" refers to a parameter that comprises an attribute of the data object. The term "metadata set" refers to a collective repository of metadata associated with the data object. For example, a calendar object may include a "calendar object metadata set," which may include parameters such as title parameter, owner parameter, privacy parameter, etc. As another example, an event object may include an "event object metadata set," and may include parameters such as title parameter, time parameter, location parameter, invitee parameter, visibility parameter, availability parameter, and calendar parameter, details of which are described hereinafter.

Referring now to FIG. 1, an example calendar object 100 in accordance with example embodiments of the present disclosure is illustrated. As describe above, a calendar object represents an electronic calendar. As shown in FIG. 1, the calendar object 100 may include a calendar object metadata set 101, and the calendar object metadata set 101 may include, for example, a title parameter 103, an owner parameter 105, and a privacy parameter 107.

The title parameter 103 may be, for example, a text string that describes the title associated with the calendar (for example, "work calendar"). The owner parameter 105 may be, for example, a string of ASCII characters that identifies the owner of the calendar object (for example, a member of the group-based communication system). The privacy parameter 107 may comprise electronic indication(s) on, for example, whether the calendar object 100 represents a private calendar that is only accessible by the owner of the calendar object, or a public calendar that is accessible by member(s) who are not the owner of the calendar object.

Further, the calendar object 100 may be connected with one or more event objects, such as event objects 200A, 200B, and 200C as shown in FIG. 1. Each of the event objects represents an event that is associated with the electronic calendar corresponding to the calendar object 100. For example, if the calendar object 100 represents a user's work calendar, the event objects 200A, 200B, and 200C may represent telephone conferences, meetings, and/or deadlines that are on the user's work calendar.

In the present disclosure, the term "member calendar" refers to a calendar object that is accessible by other members of a group-based communication system (in other words, "shared" with members of the group-based communication system). In particular, a member of the group-based communication system may be authorized to view another member's member calendar, but are not authorized to edit or delete the member calendar. In some examples, the member calendar may be generated by an external calendar resource. In some examples, the member calendar may be generated by the group-based communication system. In accordance with various embodiments, the member calendar may be rendered for display via a user interface associated with the group-based communication system. Example methods, apparatus, and systems for generating and displaying a member calendar are provided in detail in the present disclosure.

Referring now to FIG. 2, an example event object 200 in accordance with example embodiments of the present disclosure is illustrated. As shown in FIG. 2, the event object 200 may include an event object metadata set 201. The event object metadata set 201 may include a title parameter 203, a time parameter 205, a location parameter 207, an invitee parameter 209, a visibility parameter 211, an availability parameter 213, and a calendar parameter 215.

The title parameter 203 may be a text string that describes the title associated with the calendar event (for example, "product release conference"). The time parameter 205 may describe the date, starting time and ending time associated with the calendar event (for example, "2 p.m. to 3 p.m. on Jan. 2, 2019"). In various embodiments, the time parameter 205 is a digital representation of the network system time. In various embodiments of the present disclosure, a server circuitry may execute the following programming code to obtain the time parameter 205 of the event object metadata set 201 of the event object 200:

```
message LocalDate
  int32 year;
  int32 month
}
message DateTime
  oneof value {
    int64 date_time; II epoch seconds
    LocalDate date; II all-day
  }
}
```

The location parameter 207 describes the location associated with the calendar event (for example, "Conference Room A"). The invitee parameter 209 may comprise user identifier(s) of user(s) (for example, members of the group-based communication channel) who are invited to the calendar event, as well as electronic indications on their responses to the invitation (e.g. accepting or declining of the event invitation). Additionally or alternatively, in some examples, the invitee parameter 209 may comprise email addresses associated with the users who are invited to the calendar event. Additionally or alternatively, in some examples, the invitee parameter 209 may comprise user identifiers in the group-based communication system based on the email addresses associated with users who are invited to the calendar event.

In various embodiments of the present disclosure, a server circuitry may execute the following programming code to obtain the invitee parameter 209 of the event object metadata set 201 of the event object 200:

```
message Attendee {
  string email;
  string name;
  // whether the attendee is expected to respond to this invite bool is_rsvp_requested;
  AttendeeRole ; II attendee's role in meeting
  Attendeestatus status; II attendee's current reply to the invite
  AttendeeType type; II attendee type
}
enum AttendeeRole {
  REQUIRED = O;
  OPTIONAL= 1;
  CHAIR=2;
  NONPARTICIPANT= 3; }
enum AttendeeStatus
{ NEEDS_ACTION = O;
  ACCEPTED = 1;
  DECLINED = 2;
  TENTATIVE= 3;
  DELEGATED= 4;
}
enum AttendeeType {
  INDIVIDUAL= O;
  GROUP= 1;
  RESOURCE = 2;
  ROOM=3; UNKNOWN=4;
}
```

The event object metadata set 201 may also include a visibility parameter 211 that shows whether details of the event object 200 (such as, but not limited to, the title parameter 203, the time parameter 205, the location parameter 207, and the invitee parameter 209) are accessible to other member(s) in the group-based communication system. For example, the visibility parameter 211 may include an electronic indication on whether to render details of the event object 200 for display. Example implementations of the visibility parameter 211 is described further in connection with FIG. 6 below.

The event object metadata set 201 may also include an availability parameter 213 that shows the availability of the event object's owner during the calendar event. For example, the availability parameter 213 may comprise a text string (e.g. "busy" or "free"). If the availability parameter 213 shows "busy," it indicates that the owner of the corresponding event object is not available to join other events during the time period specified by the time parameter 205. If the availability parameter 213 shows "free," it indicates that the owner of the corresponding event object is available to join other events during the time period as specified by the time parameter 205.

The event object metadata set 201 may also include a calendar parameter 215, which shows the calendar object(s) that the event object 200 is associated with. For example, referring back to FIG. 1, the calendar parameters may be in the form of ASCII characters that correspond to the calendar object 100 (for example, an identifier of the calendar object 100).

Alternatively or additionally, the event object metadata set 201 of the event object 200 may further include other parameters. For example, the event object metadata set 201 may include a details parameter. The details parameter may include a text string that describes the details of the event, such as but not limited to, the event agenda. The event object metadata set 201 may also include an owner parameter, which may be a text string that identifies the event creator.

As shown in FIG. 2, other data object(s) may be connected to the event object 200, including, for example, a call object 214, a document object 216, and a task object 218. The call object 214 may represent an audio or video conference call associated with the event object 200 (including, for example, a hyperlink to establish the connection to the conference call). The document object 216 may represent electronic documents associated with the event object 200. Such electronic documents may include, for example, call notes, transcripts, summary posts, documents shared by the members for the event, and video recordings from the event. The task object 218 may represent action items associated with the event object 200.

In various embodiments of the present disclosure, a data object may be generated in response to a "generation request," which is an electronic request for generating a data object. For example, a user operating a client device in communication with the group-based communication system may submit an event generation request to request generating an event object. Such event generation request may be in the form of an electronic message to a group-based communication channel. In some examples, the event generation request (and in some embodiments, together with event object metadata set) may be submitted to an external calendar resource. In the present disclosure, the term "an external calendar resource" refers to an electronic calendar service that is separated from the group-based communication system, as described below.

In various embodiments of the present disclosure, a data object may be caused to be rendered in a user interface in response to a "rendering request," which is an electronic request for rendering a data object for display. For example, a user operating a client device in communication with the group-based communication system may submit a calendar rendering request to request rendering of a calendar object. Such calendar rendering request may be in the form of, for example, an electronic message to a group-based communication channel.

In various embodiments of the present disclosure, a data object may be stored in a collective repository, such as a database or a server. For example, a calendar object generated by an external resource may be stored in a calendar object repository provided by or connected to the external resource. As another example, an event object generated by an external resource may be stored in an event object repository provided by or connected to the external resource.

The term "external resource" refers to a software program, application, platform, or service that is configured to communicate with the group-based communication system for providing an external service (i.e., not native to the group-based communication system) to a client device via a group-based communication interface. In some examples, an external resource may be an "external calendar resource," as described below. In some examples, an external resource may be an external email resource, as described below. In some examples, an external resource may be a "validated external resource," as described below.

An "external calendar resource" refers to a software program, application, platform, or service that is configured to provide electronic calendar services to users operating client devices. The external calendar resource may comprise, for example, a calendar client and a web calendar access protocol ("WCAP") server. The external calendar resource is configured to allow a user to create calendar objects and event objects. The external calendar resource operates on a compiled code base or repository that is separate and distinct from that which supports the group-based communication system. In some examples, the group-based communication system may subscribe to an application programming interface (API) of the external calendar resource that is configured to transmit one or more data objects as defined above. Example external calendar resources include, for example, Microsoft Office® and Google® Calendar.

As another example, the term "external email resource" refers to a software program, application, platform, or service that is configured to provide electronic mail ("email") services to users operating client devices. The external email resource comprises an email client, a simple mail transfer protocol ("SMTP") server, and a domain name server ("DNS"). The external email resource is configured to allow a sending user ("a sender") to create and transmit an email message to a receiving user ("a recipient"). Each email message comprises an email envelope that defines its electronic format, an email header that comprises sender/recipient information and an email subject line, and an email body that comprises text, images, and file attachments. The external email resource operates on a compiled code base or repository that is separate and distinct from that which supports the group-based communication system. Example external email resources include Microsoft Office 365®, Gmail®, and Yahoo Mail®.

An email client of the external email resource may be used by a sender to create and transmit an email message. The email message text and attachments are thus uploaded to the SMTP server as outgoing mail. A copy of the email message is stored to an email outbox associated with the sender for later retrieval. The SMTP server communicates with the DNS to find a recipient email server using recipient information drawn from the email header. Once the SMTP server finds the recipient email server, it transfers the email message to the recipient email server. The next time the recipient accesses the email client, the email client downloads the email message from the recipient email server for presentation to the recipient in an email inbox interface.

The external email resource may also include programs, applications, platforms, or services configured to provide services related to providing email services. For example, external email resources configured in accordance with embodiments herein described include calendar and scheduling services. Such calendar and scheduling services are configured to provide one or more files containing one or more data objects to the group-based communication system. For example, the group-based communication system may subscribe to an application program interface (API) of the external email resource that is configured to transmit one or more data objects.

The term "single-user external email corpus" refers to a file object containing all email messages and user account information that is necessary for an external email resource to reconstruct an email account (including all associated calendar and scheduling services) associated with a single user. The single-user external email corpus may include email attachments, such as calendar invitations, received and sent by a user. The single-user external email corpus may be stored in a personal storage table (".pst") format. Additionally or alternatively, some or all of the single-user external email corpus, such as the calendar and scheduling services, may be stored in an iCalendar (".ics") format or a vCalendar (".vcs") format.

The term "multi-user external email corpus" refers to a file object containing all email messages and user account information that is necessary for an external email resource to reconstruct email accounts (including all associated calendar and scheduling services) associated with multiple enterprise users. For example, an enterprise administrator may use a multi-user external email corpus to rebuild email accounts for employees of ACME Corporation. The multi-user external email corpus may include email attachments, such as calendar invitations, received and sent by the multiple user. The multi-user external email corpus may be stored in .pst format. Additionally or alternatively, some or all of the multi-user external email corpus, such as the calendar and scheduling services, may be stored in an iCalendar (".ics") format or a vCalendar (".vcs") format.

In some examples, an external resource (such as an external calendar resource and/or an external email resource), may be an "validated external resource." A validated external resource operates on a compiled code base or repository that is separate and distinct from that which supports the group-based communication system. In some embodiments, the validated external resource may communicate with the group-based communication system, and vice versa, through one or more application programming interfaces (APIs). In some embodiments, the validated external resource generates and/or receives tokens or other authentication credentials that are used to facilitate secure communication between the validated external resource and the group-based communication system, in view of group-based communication system network security layers or protocols (e.g., network firewall protocols).

The term "external resource user identifier" refers to one or more items of data by which a user (or user profile) of validated external resource, an external calendar resource or an external email resource may be uniquely identified by a group-based communication system. For example, an external resource user identifier may comprise American Standard Code for Information Interchange (ASCII) text, a pointer, a memory address, and the like. One or more external resource user identifiers may be stored to a user profile of a group-based communication system along with other identifiers (e.g., user identifier, group identifiers, group-based communication channel identifiers, etc.). The external resource user identifier may be embodied in a format native to the validated external resource, the external calendar resource or the external email resource to which it is associated or may be structured in a format designated by the group-based communication system. Correlating one or more external resource user identifiers to a user account or user identifier of the group-based communication system allows the group-based communication system to link accounts from disparate validated external resources, external calendar resources or external email resources with a selected group-based communication system user account. In some embodiments, the external resource user identifier may be defined by the external resource. The external resource user identifier may include an integer identifier, a universally unique identifier, an email address, a random string, and/or the like. In such a case, the group-based communication server may receive the external resource user identifier during the open authorization (OAuth) process.

The term "group-based communication repository" refers to the location, such as a memory device, where one or more data objects (such as calendar objects and/or event objects) are stored. The group-based communication repository may be a dedicated device and/or a part of a larger repository. The group-based communication repository may be dynamically updated or be static. The group-based communication repository may be encrypted in order to limit unauthorized access of user activity data logs and associated engagement data.

The term "group-based communication interface" refers to a virtual communications environment configured to facilitate user interaction with a group-based communications system. Each group-based communication interface is accessible and viewable to a select group of users, such as a group of employees of a business or organization (e.g., the Slack Corp. interface would be accessible and viewable to the Slack employees however the ACME Corporation group-based communication interface would not be accessible and viewable to Slack employees). The group-based communication interface comprises a plurality of group-based communication channels (e.g., a marketing channel, sales channel, accounting channel, etc.), which are defined below.

In the present disclosure, the term "pane" refers to a user interface (such as a group-based communication interface)) element that is rendered as a section of the interface. A pane may display information, such as, for example, a rendering of a calendar object. In some examples, a pane may be a "flex pane," which refers to a section that may be triggered for rendering when a user clicks, taps, or otherwise interacts with an element on a user interface (such as a button), and does not obstruct other elements on the user interface. Example user interfaces showing a member calendar flex pane (which displays one or more renderings of calendar objects) are illustrated in the present disclosure. In embodiments, a member calendar flex pane is rendered for display within a group-based communication interface. In embodiments, a member calendar flex pane is associated with a group-based communication channel identifier.

Member calendars improve efficiency in coordinating and scheduling events among members of a group-based communication system, reduce redundancy in sharing calendars, and reduce computing resource usage and network traffic congestion, details of which are described hereinafter.

Example System Architecture for Implementing Embodiments of the Present Disclosure Methods, apparatuses, and computer program products of the present disclosure may be embodied by any of a variety of devices. For example, the method, apparatus, and computer program product of an example embodiment may be embodied by a networked device (e.g., a group-based communication system), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 3 illustrates an example system architecture 300 within which embodiments of the present disclosure may operate. The system may comprise a repository (such as a group-based communication repository 317A and a user identification repository 317B) and a server (such as a group-based communication server 309), details of which are described hereinafter.

Users may access a group-based communication system 305 via a communication network 303 using client devices 301A-301N. The client devices 301A-301N may be a computing device as defined herein. Electronic data received by the group-based communication system 305 from the client devices 301A-301N may be provided in various forms and via various methods. For example, the client devices 301A-301N may include desktop computers, laptop computers, smartphones, netbooks, tablet computers, wearables, and the like.

In embodiments where a client device of client devices 301A-301N is a mobile device, such as a smart phone or tablet, the client device may execute an "app" to interact with the group-based communication system 305. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location service circuitry, wired and wireless network interfaces, user contacts, and other applications.

Additionally or alternatively, the client devices 301A-301N may interact with the group-based communication system 305 via a web browser or through a web application that runs in a web browser. As yet another example, the client devices 301A-301N may include various hardware or firmware designed to interface with the group-based communication system 305.

Communication network 303 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network 303 may include an 802.11, 802.16, 802.20, and/or WiMax network. Further, the communication network 303 may include a public network (such as the Internet), a private network (such as an intranet), or combinations thereof, and may utilize a variety of networking protocols including, but not limited to, TCP/IP based networking protocols. For instance, the networking protocol may be customized to suit the needs of the group-based communication system 305. In some embodiments, the protocol is a custom protocol of JSON (JavaScript Object Notation) objects sent via a Websocket channel. In some embodiments, the protocol is JSON over RPC, JSON over REST/HTTP, and the like.

In various embodiments of the present disclosure, an electronic message, a calendar rendering request and/or an event generation request may be sent to the group-based communication system 305 via, for example, the communication network 303 directly by a client device of client devices 301A-301N. The electronic message, the calendar rendering request and/or the event generation request may be also sent to the group-based communication system 305 via an intermediary.

In some embodiments, the group-based communication system 305 comprises a group-based communication server 309, a group-based communication repository 317A, and a user identification repository 317B.

The group-based communication repository 317A may be embodied as a data storage device such as a Network Attached Storage (NAS) device or devices, or as a separate database server or servers. The group-based communication repository 317A comprises information accessed and stored by the group-based communication server 309 to facilitate the operations of the group-based communication system 305. For example, the group-based communication repository 317A may include, without limitation, a plurality of requests, invitations, communications, user identifiers, and the like organized within the group-based communication repository 317A. For example, the group-based communication server 309 may provide electronic data relating to a user's interactions with the system, and the electronic data may be stored on the group-based communication repository 317A. In some embodiments, the group-based communication repository 317A may be in communication with the group-based communication server 309 through the communication network 303. In some embodiments, the group-based communication repository 317A and the group-based communication server 309 may be contained in the group-based communication system 305.

In some embodiments, the group-based communication system 305 may be configured to include or be in communication with a user identification repository 317B. The user identification repository 317B may include identification data for one or more users. In some embodiments, the user identification repository 317B may include user identifiers, channel identifiers, group identifiers, and the like. For example, the user identification repository 317B may receive member profile information from the group-based communication server 309. In some embodiments, the user identification repository 317B may be included in the same server as the group-based communication repository 317A.

It is noted that various components in the group-based communication server 309 may leverage the same computer or computing apparatus to perform various operations, and various components of the group-based communication repository 317A and the user identification repository 317B may leverage the same computer or computing apparatus to perform the above-described operations.

As shown in FIG. 3, the group-based communication system 305 may be in communication with one or more external calendar resources 311A-311N via the communication network 303. The one or more external calendar resources 311A-311N may be embodied as computers, and may further provide information regarding external calendar resources. For example, the one or more external calendar resources 311A-311N may store calendar objects in a calendar object repository. As another example, the one or more external calendar resources 311A-311N may generate event objects in response to event generation requests.

The one or more external calendar resources 311A-311N may implement different calendar server protocols (including protocols for remote client-server calendar access and scheduling based on the XML, HTTP, and other standards), and may provide calendar services separated from the group-based communication system 305 and/or among other external calendar resources 311A-311N. For example, one of the external calendar resources 311A-311N may be provided by Google® Calendar, and another may be provided by Microsoft Office®.

In some examples, the one or more external calendar resources 311A-311N may be validated external resources such that they provide secure communication between the one or more external calendar resources 311A-311N and the group-based communication system 305 through, for example, one or more application programming interfaces (APIs). In some examples, other validated external resource (such as validated external resource 307) may be in communication with the group-based communication system 305, providing services that are not related to electronic calendar.

Example Apparatus for Implementing Embodiments of the Present Disclosure

The group-based communication server 309 of FIG. 3 may be embodied by one or more computing systems, such as apparatus 400 shown in FIG. 4. The apparatus 400 may include processor 402, memory 404, input/output circuitry 406, communications circuitry 408, member calendar circuitry 410, and calendar rendering circuitry 412. The apparatus 400 may be configured to execute the operations described above with respect to FIG. 3 and below with respect to FIGS. 5-41. Although these components 402-412 are described with respect to functional limitations, it should be understood that the particular implementations necessarily include the use of particular hardware. It should also be understood that certain of these components 402-412 may include similar or common hardware. For example, two sets of circuitries may both leverage use of the same processor, network interface, storage medium, or the like to perform their associated functions, such that duplicate hardware is not required for each set of circuitries.

In some embodiments, the processor 402 (and/or co-processor or any other processing circuitry assisting or otherwise associated with the processor) may be in communication with the memory 404 via a bus for passing information among components of the apparatus. The memory 404 is non-transitory and may include, for example, one or more volatile and/or non-volatile memories. In other words, for example, the memory 404 may be an electronic storage device (e.g., a computer-readable storage medium). The memory 404 may be configured to store information, data, content, applications, instructions, or the like for enabling the apparatus to carry out various functions in accordance with example embodiments of the present disclosure.

The processor 402 may be embodied in a number of different ways and may, for example, include one or more processing devices configured to perform independently. In some preferred and non-limiting embodiments, the processor 402 may include one or more processors configured in tandem via a bus to enable independent execution of instructions, pipelining, and/or multithreading. The use of the term "processor" or "processing circuitry" may be understood to include a single core processor, a multi-core processor, multiple processors internal to the apparatus, and/or remote or "cloud" processors.

In some preferred and non-limiting embodiments, the processor 402 may be configured to execute instructions stored in the memory 404 or otherwise accessible to the processor 402. In some preferred and non-limiting embodiments, the processor 402 may be configured to execute hard-coded functionalities. As such, whether configured by hardware or software methods, or by a combination thereof, the processor 402 may represent an entity (e.g., physically embodied in circuitry) capable of performing operations according to an embodiment of the present disclosure while configured accordingly. Alternatively, as another example, when the processor 402 is embodied as an executor of software instructions, the instructions may specifically configure the processor 402 to perform the algorithms and/or operations described herein when the instructions are executed.

In some embodiments, the apparatus 400 may include input/output circuitry 406 that may, in turn, be in communication with processor 402 to provide output to the user and, in some embodiments, to receive an indication of a user input. The input/output circuitry 406 may comprise a user interface circuitry and may include a display, which may comprise a web user interface, a mobile application, a client device, a kiosk, or the like. In some embodiments, the input/output circuitry 406 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 404, and/or the like).

The communications circuitry 408 may be any means such as a device or circuitry embodied in either hardware or a combination of hardware and software that is configured to receive and/or transmit data from/to a network and/or any other device, circuitry, or module in communication with the apparatus 400. In this regard, the communications circuitry 408 may include, for example, a network interface for enabling communications with a wired or wireless communication network (such as the communication network 303 as shown in FIG. 3). For example, the communications circuitry 408 may include one or more network interface cards, antennae, buses, switches, routers, modems, and supporting hardware and/or software, or any other device suitable for enabling communications via a network. Additionally or alternatively, the communications circuitry 408 may include the circuitry for interacting with the antenna/antennae to cause transmission of signals via the antenna/antennae or to handle receipt of signals received via the antenna/antennae.

The member calendar circuitry 410 includes hardware configured to generate a member calendar, details of which are described hereinafter. The member calendar circuitry 410 may utilize processing circuitry, such as the processor 402, to perform these actions. In some embodiments, the member calendar circuitry 410 may include a separate processor, specially configured Field Programmable Gate Array (FPGA), or Application Specific Integrated Circuit (ASIC). The member calendar circuitry 410 may be implemented using hardware components of the apparatus configured by either hardware or software for implementing the functions described herein.

The calendar rendering circuitry 412 includes hardware configured to cause the rendering of a member calendar in a user interface of a client device. The calendar rendering circuitry 412 may utilize processing circuitry, such as the processor 402, to perform these actions. However, it should also be appreciated that, in some embodiments, the calendar rendering circuitry 412 may include a separate processor, specially configured Field Programmable Gate Array (FPGA), or Application Specific Integrated Circuit (ASIC) for performing the functions described herein. The calendar rendering circuitry 412 may be implemented using hardware components of the apparatus configured by either hardware or software for implementing these planned functions.

It is also noted that all or some of the information discussed herein can be based on data that is received, generated and/or maintained by one or more components of apparatus 400. In some embodiments, one or more external systems (such as a remote cloud computing and/or data storage system) may also be leveraged to provide at least some of the functionality discussed herein.

In some embodiments, other elements of the apparatus 400 may provide or supplement the functionality of particular circuitry. For example, the processor 402 may provide processing functionality, the memory 404 may provide storage functionality, the communications circuitry 408 may provide network interface functionality, and the like. As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on a non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Methods and User Interfaces for Implementing Embodiments of the Present Disclosure Various methods and user interfaces described herein, including, for example, example methods and user interfaces as shown in FIGS. 5-45, may facilitate creating and/or rendering a member calendar in a group-based communication system, It is noted that each block of the flowchart, and combinations of blocks in the flowchart, may be implemented by various means such as hardware, firmware, circuitry and/or other devices associated with execution of software including one or more computer program instructions. For example, one or more of the procedures described in figures may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

Member Calendar

FIGS. 5 and 6 illustrate example methods 500 and 600, respectively, for generating member calendars for members of a group-based communication system, and causing the rendering of member calendars.

Referring now to FIG. 5, an example method 500 is illustrated.

The method 500 starts at block 501. At block 503, a server circuitry (such as the group-based communication server 309 as shown in FIGS. 3 and 4) may transmit a validation request to an external calendar resource. In some embodiments, the validation request may comprise a request to access a calendar object associated with an external calendar resource.

In some examples, the validation request may be generated by the server circuitry and transmitted to the external calendar resource in response to an electronic request to generate a member calendar received from a client device (such as one of the client devices 301A-301N). For example, a user operating a client device may transmit a request to the server circuitry that requests the server circuitry to generate and render a member calendar based on a calendar object stored in an external calendar resource.

In some examples, after receiving the request from the client device, the server circuitry may determine that the client device is associated with a user of the group-based communication system based on, for example, the group-based communication repository 317A and/or user identification repository 317B as described above in connection with FIG. 3.

In some examples, the validation request may comprise a token or other authentication credential that is generated by the server circuitry in accordance with authorization protocols as specified by, for example, the external calendar resource.

In some examples, the validation request may identify the software, platform, and/or application that requests access to the external calendar resource. For example, the validation request may identify the name of the group-based communication system that requests access to the external calendar resource, and the developers of the group-based communication system.

In some examples, the validation request may specify the scope of access to the external calendar resource. For example, the validation request may specify that the group-based communication system requests access to calendar objects and event objects associated with a user based on, for example, a user identifier.

At block 505, a server circuitry (such as the group-based communication server 309 as shown in FIGS. 3 and 4) may determine whether a validation notification is received.

In some examples, the validation notification may comprise a token or other authentication credential that allows the server circuitry to access information related to the calendar object.

In some examples, the validation notification may be transmitted by the external calendar resource after a user grants access privilege of the calendar object to the server circuitry. For example, in response to receiving the validation request, the external calendar resource may cause the rendering of a user interface on a client device associated with the user, and request user's consent or authorization via the user interface to allow the server circuitry to access information regarding the calendar object. In response to the user providing consent or authorization via the user interface, the external calendar resource may transmit the validation notification to the server circuitry.

If, at block 505, the server circuitry determines that a validation notification is not received, the server circuitry may proceed to block 513 and the method 500 ends. In some examples, the server circuitry may determine whether a validation notification has been received within a predetermined time period. For example, if the server circuitry determines that a validation notification has not been received within the predetermined time period, the server circuitry may proceed to block 513 and the method 500 ends.

If, at block 505, the server circuitry determines that a validation notification is received, the server circuitry may proceed to block 507. At block 507, a server circuitry (such as the group-based communication server 309 as shown in FIGS. 3 and 4) may retrieve the calendar object from the external calendar resource.

As described above, the validation notification may include a token or other authentication credential that allows the server circuitry to access information related to the calendar object.

In some examples, to retrieve the calendar object from the external calendar service, the server circuitry may transmit a data request to the external calendar resource, with the token or authentication credential attached to the data request. Upon receiving the data request with the token or authentication credential, the external calendar resource may locate the calendar object from a repository, and transmit information related to the calendar object to the server circuitry.

In some examples, the calendar object may comprise a calendar object metadata set. As described above in connection with FIG. 1, the calendar object metadata set may comprise one or more parameters associated with the calendar object, including, for example, title parameter, owner parameter, and privacy parameter.

While the above description is associated with the calendar object being stored in a repository associated with an external calendar resource, in some embodiments of the present invention, the calendar object may be generated and stored by the group-based communication system. For example, the calendar object may be stored in the group-based communication repository 317A as described above in connection with FIG. 3.

At block 509, a server circuitry (such as the group-based communication server 309 as shown in FIGS. 3 and 4) may determine whether a calendar rendering request is received. As described above, a calendar rendering request is an electronic request received from, for example, a client device to cause the rendering of a calendar object for display on a user interface.

In some examples, the calendar object is associated with a first client device, and the calendar rendering request is received from a second client device different from the first client device. In other words, a member of the group-based communication system may request access of the member calendar of another member. In some examples, the calendar rendering request is associated with a user interface on the second client device.

In some examples, the user interface may be associated with a rendering of a member profile, such as but not limited to, example user interfaces as shown in FIGS. 23 and 24 and described in the present disclosure. In some examples, the user interface may be associated with a direct messaging interface, such as but not limited to, example user interfaces as shown in FIGS. 28 and 36 and described in the present disclosure.

If, at block 509, the server circuitry determines that a calendar rendering request is not received, the server circuitry may proceed to block 513 and the method 500 ends.

In some examples, the server circuitry may determine whether a calendar rendering request has been received within a predetermined time period. For example, if the server circuitry determines that a calendar rendering request has not been received within the predetermined time period, the server circuitry may proceed to block 513 and the method 500 ends.

If, at block 509, the server circuitry determines that a calendar rendering request is received, the server circuitry may proceed to block 511. At block 511, a server circuitry (such as the group-based communication server 309 as shown in FIGS. 3 and 4) may cause the rendering of the calendar object for display on a user interface.

In some examples, the rendering may comprise a member calendar flex pane, and the member calendar flex pane may comprise a user avatar associated with a member profile. Example user interfaces are described in the present disclosure.

In some examples, the rendering of the calendar object may be based at least in part on the calendar object metadata set of the calendar object. For example, the server circuitry may render the calendar object, displaying the title of the calendar (based on the title parameter of the calendar object metadata set) on a user interface associated with a member profile or a direct messaging, details of which are described in the present disclosure.

The method 500 ends at block 513.

As described above in connection with FIGS. 1-2, a calendar object may be associated with one or more event objects. When a calendar object is retrieved from the external calendar resource based on, for example, the method 500 as described above in connection with FIG. 5, the calendar object may be associated with one or more event objects. In other words, one or more events (as represented by the one or more event objects) are on the calendar (as represented by the calendar object).

In this regard, FIG. 6 illustrates an example method 600 for rendering event object(s) for display based on, for example, parameters in the event object metadata set of the event object. Referring now to FIG. 6, an example method 600 is illustrated.

The method 600 starts at block 602.

At block 604, a server circuitry (such as the group-based communication server 309 as shown in FIGS. 3 and 4) may determine whether the availability parameter is set to "free."

As described above in connection with FIGS. 1-2, the event object metadata set of a present event object may comprise an availability parameter that shows whether the event object's owner is available to join another event during the time period of the present event object (as indicated by, for example, the time parameter). The availability parameter may comprise a text string, such as "busy" or "free." For example, when an event object represents a user's birthday, the corresponding availability parameter may be set to "free" (i.e. the user is available to join another event that may overlap in terms of time duration with the birthday). As another example, when an event object represents a conference call, the corresponding availability parameter may be set to "busy" (i.e. the user is not available to join another event that may overlap in terms of time duration with the conference call).

If, at block 604, the server circuitry determines that the availability parameter is set to free, the server circuitry may proceed to block 606, and forgo the rendering of the event object for display on a user interface.

If, at block 604, the server circuitry determines that the availability parameter is not set to free, the server circuitry may proceed to block 608. At block 608, a server circuitry (such as the group-based communication server 309 as shown in FIGS. 3 and 4) may determine whether a visibility parameter of the event object metadata set of the event object is set to "public."

As described above in connection with FIGS. 1-2, the event object metadata set may comprise a visibility parameter that shows whether to render details of the event for display to other member(s) in the group-based communication system. If the visibility parameter is set to public, it indicates that other members of the group-based communication system can view details of the event (i.e. the event represented by the event object is a public event). If the visibility parameter is set to private, it indicates that other members of the group-based communication system cannot view the details of event (i.e. the event represented by the event object is a private event).

Referring back to FIG. 6, if, at block 608, the server circuitry determines that the visibility parameter is set to public, the server circuitry may proceed to block 610, and cause the rendering of the event object for display on a user interface, including the details of the event based on, such as, but not limited to, the title parameter, the time parameter, the location parameter, the invitee parameter of the event object metadata set. Example user interfaces are described in the present disclosure.

If, at block 608, the server circuitry determines that the visibility parameter is not set to public, the server circuitry may proceed to block 612, and cause the rendering of the event object for display on a user interface, without the details of the event. In some examples, the server circuitry may forgo causing the rendering of event details such as the title of the event (based on the title parameter), the location of the event (based on the location parameter), the invitee of the event (based on the invitee parameter).

Additionally or alternatively, the event object metadata set may comprise a transparency parameter. In particular, if the visibility parameter is set to private, the server circuitry may determine how to render the event object based on the transparency parameter. In some examples, the transparency parameter may be set as either "opaque" or "transparent." In some examples, when the transparency parameter is set to "opaque," the server circuitry may cause the rendering of a rectangular shape on the member calendar, and the rectangular shape represents the starting and ending time of the event without showing the details of the event. In other words, the member calendar (the rendering of which is caused by the server circuitry) may show that the member is not available to join another event (as the availability parameter is not set to free based on block 604 of FIG. 6) without displaying the details of the event. In some examples, when the transparency parameter is set to "transparent," the server circuitry may forgo causing the rendering of the event object, similar to those described above in connection with block 606 of FIG. 6.

The method 600 ends at block 614.

FIGS. 7-20 and 42-45 illustrate example user interfaces for rendering member calendars in accordance with embodiments of the present invention. Such user interfaces may be, for example, group-based communication interfaces as defined above.

In particular, a user may operate a client device (such as a desktop computer) to interact with user interfaces as illustrated in FIGS. 7-12 and 42-45, and may operate a different client device (such as a mobile phone) to interact with user interfaces as illustrated in FIGS. 13-20. It is noted that the present disclosure is not limited to desktop computer or mobile phone only, and other devices may be used in accordance with embodiments of the present invention (including, for example, wearable devices).

Referring now to FIG. 7, an example user interface 700 is shown. The example user interface 700 may include a side pane 701 and a header pane 703. The header pane may include one or more buttons, such as the "more items" button 717. The side pane 701 may display information associated with the member accessing the user interface 700 using a client device. For example, the side pane 701 may display a list of group-based communication channels that the member has joined, direct messages associated with the member, as well as validated external resource(s) that the member has authorized to access the group-based communication system.

The header pane 703 may display data associated with the member, such as the name of the member. The header pane 703 may also include one or more buttons, such as, for example, a call button 705, an information button 707, a settings button 709, an activity button 713, a "starred item" button 715, and a "more items" button 717. The header pane 703 may further include a search box 711, which allows the member to input search queries to the group-based communication system.

When the member clicks, taps, or otherwise selects the call button 705, a server circuitry (such as the group-based communication server 309 as shown in FIGS. 3 and 4) and/or the client device may cause the rendering of a call modal that allows the member to schedule a video or audio call with another member of the group-based communication system.

When the member clicks, taps, or otherwise selects the information button 707, a server circuitry (such as the group-based communication server 309 as shown in FIGS. 3 and 4) and/or the client device may cause the rendering of an information modal that displays additional information associated with a group-based communication channel or direct messaging.

When the member clicks, taps, or otherwise selects the settings button 709, a server circuitry (such as the group-based communication server 309 as shown in FIGS. 3 and 4) and/or the client device may cause the rendering of a setting modal that displays configurable settings associated with a group-based communication channel or direct messaging (for example, adjusting the notification setting, inviting other members to the channel).

When the member clicks, taps, or otherwise selects the activity button 713, a server circuitry (such as the group-based communication server 309 as shown in FIGS. 3 and 4) and/or the client device may cause the rendering of an activity modal that displays activities (such as notifications) associated with the member.

When the member clicks, taps, or otherwise selects the "starred item" button 715, a server circuitry (such as the group-based communication server 309 as shown in FIGS. 3 and 4) and/or the client device may cause the rendering of an modal that displays items (such as electronic messages, files) that the member has associated with a starred category (which may, for example, include items that are important to the member).

When the member clicks, taps, or otherwise selects the "more items" button 717, a server circuitry (such as the group-based communication server 309 as shown in FIGS. 3 and 4) and/or the client device may cause the rendering of an "additional items" modal that displays additional items that the member can interact with via the user interface. An example "additional items" modal is shown in FIG. 8.

Referring now to FIG. 8, an example user interface 800 is shown. The example user interface 800 may include a side pane 802, similar to the side pane 701 described above in connection with FIG. 7. The example user interface 800 also illustrates an "additional items" modal 804, which may be triggered to be rendered for display after the member clicks, taps, or otherwise selects the "more items" button 806.

As shown in FIG. 8, the "additional items" modal 804 may include one or more menu items that provide options associated with the group-based communication system. For example, the member may view files, team directory, and user groups associated with the group-based communication system. Further, when the member clicks, taps, or otherwise selects a "your events" item 808, a server circuitry (such as the group-based communication server 309 as shown in FIGS. 3 and 4) and/or the client device may cause the rendering of a member calendar flex pane that includes a rendering of the member calendar associated with the member. An example member calendar flex pane is shown in FIG. 9.

Referring now to FIG. 9, an example user interface 900 is shown. The example user interface 900 may include a side pane 901, similar to the side pane 701 described above in connection with FIG. 7. The example user interface 900 also illustrates a member calendar flex pane 903.

The member calendar flex pane 903 includes a member calendar rendering 905 that displays the member calendar associated with the member, including renderings of event objects that represent events associated with the member calendar. The renderings of event objects may be arranged chronologically based on time parameters associated with the event objects, such that an event with an earlier starting time is positioned higher on the member calendar flex pane 903 than an event with a later starting time.

Further, the member calendar rendering 905 may include a time line 907, which shows current system time. The time line 907 may be positioned based on the time parameters associated with the event objects. For example, the rendering of an event object with a starting time prior to the current system time may be positioned above the time line 907.

The member calendar flex pane 903 may also include one or more buttons, such as the "create an event" button 909 and the "edit setting" button 911. When the member clicks, taps, or otherwise selects the "create an event" button 909, a server circuitry (such as the group-based communication server 309 as shown in FIGS. 3 and 4) and/or the client device may cause the rendering of an event creation modal for creating an event object associated with the member calendar. When the member clicks, taps, or otherwise selects the "edit setting" button 911, a server circuitry (such as the group-based communication server 309 as shown in FIGS. 3 and 4) and/or the client device may cause the rendering of an edit setting modal that displays configuration settings of the member calendar flex pane 903.

The member calendar flex pane 903 may also include an external viewing option 913. When the member clicks, taps, or otherwise selects the external viewing option 913, a server circuitry (such as the group-based communication server 309 as shown in FIGS. 3 and 4) and/or the client device may transmit a request to an external calendar service associated with the calendar object, requesting a rendering of the calendar object on a user interface associated with the external calendar service.

When a user clicks, taps, or otherwise selects a rendering of an event object in the member calendar flex pane 903, a server circuitry (such as the group-based communication server 309 as shown in FIGS. 3 and 4) and/or the client device may cause the rendering of an event details pane. An example event details pane is shown in FIG. 10.

Referring now to FIG. 10, an example user interface 1000 is shown. The example user interface 1000 may include a side pane 1002, similar to the side pane 701 described above in connection with FIG. 7. The example user interface 1000 also illustrates an event details pane 1004.

As shown in FIG. 10, the event details pane 1004 displays information related to the event object. For example, the event details pane 1004 may display title information 1006, time information 1008, location information 1010, invitee information 1012, and details information 1016, which are based on the title parameter, location parameter, invitee parameter, and details parameters, respectively, of the event object metadata set associated with the event object.

Further, the event details pane 1004 may include a response section 1014, which allows a user to input a response to the group-based communication system on whether the user would join the event.

Referring now to FIG. 11, an example user interface 1100 is shown. The example user interface 1100 may include a side pane 1101, similar to the side pane 701 described above in connection with FIG. 7. The example user interface 1100 also illustrates an event details pane 1103. As shown in FIG. 11, the event details pane 1103 may include an expanded invitee information section 1105, which displays the names of the invitees of the event and their responses. The event details pane 1103 may further include an "additional items" button 1107. When a user clicks, taps, or otherwise selects the "additional items" button 1107, a server circuitry (such as the group-based communication server 309 as shown in FIGS. 3 and 4) and/or the client device may cause the rendering of an additional action modal. An example additional action modal is shown in FIG. 12.

Referring now to FIG. 12, an example user interface 1200 is shown. The example user interface 1200 may include a side pane 1202, similar to the side pane 701 described above in connection with FIG. 7. The example user interface 1200 also illustrates an event details pane 1204. Further, the user interface 1200 includes an additional action modal 1206.

The additional action modal 1206 provides menu items, such as "copy link to event," "star event" and "create external link" as shown in FIG. 12. When a user clicks, taps, or otherwise selects "create external link," a server circuitry (such as the group-based communication server 309 as shown in FIGS. 3 and 4) and/or the client device may generate a sharing link (such as a hyperlink) that locates the event object in the group-based communication system or in the external calendar resource. When a user clicks, taps, or otherwise selects "copy link to event" in the user interface 1200 displayed on a client device, the client device may copy a sharing link that corresponds to the event object. When a user clicks, taps, or otherwise selects "star event" in the user interface 1200 displayed on a client device, the client device may associate with the event object with the starred category (which may, for example, indicate that the corresponding event is important to the user).

Referring now to FIG. 13, an example user interface 1300 is shown. The user interface 1300 may include a header pane 1301, a channel title pane 1303, a channel messaging pane 1305, and an input box 1307.

The header pane 1301 may display data associated with the member, such as the name of the member. The channel title pane 1303 may display the name of the group-based communication channel that the member accesses via the user interface 1300. The channel messaging pane 1305 may display data associated with the group-based communication channel, including, for example, texts and images. The input box 1307 allows a member to input data (such as texts and images) to the group-based communication channel. Data input by the member via the input box 1307 may be displayed in the channel messaging pane 1305.

The header pane 1301 may also include one or more buttons, such as, for example, a main button 1311 and an "additional items" button 1309. A user may click, tap, or otherwise select the main button 1311, which may trigger the display of a main menu. An example main menu is illustrated in FIG. 16. Alternatively or additionally, a user may click, tap, or otherwise select the "additional items" button 1309, which may trigger the display of an "additional items" modal. An example "additional items" modal is illustrated in FIG. 14.

Referring now to FIG. 14, an example user interface 1400 is provided. The example user interface 1400 includes an "additional items" modal 1402. The "additional items" modal 1402 may include one or more menu items that provide options for interacting with the group-based communication system. For example, the member may view activity and directory associated with the group-based communication system. Further, when the member clicks, taps, or otherwise selects the "your calendar" item 1404 on the "additional items" modal 1402, a server circuitry (such as the group-based communication server 309 as shown in FIGS. 3 and 4) and/or the client device may cause the rendering of a member calendar flex pane that includes a rendering of the member calendar associated with the member. Example member calendar flex panes are shown in FIG. 17A and FIG. 17B.

Referring now to FIG. 15, when a user clicks, taps, or otherwise selects the main button 1501 of the user interface 1500, a server circuitry (such as the group-based communication server 309 as shown in FIGS. 3 and 4) and/or the client device may cause the rendering of a main menu. An example main menu is shown in FIG. 16.

Referring now to FIG. 16, an example user interface 1600 is provided. The user interface 1600 may include a main menu 1601. The main menu 1601 include menu items that allow the member to interact with the group-based communication system (including, for example, a list of group-based communication channels). As shown in FIG. 16, when the member clicks, taps, or otherwise selects the "Calendar" item 1603, a server circuitry (such as the group-based communication server 309 as shown in FIGS. 3 and 4) and/or the client device may cause the rendering of a member calendar flex pane that includes a rendering of the member calendar associated with the member. An example member calendar flex pane is shown in FIG. 17A.

Referring now to FIG. 17A, an example member calendar flex pane 1700 is provided. The member calendar flex pane 1700 includes a calendar section 1701 and a reminder section 1707.

The calendar section 1701 includes renderings of event objects that represent events associated with the member calendar (such as event 1703 and event 1705). The renderings of event objects may be arranged chronologically based on time parameters associated with the event objects, such that an event with an earlier starting time is positioned higher on the calendar section 1701 than an event with a later starting time. For example, the event 1703 has an earlier starting time than the event 1705, thus the rendering of event 1703 is positioned higher on the calendar section 1701 than the rendering of event 1705. The calendar section 1701 may also include a time line 1709 that shows current system time, similar to the time line 907 described above in connection with FIG. 9.

The member calendar flex pane 1700 may also include a reminder section 1707. The reminder section 1707 may include renderings of task objects associated with the event objects.

When a user clicks, taps, or otherwise selects the rendering of an event object, a server circuitry (such as the group-based communication server 309 as shown in FIGS. 3 and 4) and/or the client device may cause the rendering of an event details pane. An example event details pane is shown in FIG. 18.

Referring now to FIG. 17B, another example member calendar flex pane 1700' is shown. Similar to the member calendar flex pane 1700 as shown in FIG. 17A, the member calendar flex pane 1700' of FIG. 17B comprises a time line 1709' that shows the current system time. In some examples, the server circuitry and/or the client device may cause the display of the time line 1709' above an event object rendering. For example, as shown in FIG. 17B, the time line 1709' is positioned above the upper edge of the event object rendering 1703'. Additionally or alternatively, the server circuitry and/or the client device may cause the display of the time line 1709' above with the event object rendering until the corresponding event ending time passes the current system time. For example, if the time parameter of the event object metadata set indicates that the event ends at 11:30 A.M., the server circuitry and/or the client device may cause the display of the time line 1709' above the upper edge of the corresponding event object rendering until the current system time is later than 11:30 A.M.

Further, the member calendar flex pane 1700' may comprise one or more event object renderings, such as event object rendering 1703', event object rendering 1705', and event object rendering 1707'.

In some examples, the event object rendering 1703' may correspond to an upcoming event based on the system time and the time parameter associated with the event object metadata set. In such examples, the event object rendering 1703' may comprise a display of event location information based on the location parameter associated with the event object metadata set. Further, the event object rendering 1703' may comprise a display of "join meeting" button (based on, for example, a call object associated with the event object) that allows the member to join the event by clicking, tapping, or otherwise selecting the "join meeting" button.

In some examples, the event object rendering 1705' may correspond to an event invite that the member has declined to accept. In such examples, the event object rendering 1705' may comprise a display of event time information and event location information (based on, for example, the time parameter and the location parameter associated with the event object metadata set), as well as an indicator (such as a red "x" icon) showing that the member has declined to accept the event invite.

In some examples, the event object rendering 1707' may correspond to an event invite that the member has yet to respond. In such examples, the event object rendering 1707' may comprise a display of event time information and event location information (based on, for example, the time parameter and the location parameter associated with the event object metadata set). Further, the event object rendering 1707' may comprise a display of a "Going?" button, which allows the member to accept the meeting invite once the member clicks, taps, or otherwise selects the "Going?" button.

Referring now to FIG. 18, an example event details pane 1800 is shown. The event details pane 1800 may display title information 1802, time information 1804, location information 1806, details information 1812, and invitee information 1814, which are based on the title parameter, location parameter, details parameters, and invitee parameter, respectively, of the event object metadata set associated with the event object.

The event details pane 1800 may also include a response section 1808, which allows a user to input a response to the group-based communication system on whether the user would join the event.

The event details pane 1800 may include a call section 1810. For example, when the event object is associated with a call object (as described above in connection with FIG. 2), the call section 1810 may display a hyperlink to establish a connection to the audio or video call, and/or may display a join button that allows the member to join the call by selecting the join button.

Referring now to FIG. 19, an example member calendar flex pane 1900 is provided. Similar to the member calendar flex pane 1700 described above in connection with FIG. 17A, the member calendar flex pane 1900 includes a calendar section 1903 and a reminder section 1905. The member calendar flex pane 1900 may also include a header section 1901.

The header section 1901 may display the name of the member calendar, and may further include one or more buttons, such as a "more items" button 1907. When a user clicks, taps, or otherwise selects the "more items" button 1907, a server circuitry (such as the group-based communication server 309 as shown in FIGS. 3 and 4) and/or the client device may cause the rendering of an "additional items" modal. An example "additional items" modal is shown in FIG. 20.

Referring now to FIG. 20, an example member calendar flex pane 2000 is shown. The member calendar flex pane 2000 may include an "additional items" modal 2002. The "additional items" modal 2002 may include menu items such as "create event" and "calendar settings." When a user clicks, taps, or otherwise selects the "create event" menu item, a server circuitry (such as the group-based communication server 309 as shown in FIGS. 3 and 4) and/or the client device may cause the rendering of an event creation modal. When a user clicks, taps, or otherwise selects the "calendar settings" menu item, a server circuitry (such as the group-based communication server 309 as shown in FIGS. 3 and 4) and/or the client device may cause the rendering of a setting modal that displays configurable settings associated with the calendar.

Referring now to FIG. 42, an example user interface 4200 is shown. The example user interface 4200 may include, for example, a side pane 4202, a header pane 4204, a date selection section 4206, a calendar selection section 4210, and a member calendar section 4208.

The side pane 4202 may display information associated with the member accessing the user interface 4200 using a client device. For example, the side pane 4202 may display a list of group-based communication channels that the member has joined, direct messages associated with the member, as well as validated external resource(s) that the member has authorized to access the group-based communication system. In some examples, the side pane 4202 may also include a calendar option as shown in FIG. 42. When the member clicks, taps, or otherwise selects the calendar option, the server circuitry and/or the client device may cause the rendering of a member calendar, as shown in FIG. 42.

The header pane 4204 may include one or more buttons, such as but not limited to a "today" button and a "create event" button. When the member clicks, taps, or otherwise selects the "today" button, server circuitry and/or the client device may cause the rendering of the member calendar showing events with dates starting today (as determined by the system time). When the member clicks, taps, or otherwise selects the "create event" button, the server circuitry and/or the client device may cause the rendering of an event creation modal, details of which are illustrated and described in the present disclosure.

The date selection section 4206 may comprise a display of a calendar with dates (for example, a monthly calendar with dates in the corresponding month). When the member clicks, taps, or otherwise selects one of the dates in the date selection section 4206, the server circuitry and/or the client device may cause the rendering of the member calendar showing events with dates corresponding to or after the date selected in the date selection section 4206.

The calendar selection section 4210 may comprise a display of a list of calendar object(s) associated with the member and corresponding checkbox(s) (each corresponding to one of the calendar object(s) on the list). In some examples, when the member clicks, taps, or otherwise selects one or more checkboxes in the calendar selection section 4210, the server circuitry and/or the client device may cause the rendering of event objects in the member calendar section 4208, and these event objects are associated with the corresponding calendar object(s) that have been selected.

In some examples, the date selection section 4206 may be positioned above the calendar selection section 4210 in the user interface 4200. In some examples, the date selection section 4206 may be positioned below the calendar selection section 4210 in the user interface 4200

The member calendar section 4208 may display renderings of one or more event objects that are (1) associated with the calendar object(s) selected in the calendar selection section 4210 and (2) have dates that are corresponding to or after the date selected in the date selection section 4206. As shown in FIG. 43, each event object may be rendered as a rectangular block including information associated with the event object (such as, for example, title and time of the event). In some examples, each of the rectangular block may be of the same size, and the renderings of event objects may be arranged chronologically based on time parameters associated with the event objects, such that an event with an earlier starting time is positioned higher than an event with a later starting time.

Referring now to FIG. 43, an example user interface 4300 is shown. The example user interface 4300 may include, for example, a side pane 4301, a header pane 4303, a date selection section 4305, a calendar selection section 4311, and a member calendar section 4307, similar to the side pane 4202, the header pane 4204, the date selection section 4206, the calendar selection section 4210, and the member calendar section 4208 described above in connection with FIG. 42, respectively.

Further, the user interface 4300 may include an activity center section 4309. The activity center section 4309 may display notifications associated with events in the member calendar section 4307. For example, the activity center section 4309 may comprise an "upcoming events" portion, which displays event(s) with starting time close to the current system time. The activity center section 4309 may also include a "today's updated events and invites" portion, which displays renderings of event objects where at least one parameter in the corresponding event object metadata set has been changed. For example, the activity center section 4309 may display one or more events where the time parameter has been changed. Further, the activity center section 4309 may comprise renderings of event invites where the member has not provided a response (for example, the invitee parameters of these event objects may show that the member has been invited to the event, but has not provided a response to the invite).

Referring now to FIG. 44, an example user interface 4400 is shown. The example user interface 4400 may include, for example, a side pane 4402, a header pane 4404, a date selection section 4406, a calendar selection section 4412, and an activity center section 4410, similar to the side pane 4301, the header pane 4303, the date selection section 4305, the calendar selection section 4311, and the activity center section 4309 described above in connection with FIG. 43, respectively.

Further, the example user interface 4400 may comprise a member calendar section 4408. In comparison with the member calendar section 4307 described above in connection with FIG. 43, the member calendar section 4408 may comprise renderings of event objects on a calendar with a time line (similar to the time line 907 described above in connection with FIG. 9).

In some examples, an example user interface may include one or more menu items that provide options for the member to toggle the member calendar section between the member calendar section 4307 (as shown in FIG. 43) and the member calendar section 4408 (as shown in FIG. 44). For example, an example user interface may include a drop-down menu in the header pane, and the drop-down menu may provide the options for an "agenda view" (which corresponds to the member calendar section 4307 as shown in FIG. 43) and a "day view" (which corresponds to the member calendar section 4408 as shown in FIG. 44). Additionally or alternatively, an example user interface may further provide an option of a "week view." Referring now to FIG. 45, an example member calendar section in a "week view" is shown.

Referring now to FIG. 45, an example user interface 4500 is shown. The example user interface 4500 may include, for example, a side pane 4501, a header pane 4503, a date selection section 4505, and a calendar selection section 4509, similar to the side pane 4202, the header pane 4204, the date selection section 4206, and the calendar selection section 4210 described above in connection with FIG. 42, respectively. Further, the user interface 4500 may comprise a member calendar section 4507. As shown in FIG. 45, the member calendar section 4507 may comprise renderings of event objects with event times within the present week (based on the system time) on a calendar. In some examples, the member calendar section 4507 may comprise renderings of event objects having event times within the same week as the date selected in the date selection section 4505.

Accessing Member Calendar from Member Profile

In accordance with various embodiments of the present disclosure, a request for rendering member calendar may be received by a server circuitry via interaction by a client device with a user interface of the client device. In this regard, FIG. 21 illustrates an example method 2100 for rendering a member calendar in response to the calendar rendering request.

The method 2100 start at block 2101. At block 2103, a server circuitry (such as the group-based communication server 309 as shown in FIGS. 3 and 4) and/or the client device may cause the rendering of a member profile associated with a member of the group-based communication system.

As described above, information related to a member of the group-based communication system may be stored in a "member profile." For example, the member profile may comprise information such as a name, profile picture, and contact information. In this regard, the server circuitry may cause the rendering of member profile and display such information on a user interface. Such user interface may include, for example, a user profile card or a user profile pane. Examples of user profile card and user profile pane are described in detail below.

In some examples, the server circuitry may cause the rendering of the member profile in response to an electronic request received from a client device associated with the group-based communication system. In some examples, the server circuitry may determine that the client device is associated with a member of the group-based communication system based on information stored in the group-based communication repository 317A and/or the user identification repository 317B, as described above in connection with FIG. 3.

In some examples, the client device may be associated with the member profile (i.e. the user of the client device is the user in the member profile). In some examples, the user of the client device is not the member in the member profile (e.g. a member of a group-based communication system may request access to a member profile of another member).

At block 2105, a server circuitry (such as the group-based communication server 309 as shown in FIGS. 3 and 4) and/or the client device may receive a calendar rendering request. The calendar rendering request may be received from, for example, a client device associated with the group-based communication system as described above. The calendar rendering request may comprise a request to render the member calendar associated with the member profile for display. In response to receiving the calendar rendering request, a server circuitry (such as the group-based communication server 309 as shown in FIGS. 3 and 4) and/or the client device may cause the rendering of a member calendar flex pane at block 2107.

As described above, in some examples, the client device may be associated with the member in the member profile (i.e. the user of the client device is the user corresponds to the member profile). The server circuitry may cause the rendering of the member calendar in a member calendar flex pane, examples of which are illustrated in FIGS. 7-20 as described above.

In some examples, the user of the client device is not the user corresponds to the member profile. A first client device and a second client device may both be associated with a same group-based communication channel or a same direct messaging interface (for example, based on the group-based communication repository 317A and/or user identification repository 317B as described above).

For example, the second client device may be operated by a member Tom, who requests the rendering of a member profile associated with member Susan (who operates the first client device), in accordance with the description above in connection with block 2103. Tom may further request the rendering of Susan's member calendar, in accordance with the description above in connection with block 2105.

The server circuitry may determine that the first client device is associated with a first calendar object, and the second client device is associated with a second calendar object. The server circuitry may retrieve both calendar objects in accordance with methods described in the present disclosure (for example, method 500 described above in connection with FIG. 5). Further, the server circuitry may determine that an event object is associated with both the first calendar object and the second calendar object, and may further cause the rendering of the event object on the member calendar flex pane.

Continuing from the above Tom-Susan example, subsequent to receiving the calendar rendering request at block 2105, the server circuitry may determine that Tom and Susan each has a member calendar, and that their member calendars have events in common. The server circuitry may cause the rendering of these common events on the member calendar flex pane on a user interface associated with the second client device. Example user interface is illustrated in FIG. 26 and described in detail below.

The method 2100 ends at block 2109

FIGS. 22-26 illustrate example user interfaces for rendering member calendars in accordance with embodiments of the present invention. Such user interfaces may be, for example, group-based communication interfaces as defined above.

In particular, FIGS. 22-26 show example user interface interactions for a first member of a group-based communication system to access the member calendar of a second member via a user profile card (as show in FIG. 23) or a user profile pane (as shown in FIG. 24).

Referring now to FIG. 22, an example user interface 2200 is shown. The example user interface 2200 may be displayed on a client device of a first member of the group-based communication system (for example, Renee), and may be associated with a direct messaging between the first member and a second member of the group-based communication system (for example, Laura).

The example user interface 2200 may include a side pane 2202, a messaging pane 2204, and an input box 2206. The side pane 2202 may display information associated with the first member Renee. For example, the side pane 2202 may display a list of group-based communication channels that Renee has jointed, direct messages associated with Renee, as well as validated external resource(s) that Renee has authorized to access the group-based communication system.

The messaging pane 2204 may display data associated with the direct messaging, including, for example, texts and images. The input box 2206 allows the first member to input data (such as texts and images). Data input by the first member via the input box 2206 may be displayed in the messaging pane 2204.

The messaging pane 2204 may also display one or more user icons. For example, the messaging pane 2204 may display renderings of electronic messages between the first member Renee and the second member Laura, such as electronic message 2208. To identify the sender of the electronic message 2208, a server circuitry (such as the group-based communication server 309 as shown in FIGS. 3 and 4) and/or the client may cause the rendering of a user icon based on a user profile picture associated with the sender. For example, the embodiment as illustrated in FIG. 22 comprises a user icon 2210, which illustrates the sender of electronic message 2208 is the second member Laura.

When a first member clicks, taps or otherwise selects the user icon 2210, or when the first member, operating a computer mouse, moves the corresponding cursor so that the cursor is on top of the user icon 2210, a server circuitry (such as the group-based communication server 309 as shown in FIGS. 3 and 4) and/or the client may cause the rendering of a user profile card of the second member. An example user profile card is illustrated in FIG. 23.

Referring now to FIG. 23, an example user interface 2300 is shown. The example user interface 2300 may include a user profile card 2301.

The user profile card 2301 may display information associated with second member. For example, the user profile card 2301 may display the profile picture 2303 of the second member Laura. The user profile card 2301 may also display information such as Laura's position, status, and current local time.

The user profile card 2301 may also display one or more menu items, including, for example, a "view schedule" item 2305. When the first member clicks, taps or otherwise selects the "view schedule" item 2305, or when the first member, operating a computer mouse, moves the corresponding cursor so that the cursor is on the "view schedule" item 2305, a server circuitry (such as the group-based communication server 309 as shown in FIGS. 3 and 4) and/or the client device may cause the rendering of a mini preview card 2307. As shown in FIG. 23, the mini preview card illustrates the member calendar associated with the second member, including renderings of event objects that represent events on the member calendar.

Referring back to FIG. 22, in some examples, when the first member clicks, taps or otherwise selects the user icon 2210, a server circuitry (such as the group-based communication server 309 as shown in FIGS. 3 and 4) and/or the client device may cause the rendering of a user profile pane. An example user profile pane is illustrated in FIG. 24.

Referring now to FIG. 24, an example user interface 2400 is shown. The user interface 2400 may include, for example, a user profile pane 2402. The user profile pane 2402 may display information such as the second member's profile picture 2404, name and position 2406, and one or more buttons, including, for example, contact buttons 2408 and member calendar button 2410.

When the first member clicks, taps or otherwise selects the contact buttons 2408, a server circuitry (such as the group-based communication server 309 as shown in FIGS. 3 and 4) and/or the client device may trigger the display of a communication interface. The communication interface may be, for example, a direct messaging interface, an audio or video call interface, and the like.

When the first member clicks, taps or otherwise selects the member calendar button 2410, a server circuitry (such as the group-based communication server 309 as shown in FIGS. 3 and 4) and/or the client device may cause the rendering of a member calendar flex pane displaying the second member's member calendar. An example member calendar flex pane is illustrated in FIG. 25.

Referring now to FIG. 25, an example user interface 2500 is shown. The user interface 2500 may include a member calendar flex pane 2501. The member calendar flex pane 2501 may include a member calendar rendering 2503, similar to the member calendar rendering 905 described above in connection with FIG. 9. The member calendar flex pane 2501 may also include a user avatar, which is a graphical representation of the member based on, for example a member profile.

The member calendar flex pane 2501 may also include one or more buttons, such as a "create event" button 2507 and a zoom button 2505. When the first member clicks, taps, or otherwise selects the "create event" button 2507, a server circuitry (such as the group-based communication server 309 as shown in FIGS. 3 and 4) and/or the client device may cause the rendering of an event creation modal. An example event creation modal is illustrated in FIG. 31 and described in detail further below.

When the first member clicks, taps, or otherwise selects the zoom button 2505, a server circuitry (such as the group-based communication server 309 as shown in FIGS. 3 and 4) and/or the client device may cause the rendering of a member calendar view of the second member's member calendar. An example member calendar view is illustrated in FIG. 26.

Referring now to FIG. 26, an example member calendar view 2600 is shown. The member calendar view 2600 may include a member calendar portion 2602 and a common events portion 2604. The member calendar portion 2602 may display rendering of events objects representing events on the second member's member calendar.

The common events portion 2604 may display renderings of events objects that are associated with both the first member and the second member. For example, a server circuitry (such as the group-based communication server 309 as shown in FIGS. 3 and 4) may determine that the first member is associated with a first calendar object, and the second member is associated with a second calendar object. The server circuitry may determine that an event object is associated with both the first calendar object and the second calendar object, and may further cause the rendering of the event object in the common events portion 2604.

For example, as shown in FIG. 26, the server circuitry may determine that the first member Renee and the second member Lauran have the same "Q2 Planning group" event on their member calendars, and may further cause the rendering of "Q2 Planning group" event in the common events portion 2604 of the member calendar view 2600.

Accessing Member Calendar from Direct Messaging Interface

In accordance with various embodiments of the present disclosure, a request for rendering member calendar may be received by a server circuitry via interaction by a client device with a user interface of the client device associated with a rendering of a direct messaging interface. As described above, the term "direct messaging" refers to private electronic message exchange between two or more users of the group-based communication system. A server circuitry (such as the group-based communication server 309 as shown in FIGS. 3 and 4) and/or the client device may cause the rendering of a "direct messaging interface" to facilitate direct messaging among members of a group-based communication system.

When a calendar rendering request is received via the direct messaging interface, the server circuitry may cause the rendering of a member calendar flex pane. For example, the server circuitry may determine calendar objects associated with members in the direct messaging, and may cause rendering of these calendar objects in the member calendar flex pane. The member calendar flex pane may display member calendars of members in the direct messaging (including, for example, a first rendering of the first calendar object associated with a first member and a second rendering of the second calendar object associated with a second member). Example user interfaces are described in the present disclosure.

Further, the server circuitry may facilitate event creation via the direct messaging interface. In this regard, FIG. 27 illustrates an example method 2700 for generating an event object for member calendars.

The method 2700 start at block 2701. At block 2703, a server circuitry (such as the group-based communication server 309 as shown in FIGS. 3 and 4) may receive an event generation request via the direct messaging interface.

As described above, the event generation request may comprise a request for event object, and the event generation request may be in the form of an electronic message transmitted to a group-based communication system from a client device via the direct messaging interface. In some examples, the event generation request may be generated when a user clicks, taps, or otherwise selects a "create event" button on the direct messaging interface, as described in detail below.

At block 2705, a server circuitry (such as the group-based communication server 309 as shown in FIGS. 3 and 4) may determine at least part of the event object metadata set for the event object. For example, the server circuitry may determine one or more parameters of the event object metadata set for the event object.

In some examples, the server circuitry may determine the title parameter and the invitee parameter for the event object metadata set based on the direct messaging interface. As described above, the title parameter describes the title of the event, and the invitee parameter describes members who are invited to the event. The server circuitry may determine user identifiers and/or user names associated with the direct messaging interface (for example, user identifiers and/or user names of members in the direct messaging exchange), and may generate the title parameter and/or the invitee parameter based on the user identifiers and/or user names. Examples are described below in connection with FIG. 31.

In some examples, the server circuitry may determine the time parameter for the event object metadata set based on the direct messaging interface. As described above, the time parameter indicates the date, starting time and ending time associated with the calendar event. The server circuitry may analyze calendar object(s) associated with members in the direct messaging exchange to determine the best available time. For example, the server circuitry may determine user identifiers associated with members in the direct messaging exchange, retrieve event objects that have been associated with the user identifiers, and analyze time parameters of the event object metadata sets of these event objects. Examples are described below in connection with FIG. 31.

In some examples, the server circuitry may determine the title parameter and/or details parameter for the event object metadata set based on the direct messaging interface. For example, the server circuitry may conduct natural language processing of the electronic messages in the direct messaging interface, determine contextual information of the electronic messages, and generate the title parameter and/or details parameter based on the contextual information.

Referring back to FIG. 27, at block 2707, a server circuitry (such as the group-based communication server 309 as shown in FIGS. 3 and 4) may transmit the event generation request and at least part of the event object metadata set to an external calendar resource. The external calendar resource may generate an event object based at least in part on the event object metadata set provided by the server circuitry.

At block 2709, a server circuitry (such as the group-based communication server 309 as shown in FIGS. 3 and 4) may receive the event object from the external calendar resource. At block 2711, a server circuitry (such as the group-based communication server 309 as shown in FIGS. 3 and 4) may cause the rendering of the event object for display on the member calendar flex pane.

In particular, the event object is associated with calendar objects of members from the direct messaging exchange. As described above, the server circuitry may determine user identifiers associated with the direct messaging interface (for example, user identifiers of members in the direct messaging exchange), and may further determine calendar objects that represent member calendars associated the user identifiers. Upon receiving the event object from the external calendar service, the server circuitry may associate the event object with these calendar objects by, for example, setting the calendar parameter of the event metadata set of the event object based on these calendar objects.

The method 2700 ends at block 2713.

FIGS. 28-41 illustrate example user interfaces for rendering member calendars in accordance with embodiments of the present invention. Such user interfaces may be, for example, group-based communication interfaces as defined above.

In particular, FIGS. 28-35 show example user interface interactions for a first member of a group-based communication system to access a member calendar of a second member through a direct messaging interface.

Referring now to FIG. 28, an example user interface 2800 is shown. The example user interface 2800 may be displayed on a client device of a first member of the group-based communication system (for example, Renee), and may be associated with a direct messaging exchange between the first member and a second member of the group-based communication system (for example, Laura).

The user interface 2800 may include a member name indicator 2810, which displays the name of the first member (for example, Renee) who accesses the user interface 2800 using a client device. The user interface 2800 may also include a message recipient indicator 2812, which displays the name of the second member (for example, Laura) with whom the first member conducts direct messaging exchange via the user interface 2800. In other words, the user interface 2800 as shown in FIG. 28 illustrates an example direct messaging interface for direct messaging exchange between one member (Renee) and another member (Laura) of the group-based communication system.

The example user interface 2800 may include a side pane 2802, a messaging pane 2804, and an input box 2806. The side pane 2802 may display information associated with the first member Renee. For example, the side pane 2802 may display a list of group-based communication channels that Renee has joined, direct messages associated with Renee, as well as validated external resource(s) that Renee has authorized to access the group-based communication system.

The messaging pane 2804 may display data associated with the direct messaging exchange, including, for example, texts and images. The input box 2806 allows the first member to input data (such as texts and images). Data input by the first member via the input box 2806 may be displayed in the messaging pane 2804.

The example user interface 2800 may include one or more buttons, such as a calendar button 2808. When the first member clicks, taps or otherwise selects the calendar button 2808, a server circuitry (such as the group-based communication server 309 as shown in FIGS. 3 and 4) and/or the client may cause the rendering of a member calendar flex pane. An example member calendar flex pane is shown in FIG. 29.

Referring now to FIG. 29, an example user interface 2900 is shown. The example user interface 2900 may include a member calendar flex pane 2901.

The member calendar flex pane 2901 may include a first rendering 2903 and a second rendering 2905. The first rendering 2903 illustrates a first calendar object associated with the first member, and the second rendering 2905 illustrates a second calendar object associated with the second member. In the example as shown in FIG. 29, the first rendering 2903 illustrates the member calendar of Renee, and the second rendering 2905 illustrates the member calendar of Laura. The first rendering 2903 and the second rendering 2905 may be arranged side-by-side.

To distinguish the two renderings, the member calendar flex pane 2901 may include user avatars associated with the owners of the calendar objects. For example, the first rendering 2903 may include a user avatar corresponding to the owner of the first calendar object (e.g. Renee), and the second rendering 2905 may include a user avatar corresponding to the owner of the second calendar object (e.g. Laura).

Each of the first rendering 2903 and the second rendering 2905 may comprise rendering(s) of one or more event object(s) associated with each calendar object, such as event rendering 2913. The rendering(s) of event object(s) in the first rendering 2903 and the second rendering 2905 may be arranged based on time parameter(s) of the event object metadata set(s) of the event object(s). For example, an event object may be positioned according to the time parameter and its corresponding position on the time axis 2909.

The member calendar flex pane 2901 may also include a time line 2911, which may be positioned on the member calendar flex pane 2901 based on the time axis 2909.

The member calendar flex pane 2901 may further include a "create event" button 2907. When a user clicks, taps, or otherwise selects the "create event" button 2907, a server circuitry (such as the group-based communication server 309 as shown in FIGS. 3 and 4) and/or the client device may cause the rendering of an event creation modal. An example event creation modal is illustrated in FIG. 31.

Referring now to FIG. 30, another example user interface 3000 for triggering the event creation modal is shown. The example user interface 3000 may include a member calendar flex pane 3002. The member calendar flex pane 3002 may include a first rendering and a second rendering, similar to those described above in connection with FIG. 29. When a user clicks, taps, or otherwise selects one of the renderings, a server circuitry (such as the group-based communication server 309 as shown in FIGS. 3 and 4) and/or the client device may render event initiation box 3004.

The event initiation box 3004 may display a suggested time for the event based on the corresponding position in the time axis 3006, and may include one or more buttons such as a "cancel" button and a "create event" button. When a user clicks, taps, or otherwise selects the "create event" button, a server circuitry (such as the group-based communication server 309 as shown in FIGS. 3 and 4) and/or the client device may cause the rendering of an event creation modal. An example event creation modal is illustrated in FIG. 31.

Referring now to FIG. 31, an example event creation modal 3100 is shown. The event creation modal 3100 may include, for example, a title portion 3101, an invitee portion 3103, a time portion 3105, and a location portion 3107, which may display and/or request input for the parameter, the invitee parameter, the time parameter, and the location parameter, respectively, of the event object metadata set. As described above in connection with FIG. 27, a server circuitry (such as the group-based communication server 309 as shown in FIGS. 3 and 4) and/or the client device may determine one or more of these parameters for the event object metadata set.

For example, the server circuitry may determine the title parameter and the invitee parameter based on the user identifiers and/or user names associated with members in the direct messaging exchange. In the example as shown in FIG. 31, the server circuitry may determine that the direct messaging is between Renee and Laura, and may generate the title parameter as "Renee: Laura," and add Renee and Laura as invitees for the event.

As another example, the server circuitry may determine the time parameter. As described above, the server circuitry may analyze calendar object(s) associated with members in the direct messaging exchange to determine the best available time. In the example as shown in FIG. 31, the server circuitry may determine that the best time for Renee and Laura is from 2:30 p.m. to 3:30 p.m., January 20.

As another example, the server circuitry may determine the location parameter. For example, when the "find room" text in the location portion 3107 is clicked, tapped, or otherwise selected, a server circuitry (such as the group-based communication server 309 as shown in FIGS. 3 and 4) and/or the client device may cause the rendering of an updated event creation modal, such as the updated event creation modal 3200 in FIG. 32.

As shown in FIG. 32, the updated event creation modal 3200 may include a location portion 3202 that displays one or more suggested locations for the event. To determine the suggested locations, a server circuitry (such as the group-based communication server 309 as shown in FIGS. 3 and 4) may analyze the events objects associated with members in the direct messaging, and suggest a best location for the event based on, for example, the location parameters associated with the event objects.

Referring back to FIG. 31, the event creation modal may further include one or more buttons, such as, for example, the "delete event" button 3109, the "cancel" button 3111, and the "save" button 3113. When a user clicks, taps, or otherwise selects the "delete event" button 3109 or the "cancel" button 3111, the server circuitry forgoes the generation of event object. When a user clicks, taps, or otherwise selects the "save" button 3113, the server circuitry may transmit an event generation request, along with one or more parameters of the event object metadata set received via the event creation modal 3100, to an external calendar resource based on, for example, block 2707 described above in connection with FIG. 27.

While an example event creation modal is illustrated in FIG. 31, it is noted that other example event creation modals in some embodiments of the present disclosure may vary from the example event creation modal as illustrated in FIG. 31. For example, an event creation modal in accordance with the present disclosure may comprise a "create" button and a "cancel" button, without the "delete event" button 3109 as shown in FIG. 31. The "create" button may be similar to the "save" button 3113 as shown in FIG. 31, and the "cancel" button may be similar to the "cancel" button 3111 as shown in FIG. 31.

Additionally or alternatively, in some examples, the server circuitry and/or the client device may cause the rendering of an event creation modal to provide an interface for a member to edit or update an existing event object. In such examples, an example event creation modal may comprise a "delete event" button 3109 and a "save" button 3113, without the "cancel" button 3111 as shown in FIG. 31.

Once the event object is created, the server circuitry may cause the rendering of an event creation success modal. An example event creation success modal is illustrated in FIG. 33.

Referring to FIG. 33, an example event creation success modal 3300 is shown. The event creation success modal 3300 may include an event object representation 3301, which provides a summary view of the event object that has been created. The event creation success modal 3300 may also include one or more buttons, such as a "share event" button 3303, an "edit event" button 3305, and a "done" button 3307.

In some examples, when the user clicks, taps, or otherwise selects the "share event" button 3303, the server circuitry may trigger generation of an updated event creation success modal that provides options for sharing the event with other members. An example updated event creation success modal is shown in FIG. 34.

Referring back to FIG. 34, an updated event creation success modal 3400 is shown. The updated event creation success modal 3400 may include an event object representation 3402, which provides a summary view of the event object that has been created. The updated event creation success modal 3400 may also include a recipient box 3404 and a message box 3406, which allow the user to input recipients for the event sharing and an electronic message to the recipients.

The updated event creation success modal 3400 may further include one or more buttons, such as the "copy link" button 3408, the "don't share" button 3410, and the "share event" button 3412. When a user clicks, taps, or otherwise selects the "copy link" button 3408, the client device may copy a sharing link that corresponds to the event object. When a user clicks, taps, or otherwise selects "don't share" button 3410, the server circuitry may forgo sharing of the event object. When a user clicks, taps, or otherwise selects "share event" button 3412, the server circuitry may transmit an electronic indication to the client devices associated with the recipients based on the input received via the recipient box 3404, along with the electronic message based on the input received the message box 3406.

Referring back to FIG. 33, in some examples, when the user clicks, taps, or otherwise selects the "edit event" button 3305, the server circuitry may cause the rendering of a user interface that allows the user to edit one or more parameters of the event object metadata set of the event object. In some examples, when the user clicks, taps, or other selects the "done" button 3307, the server circuitry may cause the rendering of an update member calendar flex pane that includes rendering of the newly created event object. An example update member calendar flex pane is illustrated in FIG. 35.

Referring now to FIG. 35, an example user interface 3500 is shown. The example user interface 3500 may include a member calendar flex pane 3501. The member calendar flex pane 3501 may include a first rendering 3503 and a second rendering 3505. The member calendar flex pane 3501 may also include rendering 3507 and rendering 3509 represent the newly created event object, which are displayed on the first rendering 3503 and the second rendering 3505, respectively.

FIGS. 36-41 show example user interface interactions for a first member of a group-based communication system to access a plurality of member calendars of a plurality of members through a direct messaging interface. Such user interfaces may be, for example, group-based communication interfaces as defined above.

Referring now to FIG. 36, an example user interface 3600 is shown. The example user interface 3600 may be displayed on a client device of a first member of the group-based communication system (for example, Renee), and may be associated with a direct messaging exchange between the first member and a plurality of other members (for example, Diego, Renee, Laura) of the group-based communication system.

For example, the user interface 3600 may include a member name indicator 3610, which displays the name of the first member (for example, Marta) who accesses the user interface 3600 using a client device. The user interface 3600 may include a message recipient indicator 3612, which displays names of members (for example, Diego, Renee, Laura) with whom the first member conducts direct messaging exchange via the user interface 3600. In other words, the user interface 3600 as shown in FIG. 36 illustrates an example user interface for direct messaging exchange between one member (Marta) and multiple other members (Diego, Renee, Laura) of the group-based communication system.

The example user interface 3600 may include a side pane 3602, a messaging pane 3604, and an input box 3606. The side pane 3602 may display information associated with the first member Marta. For example, the side pane 3602 may display a list of group-based communication channels that Marta has joined, direct messages associated with the Marta, as well as validated external resource(s) that Marta has authorized to access the group-based communication system.

The messaging pane 3604 may display data associated with the direct messaging, including, for example, texts and images. The input box 3606 allows the first member to input data (such as texts and images). Data input by the first member via the input box 3606 may be displayed in the messaging pane 3604.

The example user interface 3600 may include one or more buttons, such as a calendar button 3608. When the first member clicks, taps or otherwise selects the calendar button 3608, a server circuitry (such as the group-based communication server 309 as shown in FIGS. 3 and 4) and/or the client may cause the rendering of a member calendar flex pane. An example member calendar flex pane is shown in FIG. 37.

Referring now to FIG. 37, an example user interface 3700 is shown. The example user interface 3700 may include a member calendar flex pane 3701.

The member calendar flex pane 3701 may include a "shared events" section 3703. The "shared events" section 3703 may include renderings of event objects associated with members of the direct messaging. For example, a server circuitry (such as the group-based communication server 309 as shown in FIGS. 3 and 4) and/or the client device may determine the user identifiers associated with members in the direct messaging (based on, for example, the member name indicator 3610 and the message recipient indicator 3612 described above in connection with FIG. 36). The server circuitry may determine one or more event objects associated with these user identifiers based on, for example, the invitee parameters of the event object metadata sets. The server circuitry may cause the rendering of these event objects in the "shared events" section 3703.

In some examples, the "shared events" section may include an "upcoming events" tab and a "past events" tab. When the first member clicks, taps, or otherwise selects the "upcoming events" tab, renderings of upcoming shared events are displayed. When the first member clicks, taps, or otherwise selects the "past events" tab, renderings of past shared events are displayed.

The member calendar flex pane 3701 may further include a "create event" button 3705. When a user clicks, taps, or otherwise selects the "create event" button 3705, a server circuitry (such as the group-based communication server 309 as shown in FIGS. 3 and 4) and/or the client device may cause the rendering of an event creation modal. An example event creation modal is illustrated in FIG. 38.

Referring now to FIG. 38, an example event creation modal 3800 is shown, similar to the event creation modal 3100 described above in connection with FIG. 31. A server circuitry (such as the group-based communication server 309 as shown in FIGS. 3 and 4) and/or the client device may determine one or more parameters for the event object metadata set, as described above in connection with FIG. 27.

For example, the server circuitry may determine the invitee parameter in the invitee portion 3802 based on the user identifiers and/or user names associated with members in the direct messaging interface.

In addition, the server circuitry may suggest time parameter(s) for the event object. For example, the event creation modal 3800 may include a time portion 3804. The time portion 3804 may include a duration section 3806, allowing the first member to specify the duration of the event. The time portion 3804 may also include a time frame section 3808, allowing the first member to specify a date or a time frame for the event. Example date/time frame in the time frame section 3808 may include, for example, today, within a few days, this week, next week, or user customized time range.

Based on the duration and time frame, the server circuitry may determine one or more suggested time slots 3810 for the event. For example, the server circuitry may analyze calendar object(s) associated with members in the direct messaging exchange, retrieve event objects that have been associated with the user identifiers, analyze time parameters of the event object metadata sets of these event objects, and determine one or more time slots that would satisfies the duration and date requirements.

Further, the time portion 3804 may include one or more buttons, such as the "view" button for each suggested time slots, which may trigger the rendering of member calendars associated with the members in the direct messaging. When a user clicks, taps, or otherwise selects the "view" button, a find time modal may be displayed. Example find time modals are illustrated in FIGS. 39 and 40.

Referring now to FIG. 39, a find time modal 3900 is shown. The find time modal 3900 may include a guest section 3901, a best time section 3903, and a member calendars portion 3905.

The guest section 3901 may display user names and user icons based on the invitee parameter associated with the event object. In addition, the guest section 3901 allows the member to edit the invitee parameter by unchecking the check box(es) associated with user icons, and/or adding additional invitee(s) via the "add guests" input box.

The best time section 3903 may display a duration section, a time frame section, and/or time slots, which are similar to those of the time portion 3804 described above in connection with FIG. 38.

The member calendars portion 3905 may display renderings of member calendars associated with members in the direct messaging. For example, as shown in FIG. 39, the member calendars portion 3905 may include a rendering 3907 of a member calendar associated with member Marta, a rendering 3909 of a member calendar associated with member Diego, a rendering 3911 of a member calendar associated with member Laura, and a rendering 3913 of a member calendar associated with member Renee. The renderings 3907, 3909, 3911 and 3913 may be arranged side-by-side, and may include renderings of event objects, similar to the renderings 2903 and 2905 described above in connection with FIG. 29.

To distinguish the renderings, the member calendars portion 3905 may include user avatars associated with the owners of calendar objects. For example, each of the renderings 3907, 3909, 3911, and 3913 may include a user avatar corresponding to the owner of the calendar object in the rendering.

Further, the member calendars portion 3905 may include a time bar 3917, which illustrates the currently selected time for the to-be-created event. The currently selected time may, for example, correspond to the time slot selected by the member in the best time section 3903. The time bar 3917 may be horizontally positioned across the renderings 3907, 3909, 3911, and 3913, and may be vertically positioned based on the selected time in the time axis 3919.

In some examples, a member operating a client device may move the time bar 3917 vertically to indicate a different selected time. For example, in the find time modal 4000 as shown in FIG. 40, the time bar 4004 may be moved vertically within the member calendars portion 4002 to indicate a different selected time for the to-be-generated event. After the desired time is elected, a member may click, tap, or otherwise select the "done" button 4006, which triggers the user interface to return to the event creation modal with the time parameter obtained from the find time modal 4000. An example event creation modal is illustrated in FIG. 41.

Referring now to FIG. 41, the event creation modal 4100 may include a time portion 4102, which may indicate time parameter determined from a find time modal, such as find time modal 3900 of FIG. 39 or find time modal 4000 of FIG. 40.

The event creation modal 4100 may further include one or more buttons, such as, for example, the "delete event" button 4104, the "cancel" button 4106, and the save button 4108. When a user clicks, taps, or otherwise selects the "delete event" button 4104 or the "cancel" button 4106, the server circuitry forgoes the generation of an event object. When a user clicks, taps, or otherwise selects the "save" button 4108, the server circuitry may transmit an event generation request, along with one or more parameters of the event object metadata set received through the event creation modal 4100, to an external calendar resource based on, for example, block 2707 described above in connection with FIG. 27.

Additional Implementation Details

Although example processing systems have been described in FIGS. 3-4, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML (Hypertext Markup Language) page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. One or more non-transitory computer-readable media storing computer-executable instructions that, when executed by at least one processor, perform a method for sharing calendar information within a group-based communication system, the method comprising:
   receiving a message associated with a first user;
   identifying, within the message, an indication of a first calendar event associated with the first user;
   responsive to identifying the indication of the first calendar event, generating a first calendar object associated with the first calendar event;
   adding the first calendar object to an individual user calendar of the first user;
   identifying, within external calendar data retrieved from an external calendar resource, an indication of a second calendar event associated with the first user;
   responsive to identifying the indication of the second calendar event, generating a second calendar object associated with the second calendar event;
   adding the second calendar object to the individual user calendar of the first user;

receiving, from a second user and within a user interface associated with the group-based communication system, a selection of an icon associated with the first user; and responsive to receiving the selection of the icon associated with the first user, causing for display, within the user interface, a rendering of the individual user calendar of the first user including the first calendar object and the second calendar object.

2. The one or more non-transitory computer-readable media of claim 1, wherein the first calendar object comprises a first calendar object metadata set including a title parameter, a time parameter, a location parameter, an invitee parameter, a visibility parameter, an availability parameter, and a calendar parameter.

3. The one or more non-transitory computer-readable media of claim 2, the method further comprising:
causing for display, within the user interface, a rendering of indicia relating to the first calendar object metadata set.

4. The one or more non-transitory computer-readable media of claim 1, the method further comprising:
transmitting, via the group-based communication system, a validation request to the external calendar resource to access the first calendar object; and
receiving a validation notification from the external calendar resource.

5. The one or more non-transitory computer-readable media of claim 1, the method further comprising:
receiving, from the first user, a delete request associated with the first calendar object; and
responsive to the delete request, removing the first calendar object from the individual user calendar of the first user.

6. The one or more non-transitory computer-readable media of claim 1, the method further comprising:
receiving a change to the first calendar object; and
responsive to the change to the first calendar object, updating the first calendar object within the rendering of the individual user calendar of the first user.

7. The one or more non-transitory computer-readable media of claim 1, wherein the message associated with the first user is received within a channel of the group-based communication system, and wherein the channel of the group-based communication system is one of a plurality of channels within the group-based communication system, each channel of the plurality of channels configured to display, within the user interface, a plurality of messages from a plurality of users associated with the respective channel.

8. A method for sharing calendar information within a group-based communication system, the method comprising:
receiving a message associated with a first user;
identifying, within the message, an indication of a first calendar event associated with the first user;
responsive to identifying the indication of the first calendar event, generating a first calendar object associated with the first calendar event;
adding the first calendar object to an individual user calendar of the first user;
identifying, within external calendar data retrieved from an external calendar resource, an indication of a second calendar event associated with the first user;
responsive to identifying the indication of the second calendar event, generating a second calendar object associated with the second calendar event;
adding the second calendar object to the individual user calendar of the first user;
receiving, from a second user and within a user interface associated with the group-based communication system, a selection of an icon associated with the first user; and
responsive to receiving the selection of the icon associated with the first user, causing for display, within the user interface, a rendering of the individual user calendar of the first user including the first calendar object and the second calendar object.

9. The method of claim 8, wherein the first calendar object comprises a first calendar object metadata set including a title parameter, a time parameter, a location parameter, an invitee parameter, a visibility parameter, an availability parameter, and a calendar parameter.

10. The method of claim 9, further comprising:
causing for display, within the user interface, a rendering of indicia relating to the first calendar object metadata set.

11. The method of claim 8, further comprising:
transmitting, via the group-based communication system, a validation request to the external calendar resource to access the first calendar object; and
receiving a validation notification from the external calendar resource.

12. The method of claim 8, the method further comprising:
receiving, from the first user, a delete request associated with the first calendar object; and
responsive to the delete request, removing the first calendar object from the individual user calendar of the first user.

13. The method of claim 8, further comprising:
receiving a change to the first calendar object; and
responsive to the change to the first calendar object, updating the first calendar object within the rendering of the individual user calendar of the first user.

14. The method of claim 8, wherein the message associated with the first user is received within a channel of the group-based communication system, and wherein the channel of the group-based communication system is one of a plurality of channels within the group-based communication system, each channel of the plurality of channels configured to display, within the user interface, a plurality of messages from a plurality of users associated with the respective channel.

15. A system comprising:
at least one processor; and
one or more non-transitory computer-readable media storing computer-executable instructions that, when executed by the at least one processor, perform a method for sharing calendar information within a group-based communication system, the method comprising:
receiving a message associated with a first user;
identifying, within the message, an indication of a first calendar event associated with the first user;
responsive to identifying the indication of the first calendar event, generating a first calendar object associated with the first calendar event;
adding the first calendar object to an individual user calendar of the first user;
identifying, within external calendar data retrieved from an external calendar resource, an indication of a second calendar event associated with the first user;

responsive to identifying the indication of the second calendar event, generating a second calendar object associated with the second calendar event;

adding the second calendar object to the individual user calendar of the first user;

receiving, from a second user and within a user interface associated with the group-based communication system, a selection of an icon associated with the first user; and responsive to receiving the selection of the icon associated with the first user, causing for display, within the user interface, a rendering of the individual user calendar of the first user including the first calendar object and the second calendar object.

16. The system of claim 15, wherein the first calendar object comprises a first calendar object metadata set including a title parameter, a time parameter, a location parameter, an invitee parameter, a visibility parameter, an availability parameter, and a calendar parameter.

17. The system of claim 16, the method further comprising:

causing for display, within the user interface, a rendering of indica relating to the first calendar object metadata set.

18. The system of claim 15, the method further comprising:

transmitting, via the group-based communication system, a validation request to the external calendar resource to access the first calendar object; and receiving a validation notification from the external calendar resource.

19. The system of claim 15, the method further comprising:

receiving, from the first user, a delete request associated with the first calendar object; and responsive to the delete request, removing the first calendar object from the individual user calendar of the first user.

20. The system of claim 15, the method further comprising:

receiving a change to the first calendar object; and responsive to the change to the first calendar object, updating the first calendar object within the rendering of the individual user calendar of the first user.

* * * * *